US008514303B2

(12) United States Patent
Wach

(10) Patent No.: US 8,514,303 B2
(45) Date of Patent: Aug. 20, 2013

(54) ADVANCED IMAGING SYSTEMS AND METHODS UTILIZING NONLINEAR AND/OR SPATIALLY VARYING IMAGE PROCESSING

(75) Inventor: Hans Brandon Wach, Longmont, CO (US)

(73) Assignee: OmniVision Technologies, Inc., Santa Clara, CA (US)

( * ) Notice: Subject to any disclaimer, the term of this patent is extended or adjusted under 35 U.S.C. 154(b) by 328 days.

(21) Appl. No.: 12/987,877

(22) Filed: Jan. 10, 2011

(65) Prior Publication Data

US 2011/0115950 A1  May 19, 2011

Related U.S. Application Data

(63) Continuation-in-part of application No. 11/696,121, filed on Apr. 3, 2007, now Pat. No. 7,911,501.

(60) Provisional application No. 60/788,801, filed on Apr. 3, 2006.

(51) Int. Cl.
*H04N 5/217* (2006.01)

(52) U.S. Cl.
USPC ............................ 348/241; 348/340; 382/275

(58) Field of Classification Search
USPC ................. 348/207.99, 241, 311, 340, 345, 348/252; 382/254, 255, 275, 279; 725/37
See application file for complete search history.

(56) References Cited

U.S. PATENT DOCUMENTS

| 5,748,371 | A | 5/1998 | Cathey et al. |
| 6,363,526 | B1 * | 3/2002 | Vlahos et al. ................... 725/37 |
| 6,525,302 | B2 | 2/2003 | Dowski, Jr. et al. |
| 6,842,297 | B2 | 1/2005 | Dowski, Jr. |
| 6,873,733 | B2 | 3/2005 | Dowski, Jr. |
| 6,911,638 | B2 | 6/2005 | Dowski, Jr. et al. |
| 6,940,649 | B2 | 9/2005 | Dowski, Jr. |
| 7,115,849 | B2 | 10/2006 | Dowski, Jr. et al. |

(Continued)

FOREIGN PATENT DOCUMENTS

WO  WO 0168326  9/2001

OTHER PUBLICATIONS

Scognamiglio et al., "Enhancement of coded video sequences via an adaptive nonlinear post-processing," Signal Processing: Image Communication 18, 2003.*

(Continued)

*Primary Examiner* — Nelson D. Hernández Hernández
*Assistant Examiner* — Dennis Hogue
(74) *Attorney, Agent, or Firm* — Lathrop & Gage LLP

(57) ABSTRACT

A method, associated systems, and apparatus are described for imaging a scene to produce electronic image data representing the scene and having at least one improved characteristic. Encoding optics image and encode electromagnetic energy radiated or reflected from a scene, including its objects and features, and a detector receives the encoded electromagnetic energy to produce electronic image data which is at least partially decoded by a pre-processing operation to produce pre-processed electronic image data, having at least one improved characteristic as a result of cooperation between the encoding and decoding. A subset of the pre-processed image data may include artifacts as a result of the encoding and decoding; the artifacts are further processed by applying a nonlinear post-processing operation that identifies the artifacts in the pre-processed imaged data and compensates the associated image data values while retaining the improved image characteristics in the balance of the pre-processed image data.

19 Claims, 58 Drawing Sheets

(56) References Cited

U.S. PATENT DOCUMENTS

| | | | |
|---|---|---|---|
| 7,180,673 | B2 | 2/2007 | Dowski, Jr. |
| 7,218,448 | B1 | 5/2007 | Cathey, Jr. et al. |
| 2003/0108250 | A1 | 6/2003 | Luo et al. |
| 2003/0142877 | A1* | 7/2003 | George et al. ............... 382/254 |
| 2003/0169944 | A1* | 9/2003 | Dowski et al. ............... 382/279 |
| 2003/0215155 | A1 | 11/2003 | Serrano et al. |
| 2005/0197809 | A1 | 9/2005 | Dowski, Jr. et al. |
| 2007/0058056 | A1 | 3/2007 | Kaplinsky |
| 2008/0037898 | A1* | 2/2008 | Nakagata et al. ............. 382/275 |
| 2008/0131018 | A1* | 6/2008 | Findlay et al. ............... 382/255 |
| 2009/0201411 | A1* | 8/2009 | Ono ............................. 348/345 |
| 2010/0079627 | A1* | 4/2010 | Ono ............................. 348/241 |
| 2010/0182476 | A1* | 7/2010 | Feng et al. .................... 348/311 |

OTHER PUBLICATIONS

Chase, "Not too impressed with wavefront coding," posted on DPReview.com Sep. 16, 2004.*

Gracht, Van Der J., et al. "Iris Recognition With Enhanced Dept-of-Field Image Acquisition," Proceedings of teh SPIE, SPIE, Bellingham, VA, United States, vol. 5438, No. 1, Jul. 2004, pp. 120-129.

International Search Report and Written Opinion issued in related PCT Patent Application Serial No. PCT/US2007/065887, dated Aug. 7, 2007, 15 pages.

International Preliminary Patentability Report issued in related PCT Patent Application Serial No. PCT/US2007/065887, dated Jul. 29, 2008, 10 pages.

Response to Written Opinion filed in related PCT Patent Application Serial No. PCT/US2007/065887, dated Feb. 4, 2008, 15 pages.

European Application No. 07760048.4, Communication Pursuant to Article 94(3) EPC, Apr. 17, 2009, 4 pages.

Notification of Intention to Grant issued in related European Patent Application 07760 048.4 dated Nov. 26, 2010, 5 pages.

U.S. Appl. No. 11/696,121.

* cited by examiner

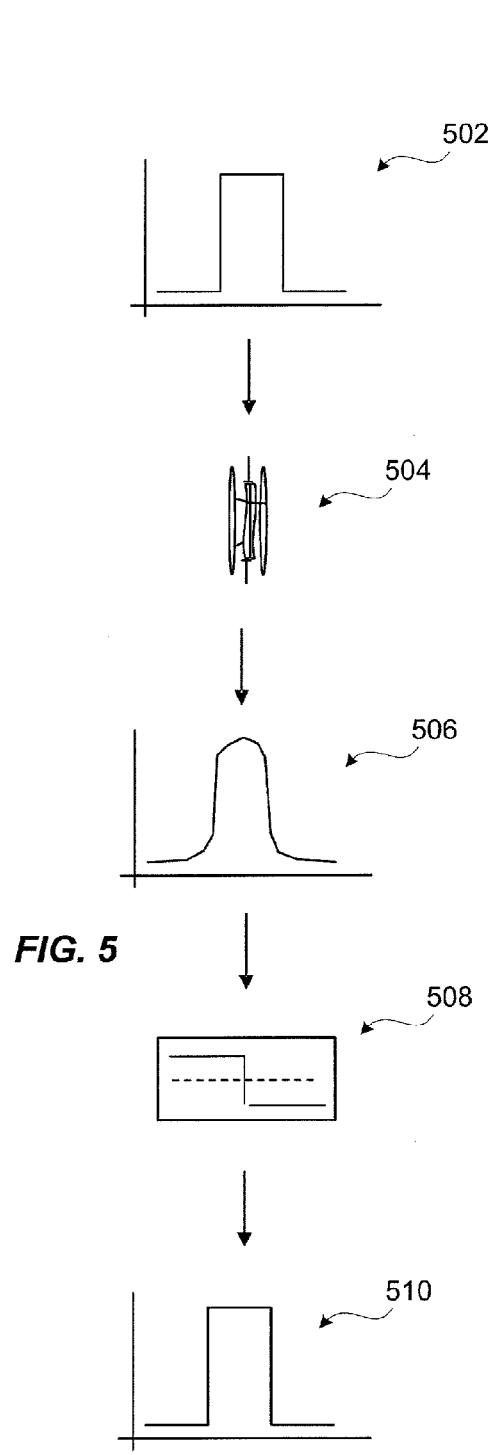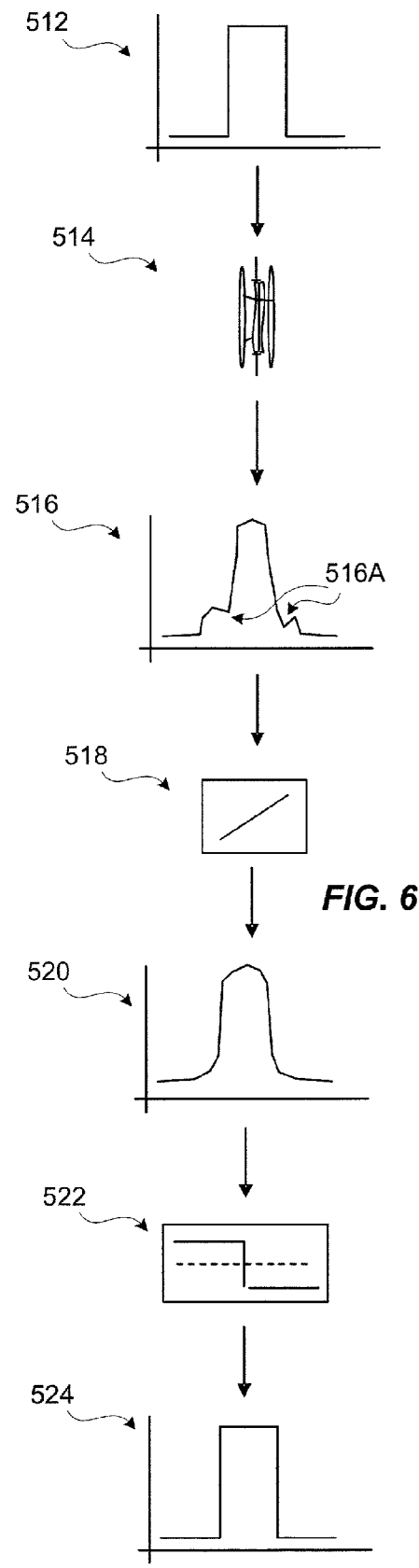
FIG. 5
FIG. 6

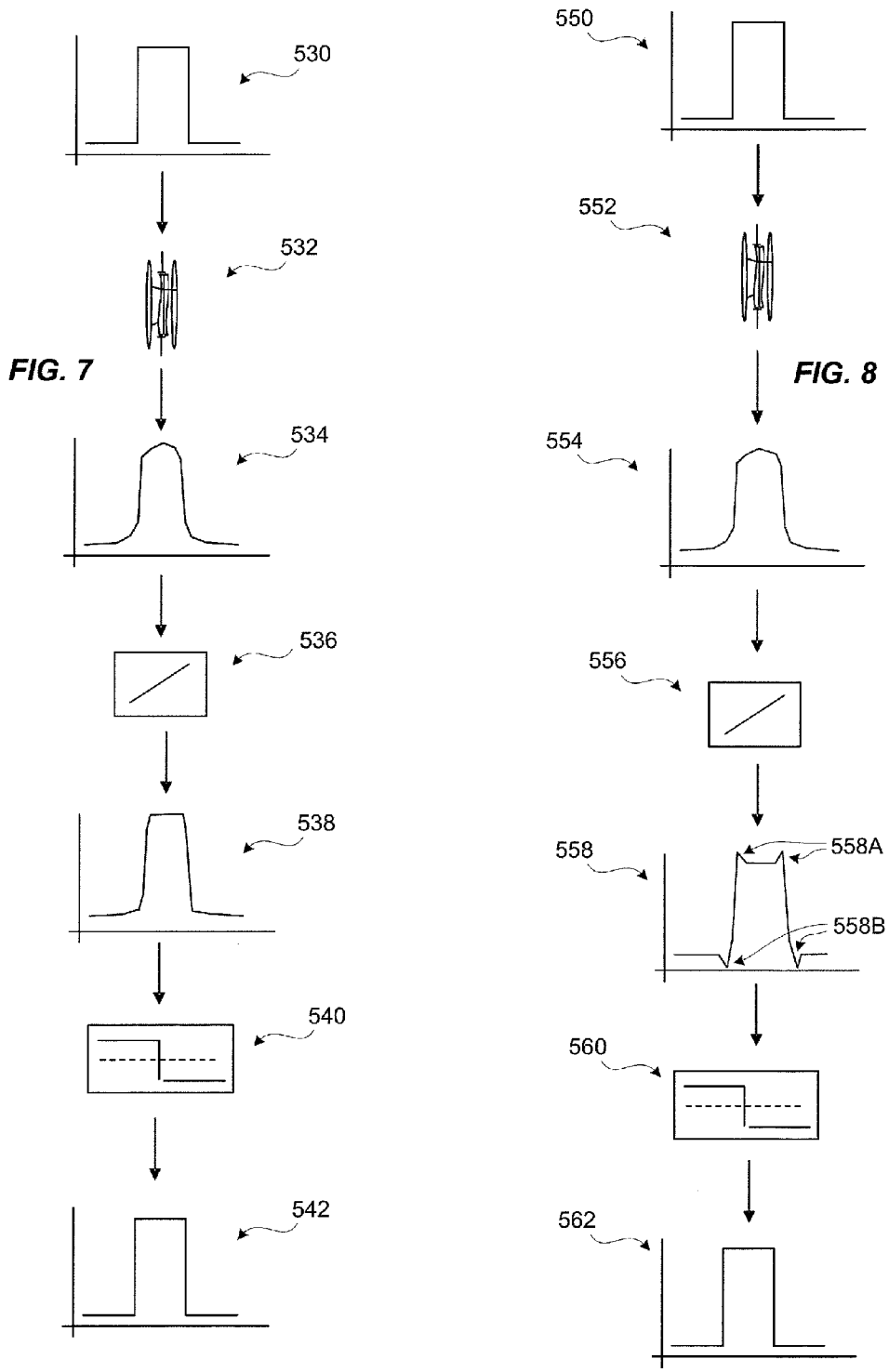

FIG. 15
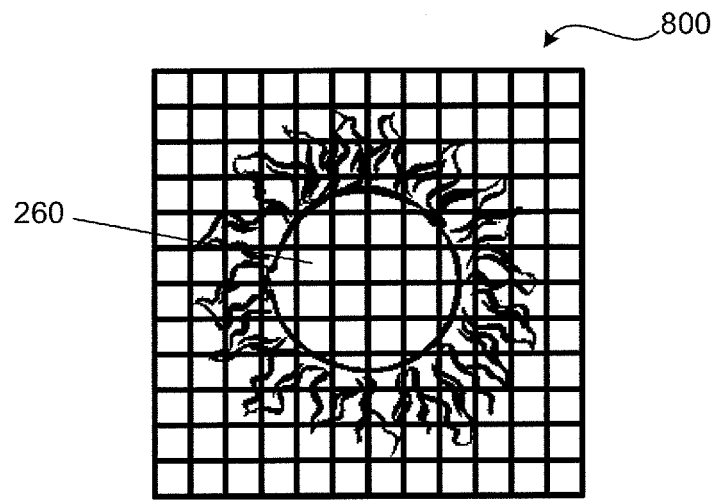
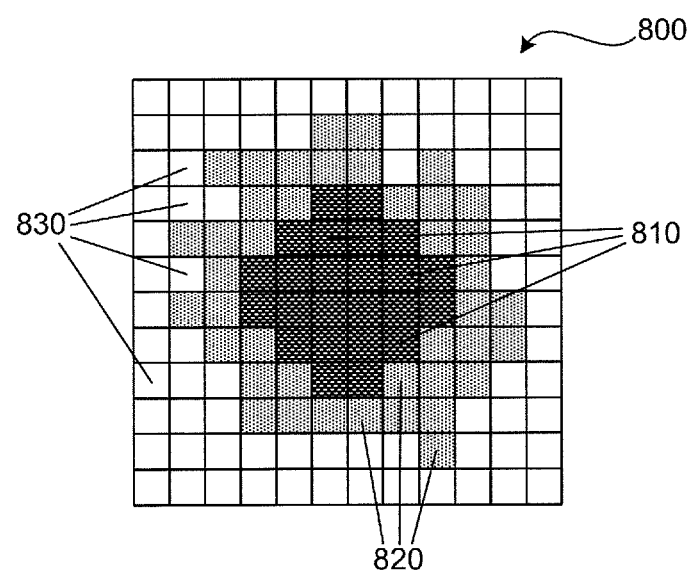
FIG. 16

FIG. 20
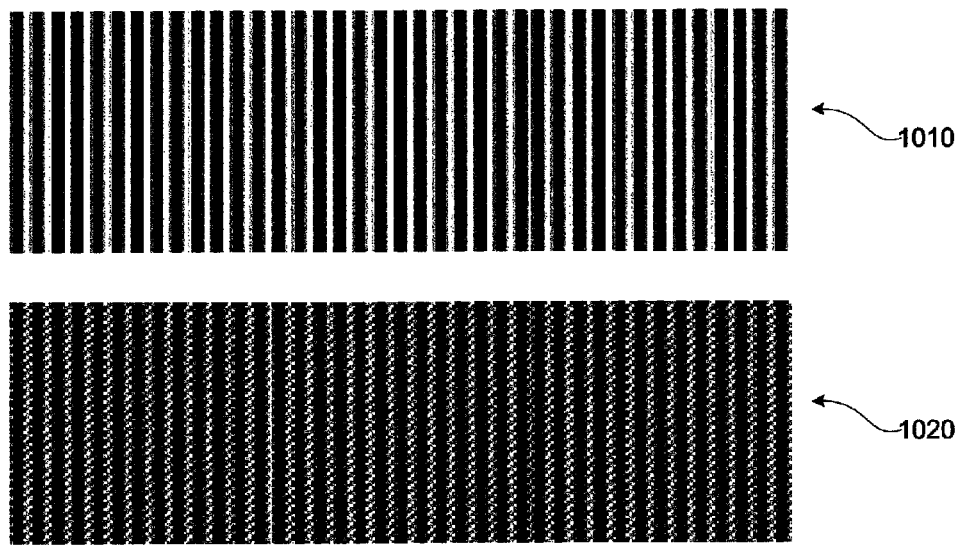
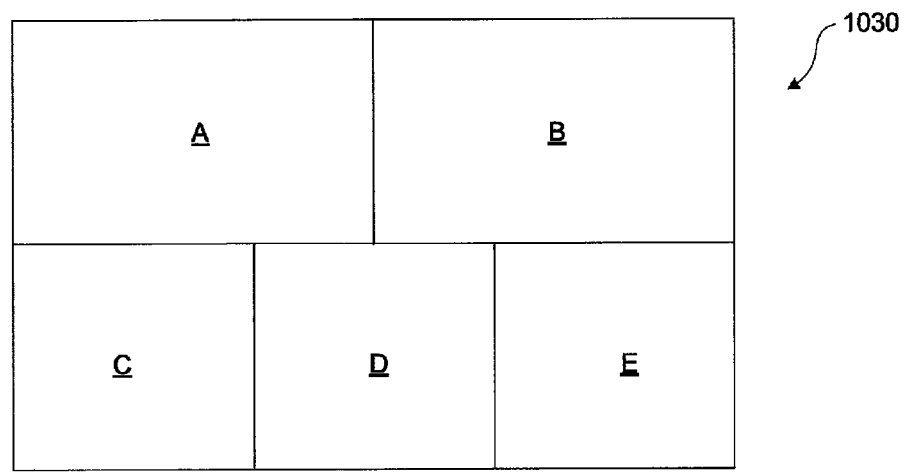
FIG. 21

ADVANCED IMAGING SYSTEMS AND METHODS UTILIZING NONLINEAR AND/OR SPATIALLY VARYING IMAGE PROCESSING

CROSS-REFERENCE TO RELATED APPLICATIONS

This application is a continuation-in-part of commonly owned and U.S. patent application Ser. No. 11/696,121 filed on Apr. 3, 2007, now U.S. Pat. No. 7,911,501 which claims priority to U.S. Provisional Application Ser. No. 60/788,801 filed on Apr. 3, 2006, both of which applications are incorporated herein by reference. In addition, the present application incorporates by reference, in their entireties, the following two U.S. patents: U.S. Pat. No. 7,218,448 filed by Cathey, Jr. et al. on May 1, 1998; and U.S. Pat. No. 5,748,371 filed by Cathey, Jr. et al. on Mar. 17, 1997 and hereinafter referred to as the Cathey '371 patent.

BACKGROUND

Certain imaging systems image electromagnetic energy emitted by or reflected from an object through optics, capture a digital image of the object, and process the digital image to enhance image quality or alter characteristics of the digital image. Processing may require significant computational resources such as memory space and computing time to enhance image quality.

For human viewers, image quality is a subjective qualification of the properties of an image. For machine vision applications, image quality is related to a degree to which an image is usable in the performance of a task. Processing of electronic image data can improve image quality based either on subjective or objective factors. For example, human viewers might consider subjective factors such as sharpness, brightness, contrast, colorfulness, noisiness, discriminability, identifiability and naturalness. Sharpness describes the presence of fine detail; for example, a human viewer might expect to see individual blades of grass. Brightness describes overall lightness or darkness of an image; for example, a sunny outdoor scene is considered bright whereas a shadowed indoor scene is considered dark. Contrast describes a difference in lightness between lighter and darker regions of an image. Colorfulness describes intensity of hue of colors; for example, a gray color has low colorfulness, while a vivid red has high colorfulness. Noisiness describes a degree to which noise is present. Noise is introduced, for instance, by an image detector (e.g., as fixed pattern noise, temporal noise, or as effects of defective pixels of the detector) or by image manipulating algorithms (e.g., uniformity defects). Discriminability describes an ability to distinguish objects in an image from each other. Identifiability describes a degree to which an image or portion thereof conforms to a human viewer's association of the image or a similar image. Naturalness describes a degree to which an image or portions thereof match a human viewer's idealized memory of that image or portion; for example, green grass, blue skies and tan skin are considered more natural the closer that they are perceived to the idealized memory of that particular human viewer.

For machine vision applications, image quality is related to a degree to which an image is appropriate for use in performing a particular task. The quality of an image associated with a machine vision application can be related to a certain value of a signal-to-noise ratio (SNR) and a probability of successfully completing a certain task. For example, in a package sorting system, images of packages are utilized to identify the edges of each package to determine package sizes. If the sorting system is able to consistently identify packages, then a probability of success is high and therefore a SNR for edges in the utilized images is considered sufficient for performing the task. For iris recognition, specific spatial frequencies of features within an iris can be identified to support discrimination between irises. If an SNR for these spatial frequencies is insufficient, then an iris recognition algorithm will not function as desired.

SUMMARY

In an embodiment, an imaging system includes optics having one or more phase modifying elements that modify wavefront phase to introduce image attributes into an optical image. A detector converts the optical image to electronic data while maintaining the image attributes. A signal processor subdivides the electronic data into one or more data sets, classifies the data sets based at least on the image attributes, and independently processes the data sets to form processed electronic data.

In one embodiment, an imaging system includes optics having one or more phase modifying elements that modify wavefront phase to form an optical image. A detector converts the optical image to electronic data having one or more image attributes that are dependent on characteristics of the phase modifying elements and/or the detector. A signal processor subdivides the electronic data into one or more data sets, classifies the data sets based at least on the image attributes, and independently processes the data sets to form processed electronic data.

In one embodiment, an imaging system includes optics having one or more phase modifying elements that modify wavefront phase to predeterministically affect an optical image. A detector converts the optical image to electronic data. A digital signal processor subdivides the electronic data into one or more data sets and classifies the data sets, based at least in part on a priori knowledge about how the phase modifying elements modify the wavefront phase. The digital signal processor independently processes each of the data sets to form processed electronic data.

In one embodiment, an imaging system includes optics, including one or more phase modifying elements that alter wavefront phase and produce an optical image with at least one known image attribute. A detector converts the optical image to electronic data that, while preserving the image attribute, is divisible into data sets. A digital signal processor determines at least one characteristic for each of the data sets and processes the data sets to modify the image attribute in a degree and manner that is independently adjustable for the data sets, to generate processed electronic data.

In one embodiment, an imaging system includes optics having one or more phase modifying elements that modify wavefront phase to introduce one or more image attributes into an optical image. A detector converts the optical image to electronic data while maintaining the image attributes. A digital signal processor determines one or more characteristics of the electronic data, and provides nonlinear processing of the electronic data to modify the image attribute and to form processed electronic data.

In one embodiment, an imaging system includes optics having one or more phase modifying elements that modify wavefront phase to introduce one or more image attributes into an optical image. A detector converts the optical image to electronic data while maintaining the image attributes. A digital signal processor subdivides the electronic data into one or more data sets, classifies the data sets, based at least on the image attributes, and independently and nonlinearly processes the data sets to form processed electronic data.

In one embodiment, a method for generating processed electronic data includes modifying phase of a wavefront from an object to introduce one or more image attributes into an optical image formed by an imaging system. The method includes converting the optical image to electronic data while maintaining the image attributes, subdividing the electronic data into one or more data sets, classifying the data sets based at least on the one or more image attributes, and independently processing the data sets to form processed electronic data.

A software product includes instructions stored on computer-readable media. The instructions, when executed by a computer, perform steps for processing electronic data generated by (a) modifying phase of a wavefront from an object to introduce one or more image attributes into an optical image formed by an imaging system and (b) converting the optical image to electronic data while maintaining the image attributes. The instructions include instructions for subdividing the electronic data into one or more data sets, classifying the data sets based at least on the image attributes, and independently processing the data sets to form the processed electronic data.

In one embodiment, electromagnetic energy from a scene is encoded in a predetermined way to produce encoded electromagnetic energy. The encoded electromagnetic energy is imaged to form an encoded optical image. The encoded optical image is received and captured to produce raw electronic image data corresponding to the encoded optical image. The raw electronic image data is decoded so that the encoding and the decoding cooperate with one another to produce pre-processed image data representing at least one characteristic that is changed relative to an associated characteristic of the scene, and the pre-processed image data includes, as a byproduct of the cooperation between the encoding and the decoding, at least one artifact as compared to the raw electronic image data. Compensation for the artifact is applied by a nonlinear post-processing operation to alter a part of the pre-processed image data that contains the artifact while retaining the changed characteristic in the balance of the pre-processed image data. In one feature, as part of the nonlinear post-processing operation, a scanning region is defined having a shape that can overlay a portion the raw electronic image data to encompass a plurality of image data values within the raw electronic image data, and the scanning region is scanned through the raw electronic image data by sequential movement thereof through a series of positions in the raw electronic image data. A predicted image data value range is established, for a given one of the data values encompassed by the scanning region, corresponding to each of the positions and based at least in part on the plurality of image data values contained within the scanning region. The predicted image data value range is compared, for each given data value, to a corresponding pre-processed data value, and based on the comparing the artifact is identified as at least one outlying pre-processed data value that lies outside of the predicted range. As part of the compensation, the artifact is corrected by changing the outlying pre-processed data value to lie within the predicted range. In another feature, as part of the nonlinear post-processing operation, the raw electronic image data is scanned to generate therefrom filtered data that defines data value boundaries for the pre-processed image data, and the pre-processed data is compared with the filtered data to identify the artifact as a subset of the pre-processed data that lies outside of the data value boundaries determined from the filtered data. As part of the compensating, the subset is changed to produce a corrected subset of image data that lies within the boundaries determined from the filtered data.

In one embodiment, optics are configured for imaging electromagnetic energy from a scene, and the optics are modified to encode the electromagnetic energy in a predetermined way to produce an encoded optical image. A detector is arranged for receiving and capturing the encoded optical image and producing therefrom raw electronic image data corresponding to the encoded optical image, and the raw electronic image data is received with a processor that is in electrical communication with the detector. The raw electronic image data is decoded with the processor to produce pre-processed image data representing at least one characteristic that is changed relative to an associated characteristic of the scene, and the pre-processed image data includes, as a byproduct of the cooperation between the encoding and decoding, at least one artifact as compared to the raw electronic image data. The pre-processor compensates for the artifact by applying a nonlinear post-processing operation to alter a part of the pre-processed image data that contains the artifact while retaining the changed characteristic in the balance of the pre-processed image data.

In an embodiment, a modified digital imaging system for imaging a scene and producing therefrom an enhanced digital output image, is configured to replace an unmodified digital imaging system that has unmodified optics for imaging the scene and producing a corresponding image from electromagnetic energy from the scene, an optoelectronic detector configured for receiving the corresponding image and producing therefrom an unmodified digitized image, and an unmodified processing arrangement configured for processing the unmodified digitized image to produce an unmodified digital output image having an unmodified set of characteristics. The modified digital imaging system includes modified optics configured for encoding the electromagnetic energy in a predetermined way to produce an encoded image such that the optoelectronic detector produces therefrom an encoded digital image, and a modified processing arrangement configured for decoding the encoded digital image. The modified processing arrangement produces a pre-processed digital image having at least one characteristic that is improved as compared to a corresponding unmodified characteristic of the unmodified digital output image. The pre-processed digital image includes, as a byproduct of a cooperation between the encoding and the decoding, at least one artifact, as compared to the unmodified digital output image. The modified processing arrangement also compensates for the artifact to produce an enhanced digital image having the improved image characteristic, and serving as the enhanced digital output image.

In addition to the exemplary aspects and embodiments described above, further aspects and embodiments will become apparent by reference to the drawings and by study of the following descriptions.

BRIEF DESCRIPTION OF DRAWINGS

FIG. 5 through 9 show exemplary progressions of electronic signals through the imaging system of FIG. 1 when nonlinear and/or spatially varying image processing is applied, in accordance with exemplary embodiments.

FIG. 15 shows a portion of the scene of FIG. 2, superimposed onto a set of pixels.

FIG. 16 shows the pixels of FIG. 15 segregated into data sets according to thresholding of the portion of the scene of FIG. 15, in accordance with an embodiment.

FIG. 20 shows two exemplary objects.

FIG. 21 shows an exemplary image "key," in accordance with an embodiment.

FIG. 37 is different from that used to obtain FIG. 36.

DETAILED DESCRIPTION OF DRAWINGS

Figure 1:
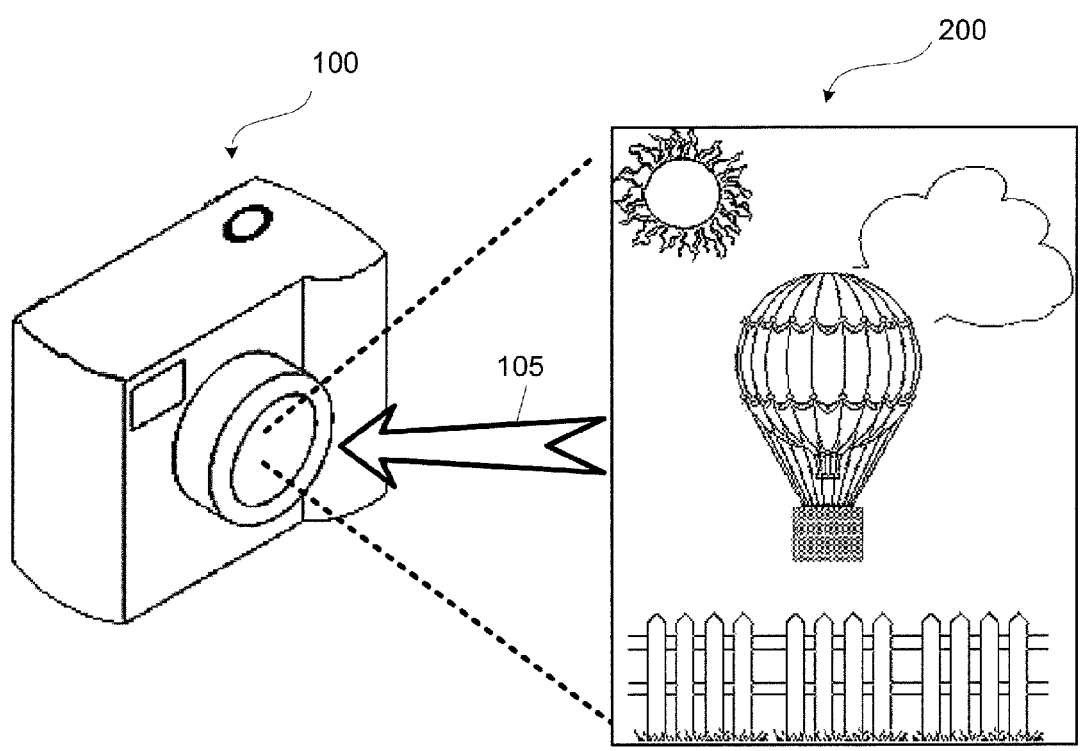
FIG. 1 shows an imaging system for imaging electromagnetic energy emitted by, or reflected from, objects in an exemplary scene, in accordance with an embodiment.

FIG. 1 shows an imaging system 100 imaging electromagnetic energy 105 emitted by, or reflected from, objects in an exemplary scene 200. Imaging system 100 includes optics and a detector that captures a digital image of scene 200 as electronic data; it may process the electronic data to enhance image quality in processed electronic data. Although imaging system 100 is represented in FIG. 1 as a digital camera, it may be understood that imaging system 100 may be included as part of a cell phone or other device. It is appreciated that system 100 may include components that cooperate with each other over a distance to perform the tasks of image capture and image processing, as explained below.

System 100 may be configured to improve quality of an image in processed electronic data by processing the electronic data in a spatially varying process. System 100 may also be configured to improve quality of an image by processing the electronic data in a nonlinear process, which may offer certain advantages over linear processing. System 100 may also be configured to improve quality of an image by processing the electronic data in a nonlinear and spatially varying process.

Figure 2:
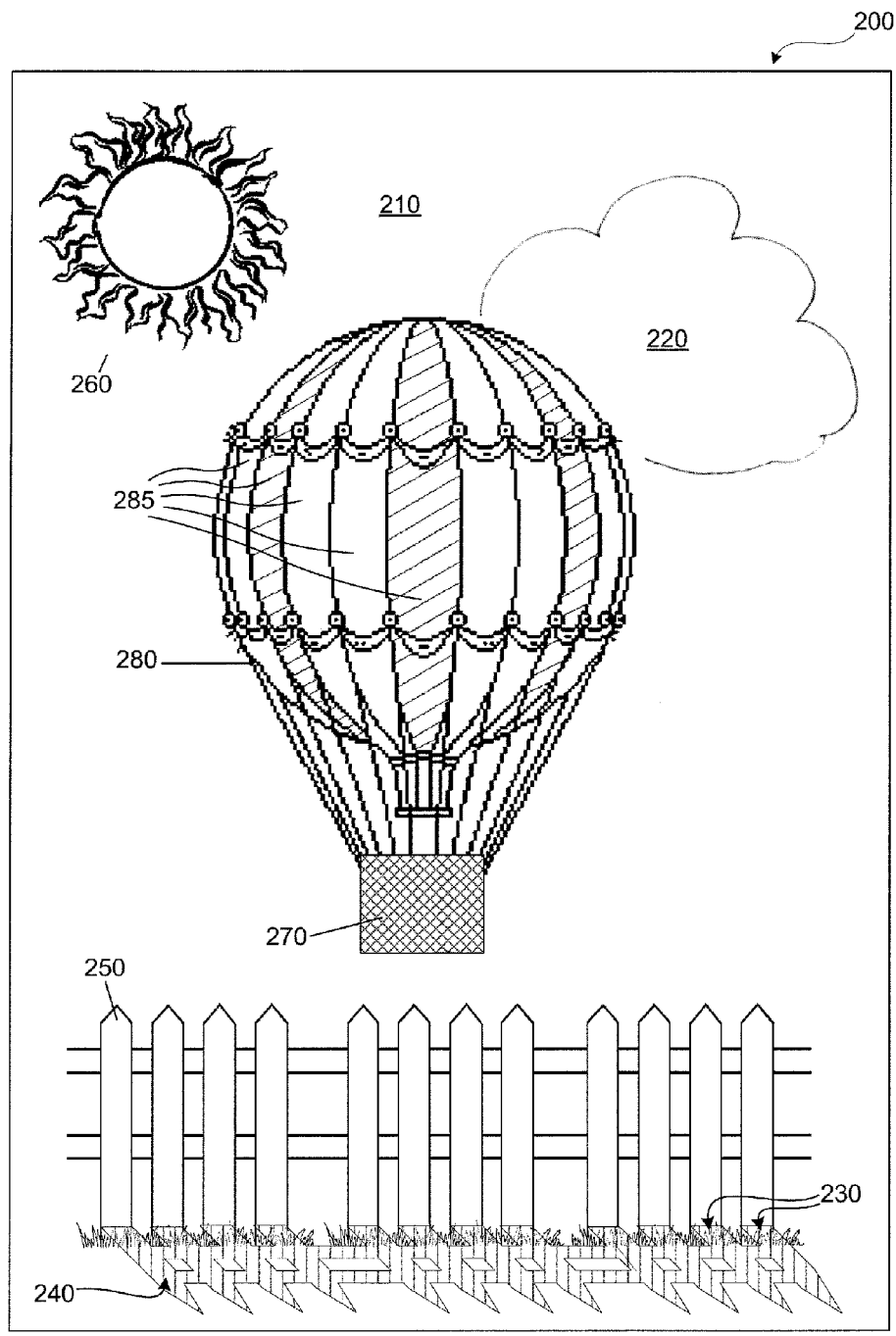
FIG. 2 shows an enlargement of the exemplary scene of FIG. 1, shown here to illustrate further details therein.

FIG. 2 shows an enlarged image of exemplary scene 200 to illustrate further details therein. Scene 200 is associated with raw electronic data having multiple image regions; each of these image regions has certain image characteristics and/or subspaces that may cause the image to benefit from nonlinear, spatially varying and/or optimized processing as described hereinbelow. Such image characteristics and/or subspaces may be divided into broad categories including signal, noise and spatial categories. The signal category may include image characteristics or subspace attributes such as color saturation, dynamic range, brightness and contrast. The noise category or subspace may include image characteristics such as fixed-pattern noise ("FPN"), random noise and defect pixels. The spatial category or subspace may include image characteristics such as sharpness of transitions and edges, aliasing, artifacts (e.g., ghosting), depth of field ("DOF") or range, texture and spatial detail (i.e., spatial frequency content). Other categorizations or subspace definitions are possible within the scope of this disclosure, and other or fewer image characteristics listed above may be within each category.

A number of the aforementioned image characteristics now are discussed in association with scene 200. For example, a sky area 210 of scene 200 has very little spatial detail; that is, such areas have mostly low spatial frequency content, little high spatial frequency content and low contrast. Clouds 220 may have only a small amount of spatial detail. Certain areas or objects in the scene have very high spatial detail but low contrast; that is, such areas have information at low through high spatial frequencies, but intensity differences with respect to a local background are low. For example, in scene 200, grass 230 that is in a shadow 240 cast by a fence 250 has high spatial detail but low contrast. Other areas or objects of scene 200 have very high spatial detail and very high contrast; that is, such areas have information throughout many spatial frequencies, and intensity differences with respect to local background are high. A sun 260 and a fence 250 in scene 200 are examples of high spatial frequency, high contrast areas. Still other areas or objects of scene 200 may saturate the detector; that is, intensity or color of such objects may exceed the detector's ability to differentiate among the intensities or colors present in the object. The center of sun 260 is one such object that may saturate the detector. Certain areas or objects, such as the checkerboard pattern of the weave of a basket 270 of a hot air balloon 280, have moderate amounts of spatial detail and low contrast; that is, such areas have information at low through moderate spatial frequencies, with low intensity differences with respect to local background. Scene 200 may be dark (e.g., image regions with low intensity information) if it is captured by system 100 at night. Still other regions of scene 200 may include regions that have similar levels of spatial detail as compared to each other, but may vary in color, such as color bands 285 of hot air balloon 280.

The aforementioned areas of a digital image of a scene (e.g., scene 200) may be processed by nonlinear and/or spatially varying methods discussed herein. Such processing may be performed instead of or in addition to global processing of images utilizing linear processing, which processes an entire image in a single fashion. For example, in the context of the present disclosure, global linear processing may be understood to mean the application of one or more linear mathematical functions applied unchangingly to an entire image. A linear mathematical operation may be defined as an operation that satisfies the additivity property (i.e., $f(x+y)=f(x)+f(y)$) and the homogeneity property (i.e., $f(\alpha x)=\alpha f(x)$ for all $\alpha$). For example, multiplication of all pixels by a constant value, and/or convolution of pixels with a filter kernel, are linear operations. Nonlinear operations are operations that do not satisfy at least one of the additive and homogeneity properties.

Due to large variations in the characteristics of many images, global linear processing may not produce an acceptable result in all areas of the image. For example, a linear global operation may operate upon image areas containing moderate spatial frequency information but may "overprocess" areas containing low or high spatial frequency information. "Overprocessing" occurs when a linear process applied to an entire image adds or removes spatial frequency information to the detriment of an image, for example according to a viewer's perception. Overprocessing may occur, for example, when a spatial frequency response of a linear process (e.g., a filter kernel) is not matched to an image characteristic of an area being processed. A spatially varying process is a process that is not applied to the entire set of pixels uniformly. Both linear and nonlinear processes may be applied as a spatially varying process or spatially varying set of processes. The application of nonlinear and/or spatially varying image processing may lead to simplification of image processing since "smart" localized, possibly nonlinear, functions may be used in place of global linear functions to produce more desirable image quality for human perception, or objectively improved task specific results for task-based applications.

Figure 3:
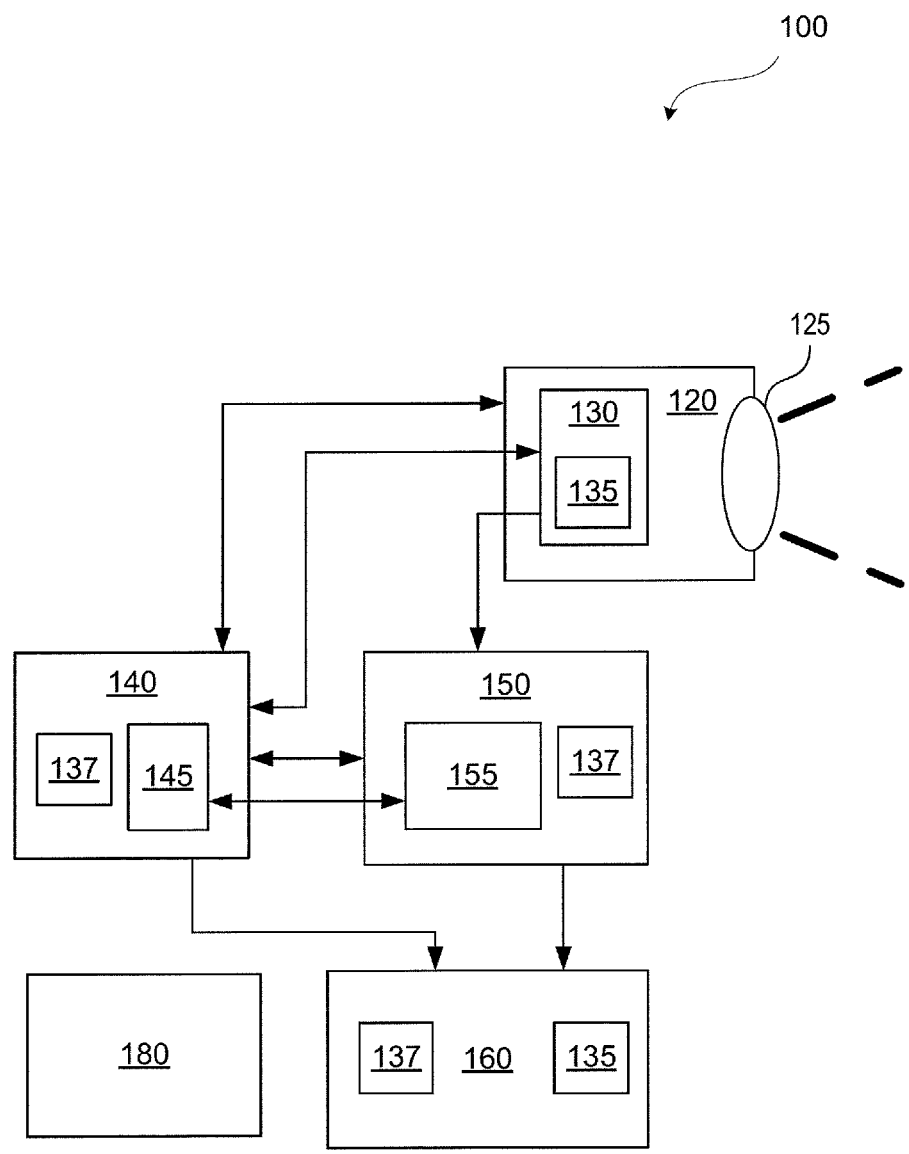
FIG. 3 is a diagrammatic illustration of components and connectivity within the imaging system of FIG. 1, in accordance with an embodiment.

FIG. 3 shows exemplary components and connections of imaging system 100. Imaging system 100 includes an image capturing subsystem 120 having optics 125 and a detector 130 (e.g., a CCD or CMOS detector array) that generates electronic data 135 in response to an optical image formed thereon. Optics 125 may include one or more optical elements such as lenses and/or phase modifying elements, sometimes denoted as "wavefront coding ("WFC") elements" herein. Information regarding phase modifying elements and processing related thereto may be found in U.S. Pat. Nos. 5,748,371; 6,525,302, 6,842,297, 6,873,733, 6,911,638, 6,940,649, 7,115,849 and 7,180,673, and U.S. Published Patent Application No. 2005/0197809A1, each of which is incorporated by reference herein. The phase modifying elements modify wavefront phase to introduce image attributes such as a signal space, a null space, an interference subspace, spatial frequency content, resolution, color information, contrast modification and optical blur. Put another way, the phase modifying elements may modify wavefront phase to predeterministically affect an optical image formed by optics 125. A processor 140 executes under control of instructions stored as software 145. Imaging system 100 includes memory 150 that may include software storage 155; software stored in software storage155 may be available to processor 140 as software 145 upon startup of system 100.

Software 145 generally includes information about image capturing subsystem 120, such as for example lens or phase function prescriptions, constants, tables or filters that may be utilized to tailor image acquisition or processing performed by system 100 to the physical features or capabilities of image capturing subsystem 120. It may also include algorithms, such as those described herein, that enhance image quality. Processor 140 interfaces with image capturing subsystem 120 to control the capture of electronic data 135; upon capture, electronic data 135 may transfer to processor 140 or to memory 150. Processor 140 and memory 150 thereafter cooperate to process electronic data 135 in various ways as described further herein, forming processed electronic data 137.

Processor 140 and memory 150 may take a variety of physical forms. The arrangement shown in FIG. 3 is illustrative, and does not represent a required physical configuration of the components; nor does it require that all such components be in a common physical location, be contained in a common housing or that the connections shown be physical connections such as wires or optical fiber. For example, processor 140 and memory 150 may be portions of a single application-specific integrated circuit ("ASIC") or they may be separate computer chips or multiple chips; they may be physically located in a device that includes image capturing subsystem 120 or in a separate device, with physical or wireless links forming certain of the connections shown in FIG. 3. Similarly, it is appreciated that actions performed by components of system 100 may or may not be separated in time, as discussed further below. For example, images may be acquired at one time, with processing occurring substantially later. Alternatively, processing may occur substantially in real time, for example so that a user can promptly review results of a processed image, enabling the user to modify image acquisition and/or processing parameters depending on the processed image.

Raw or processed electronic data may be transferred to an optional display device 160 for immediate display to a user of system 100. Additionally or alternatively, raw electronic data 135 or processed electronic data 137 may be retained in memory 150. Imaging system 100 may also include a power source 180 that connects as necessary to any of the other components of imaging system 100 (such connections are not shown in FIG. 3, for clarity of illustration).

An imaging system 100 typically includes at least some of the components shown in FIG. 3, but need not include all of them; for example, an imaging system 100 might not include display device 160. Alternatively, an imaging system 100 might include multiples of the components shown in FIG. 3, such as multiple image capturing subsystems 120 that are optimized for specialized tasks, as described further herein. Furthermore, imaging system 100 may include features other than those shown herein such as, for example, external power connections and wired or wireless communication capabilities among components or to other systems.

Figure 4:
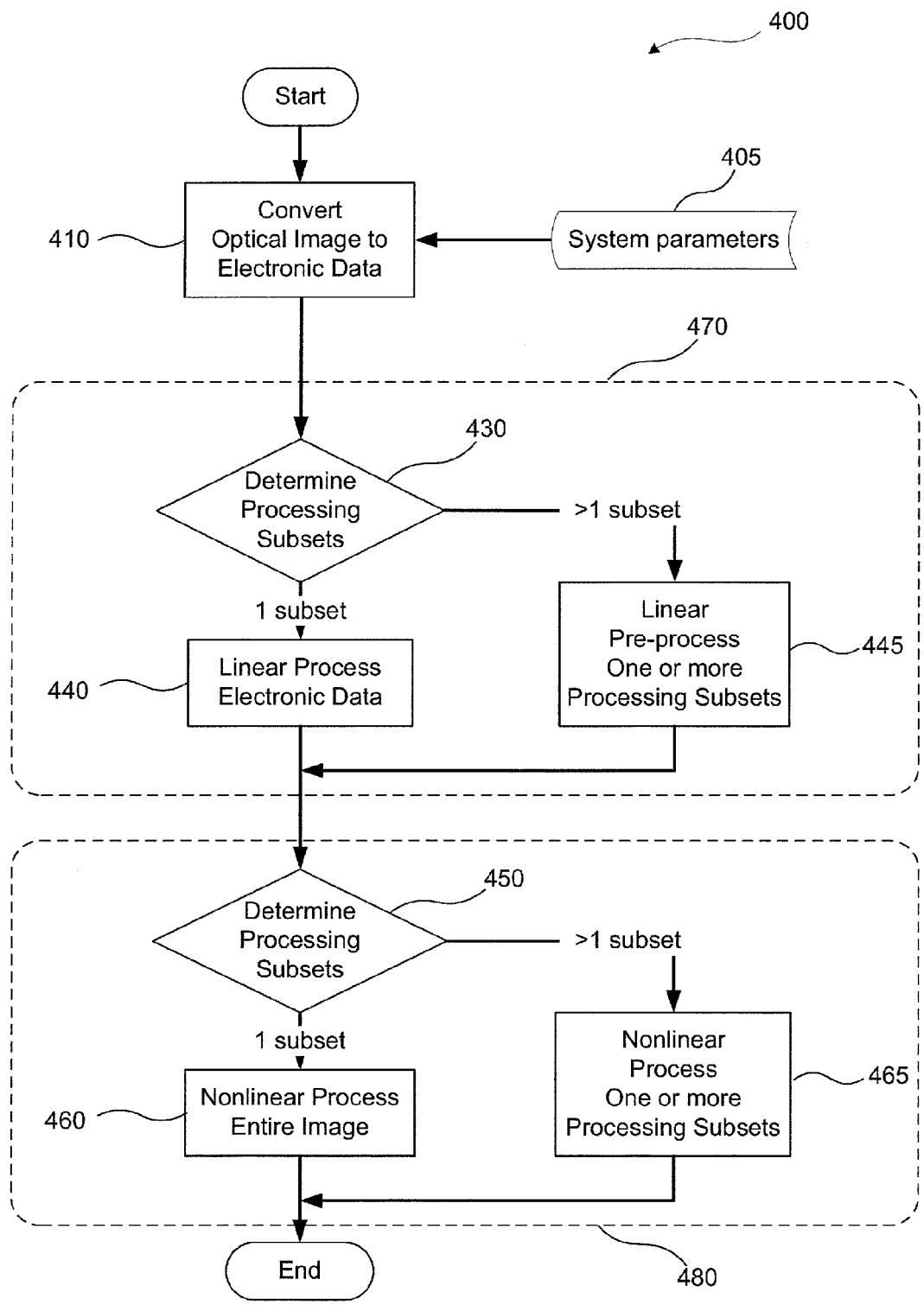
FIG. 4 is a flowchart illustrating a process performed by the imaging system of FIG. 1, in accordance with an embodiment.

FIG. 4 is a flowchart that shows a process 400 that may be performed by system 100 of FIG. 3. Step 410 converts an optical image to electronic data utilizing system parameters 405. Step 410 may be performed, for example, by optics 125 forming the optical image on detector 130, which in turn generates electronic data 135 in response to the optical image. System parameters 405 may include exposure times, aperture setting, zoom settings and other quantities associated with digital image capture. Step 430 determines data sets of the electronic data for linear processing, as described further below. Step 430 may be performed, for example, by processor 140 under the control of software 145; step 430 may utilize electronic data 135 or processed electronic data 137 (that is, step 430 and other processing steps herein may process electronic data as originally captured by a detector, or data that has already been processed in some way). Steps 440 or 445 perform linear processing or pre-processing of the electronic data or one or more data sets thereof, respectively, as determined by step 430. Steps 440 or 445 may be performed, for example, by processor 140 under the control of software 145, utilizing electronic data 135 or data sets thereof, respectively, as described further below. Step 450 determines data sets of the electronic data for nonlinear processing, as described further below. Step 450 may be performed, for example, by processor 140 under the control of software 145 and utilizing electronic data 135 or processed electronic data 137. Steps 460 or 465 perform nonlinear processing of electronic data 135, processed electronic data 137 or one or more data sets thereof, respectively, as determined by step 450. Steps 460 or 465 may be performed, for example, by processor 140 under the control of software 145, utilizing electronic data 135 or data sets thereof, respectively, as described further below. Steps 430, 440 and 445 may be considered as a linear processing section 470, and steps 450, 460 and 465 may be considered as a nonlinear processing section 480; processing sections 470 and 480 may be performed in any order and/or number of times in process 400. Furthermore, successive execution of processing sections 470 and 480 need not determine the same data sets as a first execution of sections 470 and 480; for example, a scene may first be divided into data sets based on color information and linearly processed accordingly, then divided into different data sets based on intensity information and linearly processed accordingly, then divided into different data sets based on contrast information and nonlinearly processed accordingly. When no further processing is needed, process 400 ends.

FIG. 5 through 9 illustrate examples of nonlinear and/or spatially varying image processing in accord with process 400, FIG. 4, through a set of icons that depict aspects of each example such as (a) input electromagnetic energy from an object, (b) optics, (c) electronic data and (d) processing representations. FIG. 10 illustrates specific changes in linescans that may be provided by different classes of phase modifying optics (see FIG. 24 for an explanation of linescans). In particular, FIG. 5 illustrates nonlinear processing with wavefront coding ("WFC") optics. Optics (e.g., optics 125, FIG. 3) for a system utilizing processing as shown in FIG. 5 are for example designed such that electronic data formed from an optical image (e.g., electronic data 135, FIG. 3) is suited to a particular type of nonlinear and/or spatially varying processing. In one example, the optics and processing are jointly optimized in a process that forms a figure of merit based on both the optics design and the signal processing design. In FIG. 5, icon 502 represents a spatial intensity linescan of electromagnetic energy emanating from an object as a square wave; that is, an object that forms a single perfect step function such as a black object against a white background or vice versa. Icon 504 represents specially designed WFC optics. Icon 506 represents a linescan from electronic data foamed from an optical image of the object represented by icon 502. Due to limitations of optics and a detector, the linescan from the electronic data does not have the vertical sides or sharp corners as shown in icon 502; rather, the sides are not vertical and the corners are rounded. However, the linescan from the electronic data is "smooth" and does not include additional "structure" as may sometimes be found in electronic data generated by WFC optics, such as for example oscillations or inflection points at transitions. In this context, "smooth" is understood to mean a linescan that varies substantially monotonically in response to an edge in an object being imaged, rather than a linescan that has added "structure," such as oscillations, at abrupt transitions (see also FIG. 10). Icon 508 represents nonlinear processing of the electronic data. Icon 510 represents a linescan from electronic data formed by the nonlinear processing, and shows restoration of the vertical sides and sharp corners as seen in icon 502.

FIG. 6 illustrates nonlinear processing, linear pre-processing and WFC optics. In FIG. 6, linear pre-processing generates partially processed electronic data that is suited to a nonlinear processing step. In FIG. 6, icon 512 represents a spatial intensity linescan of electromagnetic energy emanating from an object as a square wave. Icon 514 represents WFC optics. Icon 516 represents a linescan from electronic data formed from an optical image of the object represented by icon 512. The electronic data represented by icon 516 has additional structure as compared to icon 506, such as inflection points 516A, which may be due to effects of the WFC optics. Icon 518 represents a linear processing step (e.g., a linear convolution of the electronic data represented by icon 516, with a filter kernel). Processing represented by icon 518 may sometimes be referred to as "pre-processing" or a "pre-filter" herein. Icon 520 represents a linescan from electronic data formed by the linear processing represented by icon 518; the electronic data represented by icon 520 does not have the additional structure noted in icon 516. Icon 522 represents nonlinear processing of the electronic data represented in icon 520. Icon 524 represents a linescan from electronic data formed by the nonlinear processing, and shows restoration of the vertical sides and sharp corners as seen in icon 512.

FIG. 7 illustrates nonlinear processing, linear pre-processing and specialized WFC optics. In FIG. 7, optics (e.g., optics 125, FIG. 3) are designed to encode a wavefront of electromagnetic energy forming the image in a customizable way such that linear pre-processing of captured data (e.g., electronic data 135, FIG. 3) generates partially processed electronic data that is suited to a nonlinear processing step. Utilizing customizable wavefront coding and linear pre-processing may reduce processing resources (e.g., digital signal processor complexity and/or time and/or power required for processing) required by system 100 to produce electronic data. In FIG. 7, icon 530 represents a spatial intensity linescan of electromagnetic energy emanating from an object as a square wave. Icon 532 represents WFC optics that encode a wavefront of electromagnetic energy in a customizable way. Icon 534 represents a linescan from electronic data formed from an optical image of the object represented by icon 530. The electronic data represented by icon 534 is smooth and contains minimal additional structure. Icon 536 represents a linear processing step (e.g., a linear convolution of the electronic data represented by icon 534, with a filter kernel). The linear processing represented by icon 536 may for example be a moderately aggressive filter that tends to sharpen edges but is not so aggressive so as to add overshoot or undershoot to the edges; processing represented by icon 536 may also sometimes be referred to as "pre-processing" or "prefiltering" herein. Icon 538 represents a linescan from electronic data formed by the linear processing represented by icon 536 that is improved over the electronic data noted in icon 534, but does not have the vertical sides and sharp corners associated with the object represented by icon 530. Icon 540 represents nonlinear processing of the data represented in icon 538. Icon 542 represents a linescan from electronic data formed by the nonlinear processing, and shows restoration of the vertical sides and sharp corners as seen in icon 530.

FIG. 8 illustrates another example of nonlinear processing, linear pre-processing and specialized WFC optics. Like FIG. 7, in FIG. 8 optics (e.g., optics 125, FIG. 3) encode a wavefront of electromagnetic energy forming the image in a customizable way such that linear pre-processing of captured data (e.g., electronic data 135, FIG. 3) generates partially processed electronic data that is suited to a nonlinear processing step. Such customizable wavefront coding and linear pre-processing again reduces processing resources required by system 100 to produce electronic data. In FIG. 8, icon 550 represents a spatial intensity linescan of electromagnetic energy emanating from an object as a square wave. Icon 552 represents WFC optics that encode a wavefront of electromagnetic energy in a customizable way. Icon 554 represents a linescan from electronic data formed from an optical image of the object represented by icon 550. The electronic data represented by icon 554 is smooth and contains minimal additional structure. Icon 556 represents a linear processing step utilizing an aggressive filter that sharpens edges and adds overshoot and undershoot—that is, pixel values above and below local maxima and minima, respectively—to the edges. Processing represented by icon 556 may also sometimes be referred to as "pre-processing" or "prefiltering" herein. Icon 558 represents a linescan from electronic data formed by the linear processing represented by icon 556; it has steep sides and overshoot 558A and undershoot 558B at edges. Icon 560 represents nonlinear processing of the data represented in icon 558, to eliminate overshoot and undershoot as further described below. Icon 562 represents a linescan from electronic data formed by the nonlinear processing, and shows restoration of the vertical sides and sharp corners as seen in icon 530, without the overshoot and undershoot of icon 558.

Figure 9:
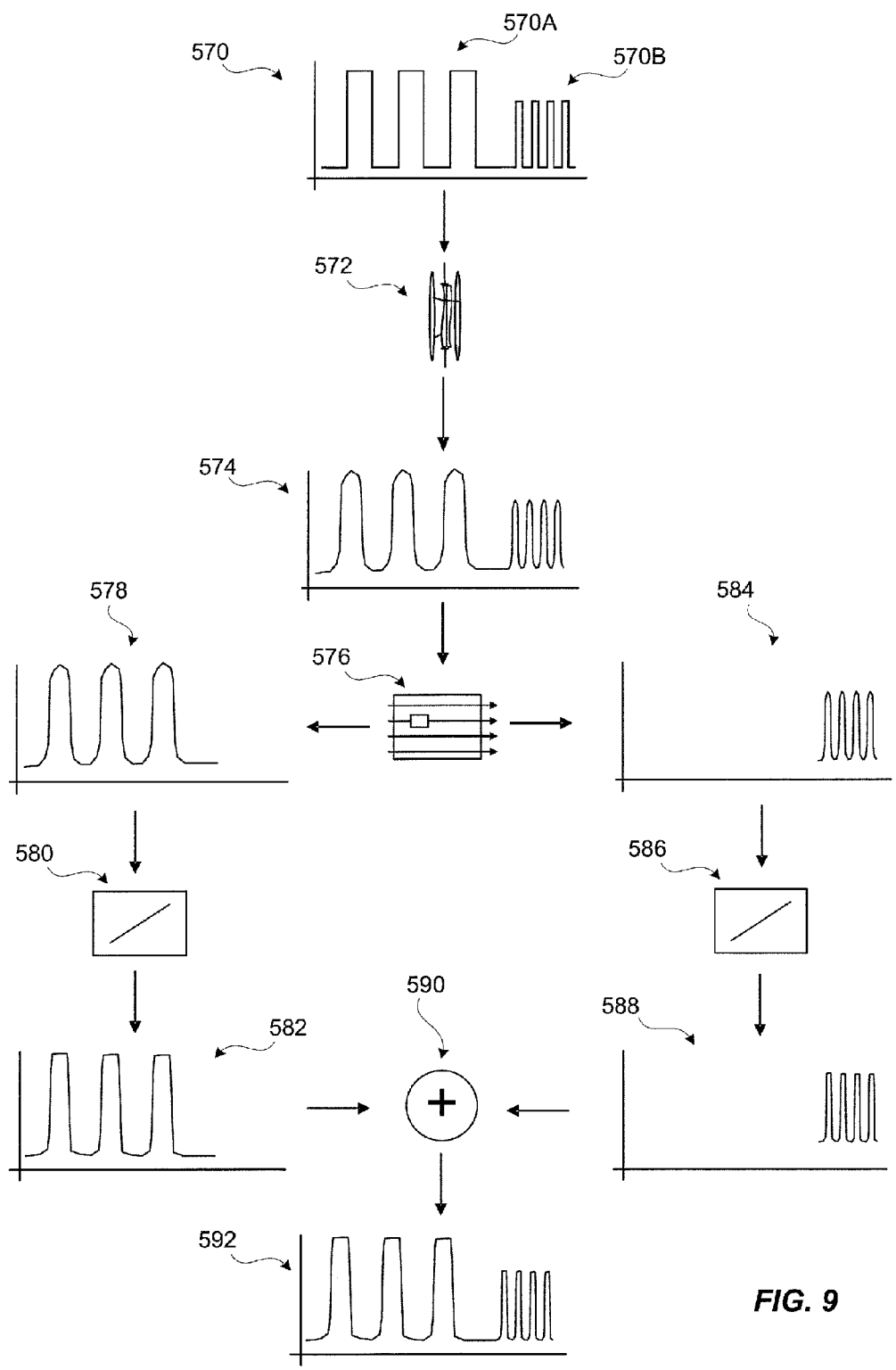
Figure 10:
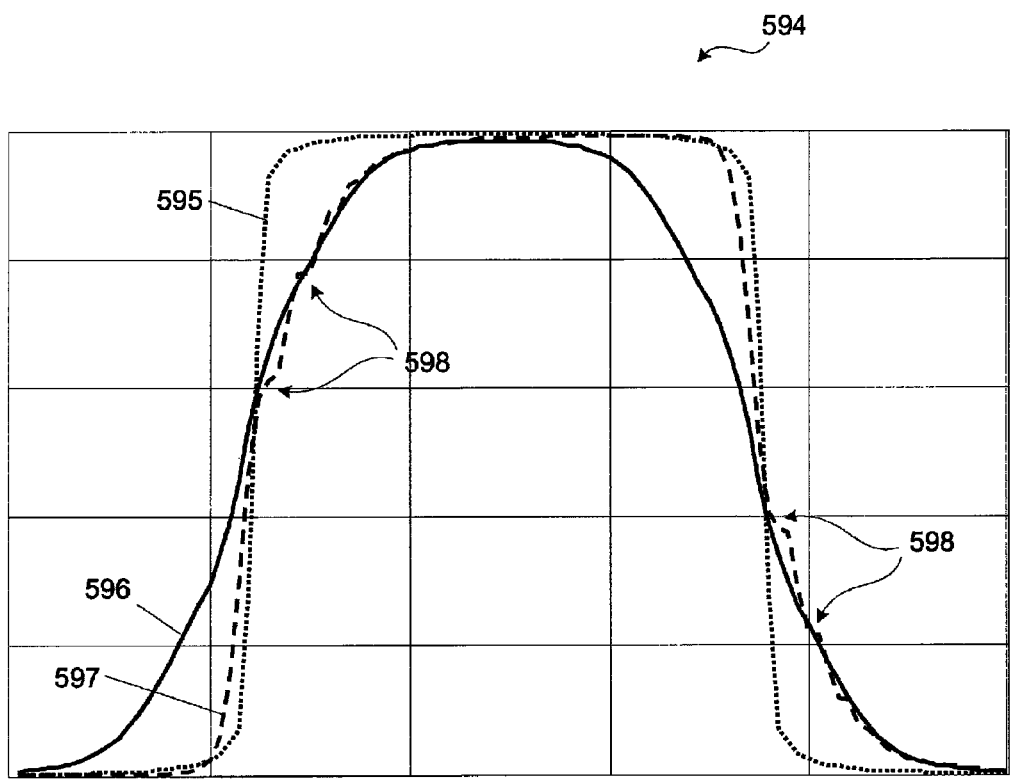
FIG. 10 shows a plot of calculated linescans from an exemplary imaging system.

FIG. 9 illustrates spatially varying processing and WFC optics. In FIG. 9, spatially varying processing generates processed electronic data that emphasizes differing dominant spatial frequency content as it occurs in differing regions of a captured image. In FIG. 9, icon 570 represents a spatial intensity linescan of electromagnetic energy emanating from an object as a square wave; one spatial region 570a of the object has dominant content at a lower spatial frequency while another spatial region 570b has dominant content at a higher spatial frequency. Icon 572 represents WFC optics. Icon 574 represents a linescan from electronic data formed from an optical image of the object represented by icon 570. The electronic data represented by icon 574 has rounded corners which may be due to effects of the WFC optics. Icon 576 represents a process that identifies spatial frequency content of an image and splits the image into data sets that are dependent on the content, as described further below. Icons 578 and 584 represent linescans from data sets of the electronic data, corresponding to the regions with lower and higher spatial frequency content respectively. Icons 580 and 586 represent linear processing steps (e.g., linear convolutions of the electronic data represented by icons 578 and 584, with respective filter kernels). Icons 582 and 588 represent linescans from electronic data formed by the linear processing associated with icons 580 and 586. The electronic data for each of the data sets has been sharpened with a filter tailored to its specific spatial frequency content. Icon 590 represents merging the data represented by icons 582 and 588. Icon 592 represents a linescan from electronic data formed by the merging operation; although the data does not have vertical edges and perfectly sharp corners, additional (nonlinear) processing may take place either before or after the merging step represented by icon 590 to further improve the quality of the image.

FIG. 10 shows a plot 594 of linescans from a hypothetical imaging system. As in FIGS. 5-8, an object (not shown) that produces the linescans shown in plot 594 is characterized by a step function amplitude variation; that is, it has vertical sides. Linescan 595 represents data from an imaging system utilizing no wavefront coding; linescan 596 represents data from an imaging system utilizing cosine function-based wavefront coding; and linescan 597 represents data from an imaging system utilizing cubic function-based wavefront coding. Linescan 595 shows "smoothing" of the object shape due to optics of the system without wavefront coding. Linescan 596 shows even more "smoothing" due to the cosine wavefront coding function. Linescan 597 shows more structure, indicated as kinks and steps at locations 598, than either linescan 595 or linescan 596, due to the cubic wavefront coding function (only obvious instances of structure at locations 598 are labeled in FIG. 10, for clarity of illustration). Added structure may make processing more complicated, and/or may lead to unintended results (e.g., structure may be "misunderstood" by a processor as part of an image, as opposed to an artifact introduced by optics). Therefore, processing of electronic data may benefit from modifications that remove or modify structure generated by imaging with optics that utilize wavefront coding.

Spatially Varying Processing I—Region Identification

Processing of a scene (e.g., scene 200) may segment raw or processed electronic data associated with the scene in accordance with a defined set of pixels, with a boundary of an object that exists in the digital image of the scene, or with characteristics present in regions of a digital image of the scene. That is, spatially varying, or content-optimized, processing bases decisions about processing to be employed on information present in electronic data of an optical image being processed. The following discussion relates to ways in which the information in the electronic data is utilized to decide what processing will be employed.

Figure 11:
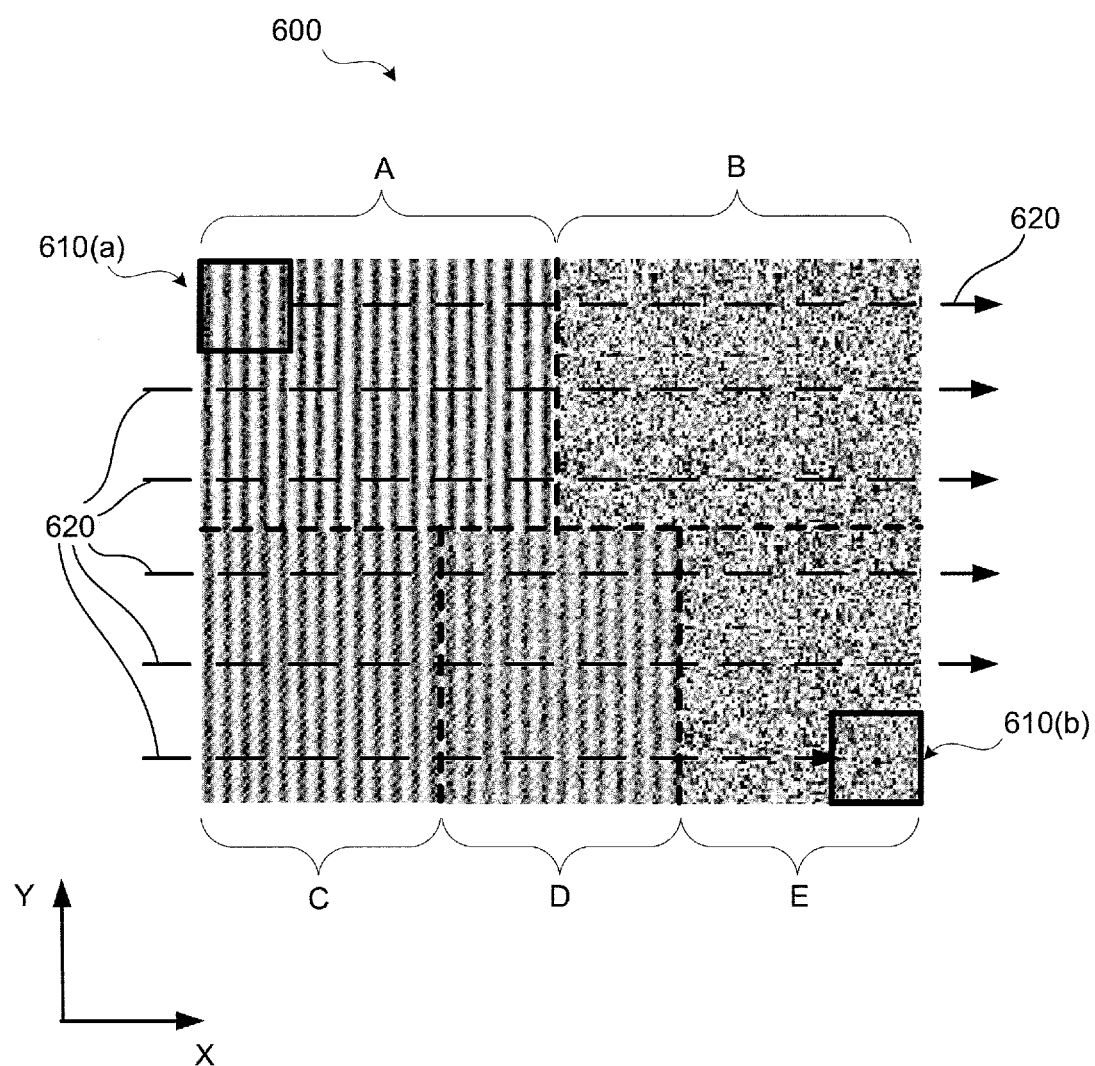
FIG. 11 shows an image of an object that includes a plurality of object regions having differing object characteristics.

FIG. 11 shows an image 600 of an object that includes regions labeled A, B, C, D and E, respectively, each of which has a different characteristic. Image 600 exists in the form of electronic data in a system 100 (for example, after detector 130, FIG. 3, converts electromagnetic energy from the object into the electronic data 135). An identification subset 610, shown as subset 610(a) and 610(b) as explained below, can be utilized to evaluate image 600 and determine regions therein that have differing characteristics that might benefit from one particular form or degree of processing. Identification subset 610 is a selected set of image pixels that "moves" over image 600 in the direction of arrows 620. That is, identification subset 610 may first select the pixels contained in subset 610(a) and process these pixels to evaluate image content such as, but not limited to, power content by spatial frequency, presence of edges, presence of colors and so forth. Information related to the characteristics found in subset 610(a) may be associated with the location of subset 610(a) within image 600, and optionally stored for further use. Another location is then chosen as a new identification subset 610. As shown by arrows 620, each such location may be processed to evaluate characteristics such as power content by spatial frequency, presence of edges, presence of colors and so forth. Relative locations at which identification subsets 600 are chosen may be selected according to a level of resolution desired for identification of characteristics in image 600; for example, identification subsets 610 may overlap in each of the X and Y axes as shown in FIG. 11, or subsets 610 may abut each other, or subsets 610 may be spaced apart from each other (e.g., such that the area of image 600 is only sampled rather than fully analyzed).

Once a final identification subset 610, shown for example as subset 610(b) in image 600, is processed, characteristics of the subsets 610 thus sampled are utilized to identify regions of image 600 that have similar characteristics. Regions that have similar characteristics are then segmented, that is defined as data sets for specific processing based on the similar characteristics. For example, as discussed further below, if the processing of identification subsets 610 detects spatial frequencies that are prominent within certain regions of an object, further processing may generate a filter that removes blurring from only those spatial frequencies. When image 600 is processed as described above, identification subsets that sample region A may detect power at a horizontal spatial frequency related to the vertical lines visible in section A. Identification subsets that sample region B may also detect power at the same spatial frequency, but depending on parameters of the identifying algorithm may not select the spatial frequency for processing because power at the dominant spatial frequency is comparable to noise present in region B. Identification subsets that sample region C may detect power at two horizontal and one vertical spatial frequencies. Identification subsets that sample region D may detect power associated with at least the same horizontal spatial frequency as identified in region A, but may not detect the second horizontal spatial frequency and the vertical spatial frequency due to the high noise content of region D. Identification subsets that sample region E may detect power at the same horizontal spatial frequency as identified in regions A and C, but may not detect the secondary horizontal and vertical spatial frequencies and may even fail to detect the main horizontal spatial frequency due to the high noise content of region E.

This process of rastering a square identification subset through an image (along an X-Y grid to segment and identify data sets with common characteristics) may be accomplished in different ways. For example, the identification subset need not be square but may be of another shape, and may move through the image along any path that provides sampling of the image, rather than the raster scan described. The identification subset need not be a contiguous selection of electronic data; it may be a single element of the electronic data or one or more subsets thereof; it may be sparse, and may also be a mapping or indexing of independent, individual elements of the electronic data. Furthermore, sampling may be optimized to find features of potential interest quickly, so as to spend further processing resources adding detail to the features of interest. For example, a sparse sample of an image may first be processed as initial identification subsets, and further identification subsets may be processed only in areas where the characteristics of the initial identification subsets suggest image content of interest (e.g., processing resources may thereby be concentrated on a lower part of a landscape image that has features, as opposed to an upper part of the same image where initial identification subsets reveal only a featureless blue).

Electronic data may be generated by a detector as an entire image (which may be called "a full frame" herein) or may be generated in blocks that are less than the entire image. It may be buffered and temporarily stored. Processing of the electronic data may occur sequentially or in parallel with the reading, buffering and/or storing of the electronic data. Thus, not all electronic data has to be read prior to processing; neither does all electronic data have to be "identified" into data sets prior to processing. It may be advantageous for Fourier and wavelet processing techniques to read electronic data as a full frame, and then to process the entire image at one time. For processing techniques that may use subsets of the data, it may be advantageous to read in blocks that are less than full frames, and subsequently process the data sets in parallel or in series.

Figure 12:
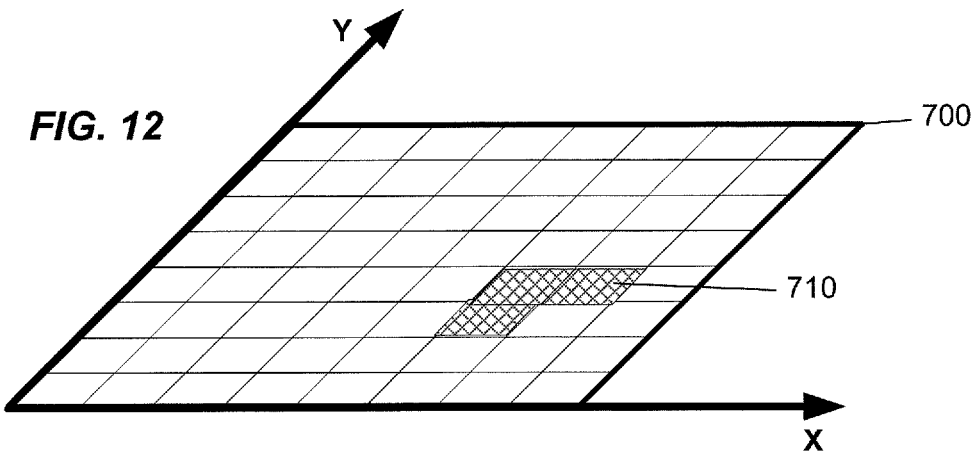
FIGS. 12, 13 and 14 illustrate exemplary approaches to segmentation of an image into pixel blocks based upon defined sets of pixels, in accordance with an embodiment.
Figure 13:
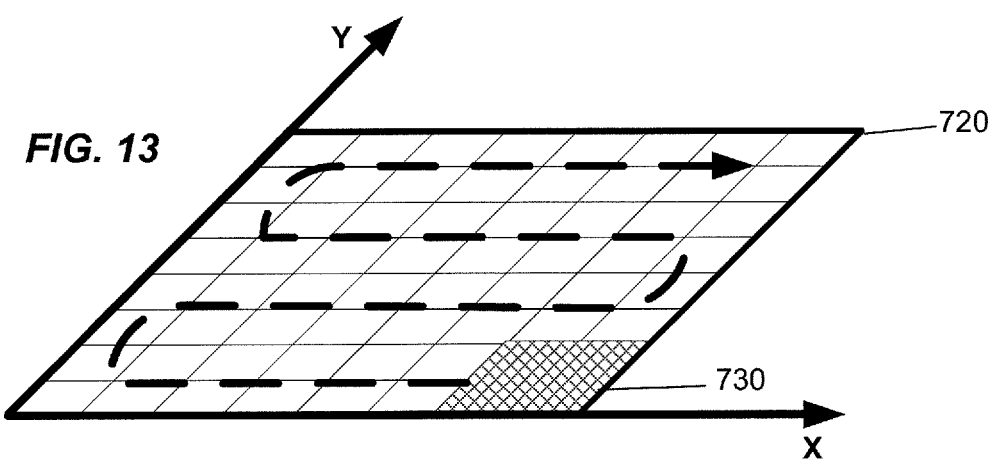
Figure 14:
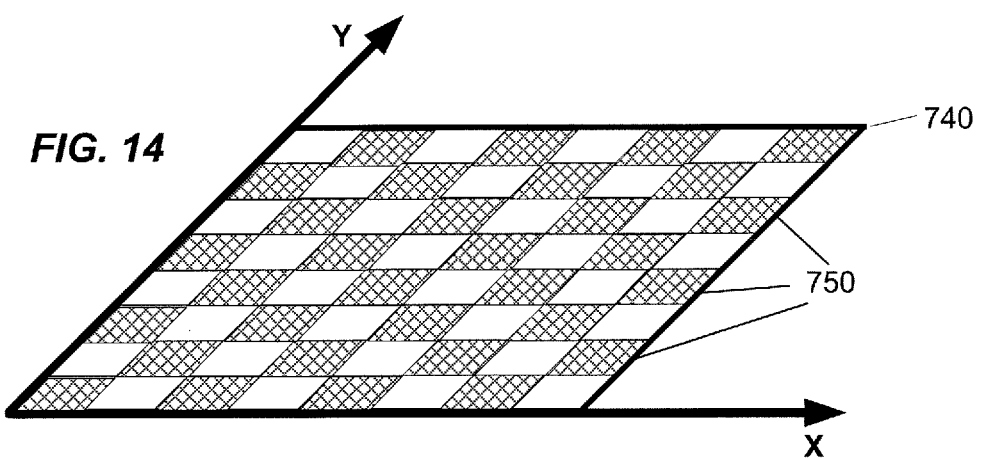

FIGS. 12, 13 and 14 further illustrate three approaches to segmentation of an image based upon defined sets of pixels. In FIG. 12, a plane 700 shows an irregular block 710 of three pixels that is at a fixed location in plane 700. Block 710, for example, may be a result of segmentation of a saturated region (see for example FIG. 15 and FIG. 16). Alternatively, a user may define a fixed set of set of pixels like block 710 as a region of interest for processing. For example, electronic data in corners of a rectangular or square shaped image may be processed differently than electronic data in a central region due to variation in desired performance or image quality in the corners compared to the center of the image. Electronic data in regions of a rectangular or an arbitrarily shaped image may be processed differently than electronic data in other regions of the image due to predeterministic variations in the optical image content, where the variation in image content is dictated or controlled by a predeterministic phase modification, illumination conditions, or uniform or nonuniform sampling structure or attributes of the sampling that vary across the image.

FIG. 13 shows a plane 720 with a 2×2 pixel block 730 that may be scanned in a raster-like fashion across the entire set of pixels included in plane 720 (e.g., pixel block 730 may be considered as an example of identification subset 610, FIG. 11). Scanning of pixel blocks may be utilized to identify segments that may benefit from specific processing; that is, the processing varies spatially according to image content, as further discussed below. In FIG. 14, a plane 740 shows evenly spaced selected pixels 750, represented by hatched areas (for clarity, not all selected pixels are labeled). Non-contiguous pixels 750 may be selected by sampling, for example utilizing 50% sampling as shown, or may be selected utilizing Fourier or wavelet decomposition. Such samplings may for example provide information at certain spatial frequencies for an entire image or for portions thereof. Segments may alternatively be formed from square N×N blocks of pixels or from irregular, sparse, contiguous or discontinuous blocks of pixels, or individual samples of the electronic data. For example, finding a minimum or maximum data value in electronic data of an image is an example of using 1×1 sized blocks or individual samples as an identification subset.

Although shown as specific numbers of pixels, pixels or pixel blocks 710, 730 and 750 may include a different number of pixels, from one to the entire size of an image or an image set (e.g., up to a size of each image frame, multiplied by a number of frames in an image set). Segments do not have to be square or rectangular convex polygons (e.g., pixel block 730) but may be concave polygons (e.g., pixel block 710) or sparse samplings. Furthermore, a segment containing more than a single pixel may be further modified by weighting or further subsampling of the pixels within that segment, such as described below in connection with FIGS. 17-19.

Segmentation may be based upon boundaries of objects that exist in a digital image of a scene. For example, the Sobel, Prewitt, Roberts, Laplacian of Gaussian, zero cross, and Canny methods may be utilized to identify edges of objects.

Template matching, textures, contours, boundary snakes, and data flow models may also be used for segmentation.

Segmentation may also be performed on the basis of characteristics such as intensity or color. FIG. 15 shows an object (sun 260 from scene 200, FIG. 2) superimposed onto a set of pixels 800. In this example, a thresholding operation is applied to values of each of pixels 800 to form data sets. A three level thresholding operation is for example used to form the data sets by dividing pixels 800 into data sets having three different intensity levels. FIG. 16 shows pixels 800 segregated into data sets according to thresholding of sun 260 as shown in FIG. 15. A first data set, shown by densely hatched pixels 810, may include all pixels with values over 200 counts. A second data set, shown by lightly hatched pixels 820, may include all pixels with values between 100 and 200 counts. A third data set, shown by white pixels 830, may include all pixels with values less than 100 counts. Alternatively, by further applying one of the edge detection algorithms listed above, or another edge detection algorithm, boundaries of sun 260 may be determined.

Segmentation and/or weighting may also be performed in accordance with characteristics of a detector, optics, a wavefront coding element, and/or an image. With regard to the image, segmentation may be based upon boundaries of an imaged object, or the image's color, texture or noise characteristics. With regard to the detector, segmentation may be based upon a periodicity of FPN of the detector, or in relation to aliasing artifacts. With regard to a wavefront coding element and optics, segmentation may be based upon stray light issues, ghosting, and/or a practical extent of a point spread function ("PSF") of the imaging system. For example, when optics provide known stray light or ghosting patterns, knowledge of such patterns may be utilized as a basis for segmentation or weighting.

Figure 17:
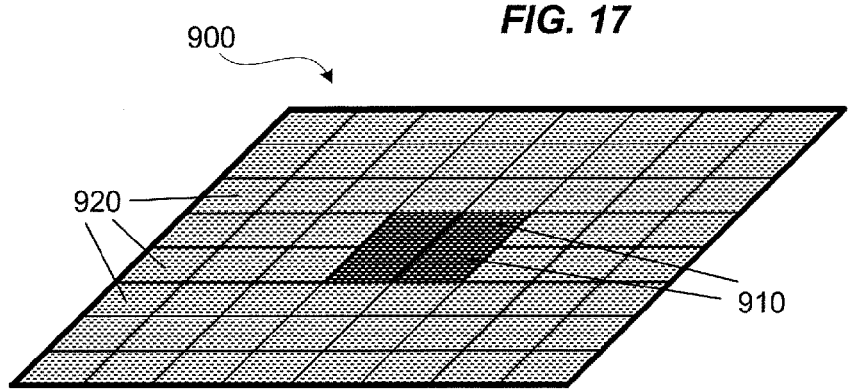
FIGS. 17, 18 and 19 illustrate pixel blocks that have been weighted or segmented, in accordance with an embodiment.
Figure 18:
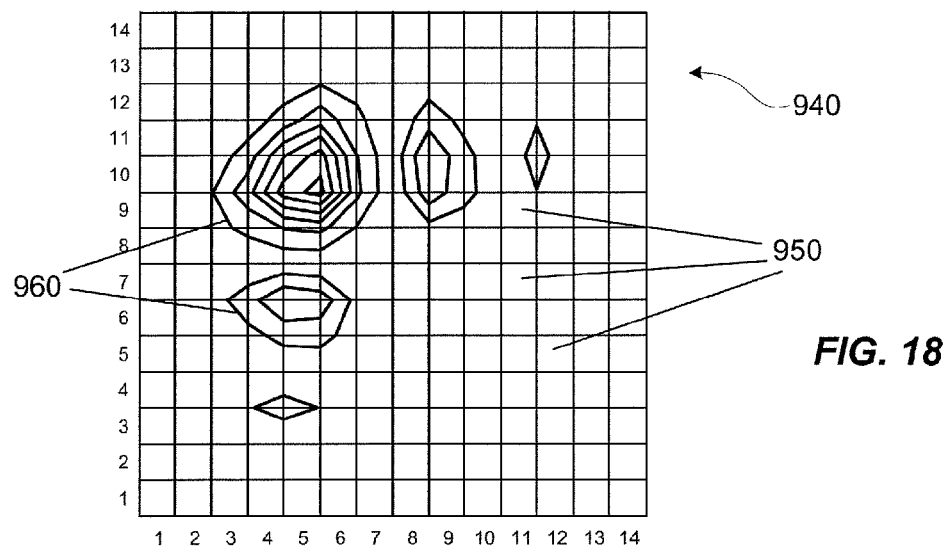
Figure 19:
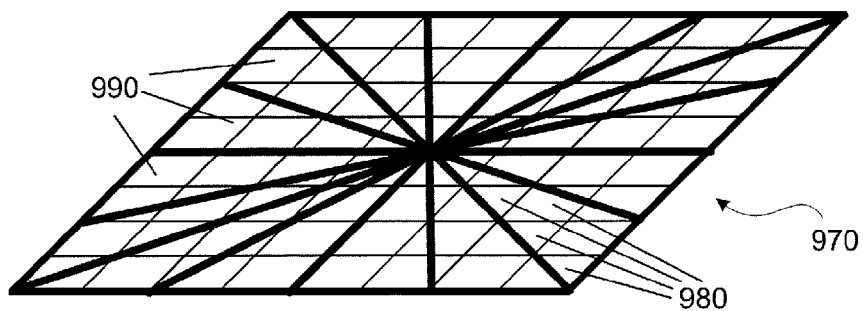
Figure 22:
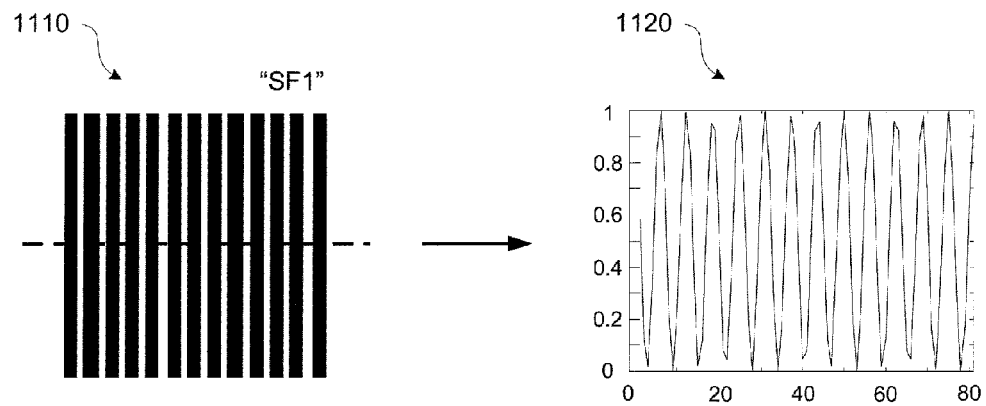
FIGS. 22-24 show line plot representations of optical intensity and/or electronic data magnitude as a function of spatial location for different objects, in accordance with an embodiment.
Figure 23:
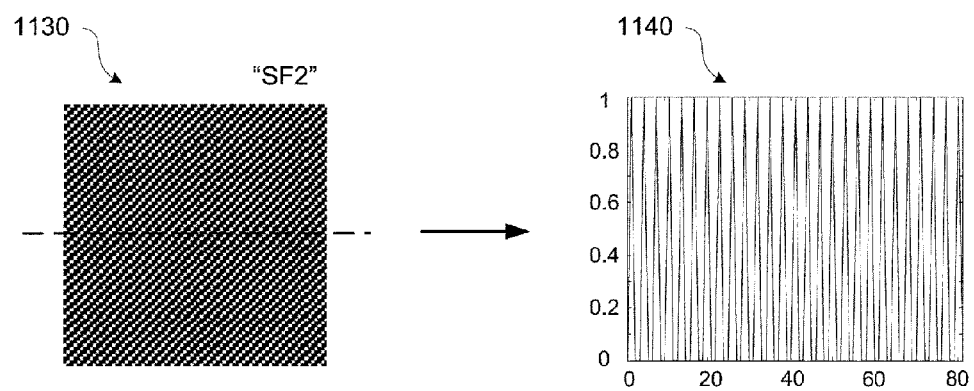

FIGS. 17, 18 and 19 illustrate pixel blocks that are weighted or segmented. In FIG. 17, pixel block 900 includes an 8×8 array of pixels. A center 2×2 block of pixels 910 (represented as densely hatched pixels) is weighted with a value of 1.0, with all other pixels 920 (represented as lightly hatched pixels) weighted with a value of 0.5. Pixel block 900 may correspond, for example, to block 730, FIG. 13; this weighting is synonymous with selecting a window shape for segmenting a region. Other window shapes that may be utilized include rectangular, Gaussian, Hamming, triangular, etc. Windows may not be restricted to closed contours. A weighting of pixels such as shown in FIG. 17 may be useful for weighting pixels based upon proximity to a central pixel of a pixel block. Alternatively, pixel weights may vary in a Gaussian-like form with a normalized value of 1.0 at a central pixel or vertex and decreasing to zero at a boundary of the pixel block. Such weighting may reduce "blocking" artifacts wherein identification subsets define sharp boundaries that are processed accordingly. In FIG. 18, pixel block 940 is a 14×14 block of pixels 950 that includes 95% or more of an integrated intensity of a PSF of an optical system, as represented by contour lines 960. Since a PSF may not equal exactly zero at a particular place, contour lines 960 indicate arbitrary levels of magnitude in the PSF, and segmentation or weighting of pixels 950 may be based on such levels. In FIG. 19, pixel block 970 shows segmentation of pixels 980 (square areas bounded by lighter lines) into a plurality of polar or radial segments 990 (wedges bounded by heavier lines). Polar segmentation may be useful when working with images that contain radially organized features, such as images of irises. Segmentation may also be based upon the "directionality" of an image or set of images. Directionality may include "directions of motion" in time, space, contrast, color, etc. For example, in a series of related images, segmentation may be based upon motion of an object, in space and/or time, as recorded in the series of images. Segmentation of an image based upon a direction of motion of color may include segmenting an image based upon the spatially vary hue in an image (e.g., an image of the sky may vary from a reddish color near the horizon to a bluish color near the zenith, and the image may be segmented with respect to this variation).

Spatially Varying Processing—Processing Determination

An example of determining processing from regions of an input image, such as may be used in spatially varying processing, is now discussed. FIG. 20 shows two objects 1010 and 1020 that each include dark vertical lines; object 1020 also includes light gray diagonal lines. FIG. 21 shows an image "key" 1030 having five image sections A through E, with image regions A and B falling within an upper part of key 1030 and image sections C, D, E falling within a lower part of key 1030.

An optical system including WFC optics and a plurality of detectors images objects 1010 and 1020. The WFC optics introduce effects that extend the depth of field of but may be processed out of electronic data to varying degrees to render a processed image; in particular, a degree to which the effects are altered may be based on characteristics present in the image(s) obtained therewith. In this example, the system includes a plurality of detectors that affect the captured images (although it is appreciated that effects similar to those described below could be produced by varying, for example, lighting of objects 1010 and 1020). A detector that images object 1010 introduces relatively low noise in image section A shown in key 1030. Another detector introduces extreme noise in image section B. A detector that images object 1020 introduces low noise in image section C, moderate noise in image section D, and extreme noise in image section E. Resulting detected electronic data, without processing, of objects 1010 and 1020 is illustrated as image 600, FIG. 11.

Figure 24:
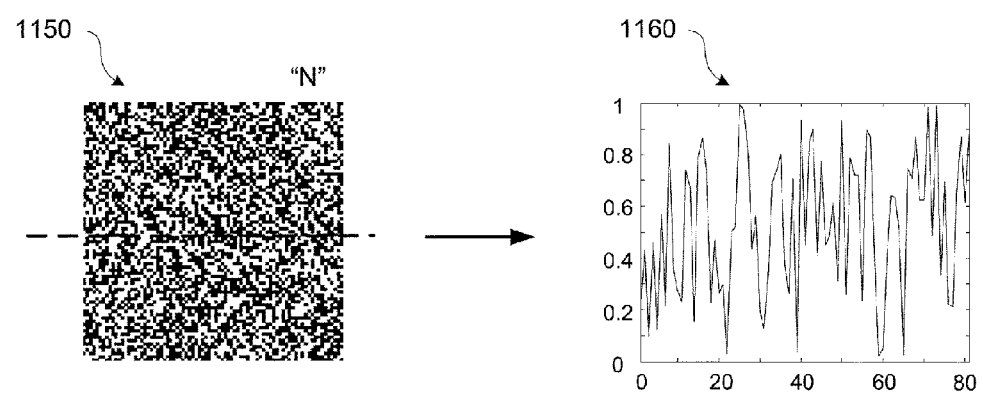

Line plots demonstrating optical intensity and/or electronic data intensity are useful in understanding the processing of image 600. FIG. 24 illustrates how line plots (also sometimes called "linescans" herein) may be utilized to represent optical intensity and/or electronic data magnitude as a function of spatial location. Heavy bars at a first spatial frequency "SF1," as shown in image 1110, produce wide peaks and valleys in a corresponding line plot 1120 of optical intensity along the dashed line in image 1110. Narrower bars at a second spatial frequency "SF2," as shown in image 1130, produce correspondingly narrow peaks and valleys in a corresponding line plot 1120. Random noise "N," as shown in image 1150, produces an erratic line plot 1140. It is appreciated that when a line plot is utilized in connection with an optical image, the vertical axis corresponds with intensity of electromagnetic energy that is present at a specific spatial location. Similarly, when a line plot is utilized in connection with electronic data, the vertical axis corresponds with a digital value of intensity or color information present within the electronic data, such as for example generated by a detector.

Electronic data of objects may be expressed mathematically as an appropriate sum of spatial frequency information and noise, for example spatial frequencies SF1, SF2 and noise N as shown in FIG. 24. Detected electronic data may also be expressed as a convolution of object data with a point spread function ("PSF") of WFC optics, and summed with the N data weighted according to whether a section is imaged with a detector that adds low noise, moderate noise or extreme noise. Alternatively, an amplitude of the signals may be decreased (e.g., due to decreased illumination) while detector noise remains constant. Processed electronic data may be expressed as a convolution of the detected electronic data with a filter that reverses effects such as the PSF of the WFC optics, and/or sharpens spatial frequencies that characterize the detected electronic data, as described further below. Therefore, given the above description of electronic data present in sections A through E of image 600, formulas describing the object, detected electronic data, and processed electronic data are be summarized as in TABLE 1 below.

only peaks at the dominant spatial frequencies remain. Next, the process builds an appropriate filter 1260 that sharpens the dominant spatial frequencies (filter 1260 is shown in frequency space, though it may be visualized in spatial terms, as in box 1250). Therefore, filter 1260 processes the electronic data for the dominant spatial frequencies. Filter 1260 has identifiable features that correspond to the dominant spatial frequencies in the power spectrum estimate. Finally, filter 1260 is applied to the detected image, resulting in a processed

TABLE 1

Mathematical expressions for signal frequency information and noise of an example where * denotes multiplication and ** denotes convolution.

| Image region | Object electronic data | Detected electronic data | Processed electronic data |
|---|---|---|---|
| A | 1 * SF1 + 0 * SF2 | ((1 * SF1 + 0 * SF2)**PSF) + 0.5 * N | (((1 * SF1 + 0 * SF2)**PSF) + 0.5 * N) **Filter(a) |
| B | 1 * SF1 + 0 * SF2 | ((1 * SF1 + 0 * SF2)**PSF) + 10 * N | (((1 * SF1 + 0 * SF2)**PSF) + 10 * N) **Filter(b) |
| C | 1 * SF1 + 1 * SF2 | ((1 * SF1 + 1 * SF2)**PSF) + 0.5 * N | (((1 * SF1 + 1 * SF2)**PSF) + 0.5 * N) **Filter(c) |
| D | 1 * SF1 + 1 * SF2 | ((1 * SF1 + 1 * SF2)**PSF) + 1 * N | (((1 * SF1 + 1 * SF2)**PSF) + 1 * N) **Filter(d) |
| E | 1 * SF1 + 1 * SF2 | ((1 * SF1 + 1 * SF2)**PSF) + 10 * N | (((1 * SF1 + 1 * SF2)**PSF) + 10 * N) **Filter(e) |

Nonlinear and/or spatially varying processing may render a processed image resembling an original image up to a point where noise overwhelms the signal, such that processing does not separate the signal from the noise. In the above example, signal processing detects spatial frequencies that are prominent within the object, for example by utilizing identification subsets as described in connection with FIG. 11. Next, the processing generates a filter that processes the data for only the spatial frequencies identified in each data set. Processing of each data set proceeds through the data sets, one at a time. After one data set is processed, the next subset in turn may be processed. Alternatively, processing may occur in a raster fashion or in another suitable sequence, as also described in connection with FIG. 11.

Figure 25:
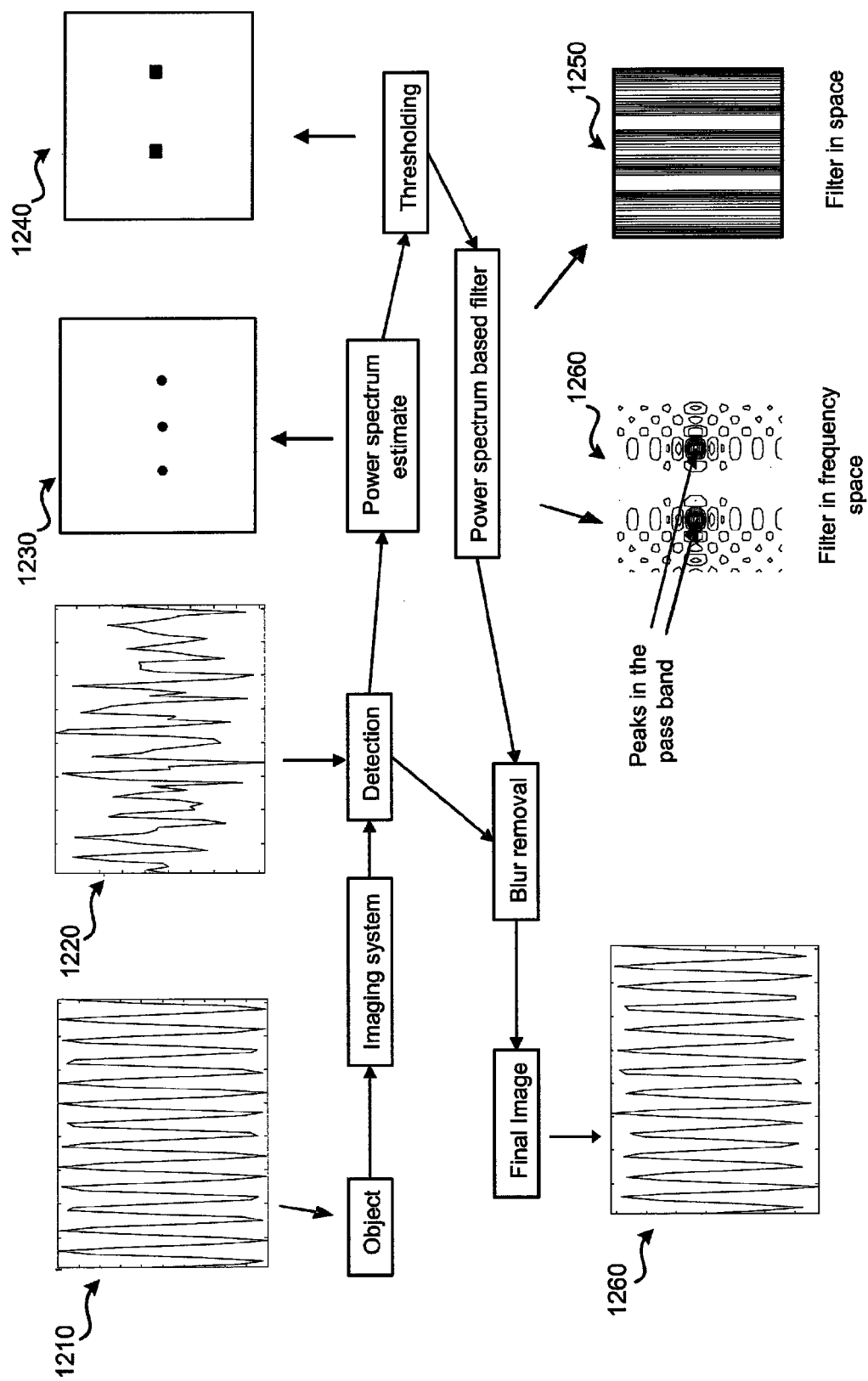
FIGS. 25-28 show results of processing of electronic data corresponding to the plurality of object regions shown in FIG. 11, in accordance with an embodiment.

FIG. 25 illustrates a process that is appropriate for processing electronic data that falls within region A of FIG. 11. Object 1010, FIG. 20, which forms data represented in box 1210, is imaged from region A. A detector imaging region A adds noise, producing the electronic data represented in box 1220. For each identification subset processed within region A, a power spectrum estimate is formed by performing a Fourier transform of the detected electronic data. Box 1230 illustrates peaks found in the Fourier transformed data from region A, with horizontal spatial frequencies increasing along a horizontal axis and vertical spatial frequencies increasing along a vertical axis (horizontal and vertical referring to corresponding directions in FIG. 25 when held so that text thereof reads normally). Three dots forming a horizontal line are visible in this box. The central dot corresponds to a DC component, that is, power at zero horizontal and vertical spatial frequency; this component is always present and may be ignored in further processing. The dots to the left and right of the central dot correspond to positive and negative spatial frequency values pursuant to the spacing of vertical lines in the object; that is, the left and right dots correspond to spatial frequencies ±SF1. Next, dominant spatial frequencies are determined by analyzing the power spectrum estimate and establishing a threshold such that only the dominant spatial frequencies exceed the threshold. As seen in box 1240, power spectrum information below the threshold is discarded so that image represented by a linescan in box 1270. Filter 1260 may be applied directly in the frequency domain or, alternatively, box 1250 may be applied in the spatial domain. It may be appreciated that after processing the data in box 1260 closely resembles the data in box 1210.

Figure 26:
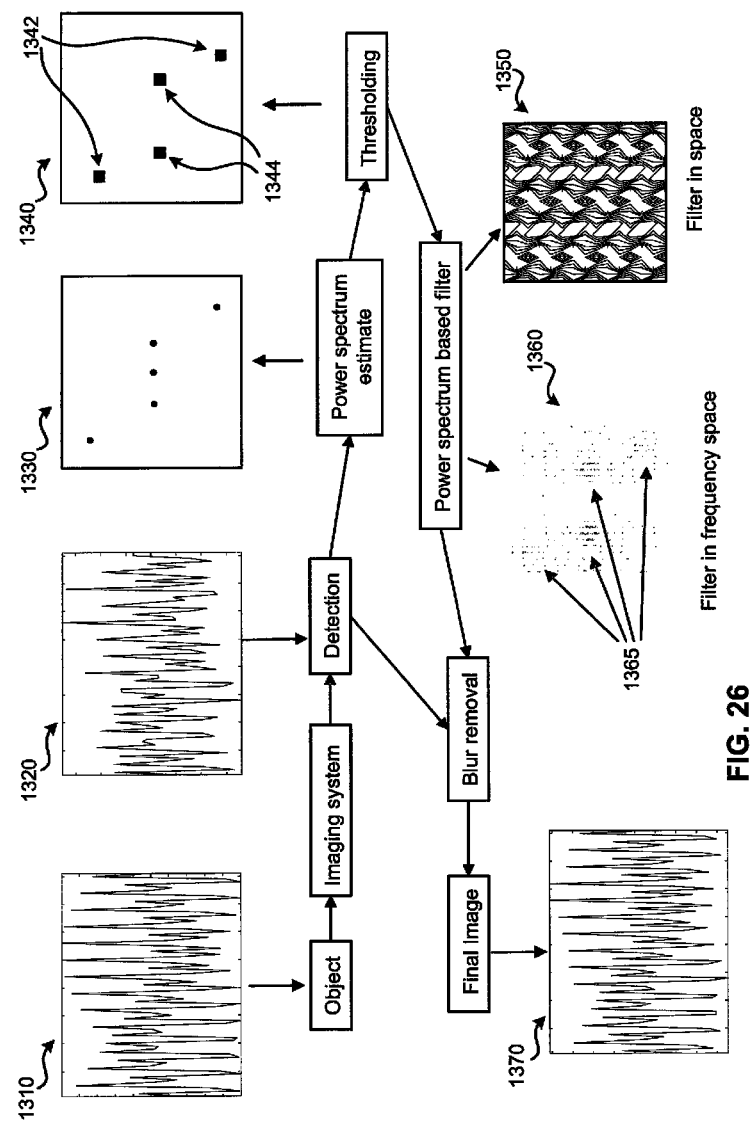

FIG. 26 illustrates a process that is appropriate for processing electronic data that falls within region C of FIG. 11. Steps used in the processing for region C are the same as for region A described above, but the different spatial frequency information of the object being imaged creates a different result. Object 1020, FIG. 20, which forms data represented in box 1310, is imaged from region C. A detector imaging region C introduces the same amount of noise as the detector imaging region A, and forms data as represented in box 1320. However, the presence of diagonal lines in object 1020 results in region C having significant power in both vertical and horizontal spatial frequencies. Therefore, compared to the result obtained for image region A, the same process for region C forms additional peaks in a power spectrum estimate shown in box 1330. These peaks may be preserved when a threshold is established, as shown in box 1340. Specifically, peaks 1344 correspond to spatial frequencies that have values of ±SF1 in the horizontal direction and zero in the vertical direction, and peaks 1342 correspond to spatial frequencies that have values of ±SF2 in each of the horizontal and vertical directions. Consequently, a filter 1360 formed from such information exhibits features 1365 at the corresponding spatial frequencies. Filter 1360 is also shown in spatial terms in box 1350. A linescan representation 1370 of processed electronic data formed for region C shows that the processed electronic data corresponds closely to the original object data; that is, much of the noise added in the detection step has been successfully removed.

Figure 27:
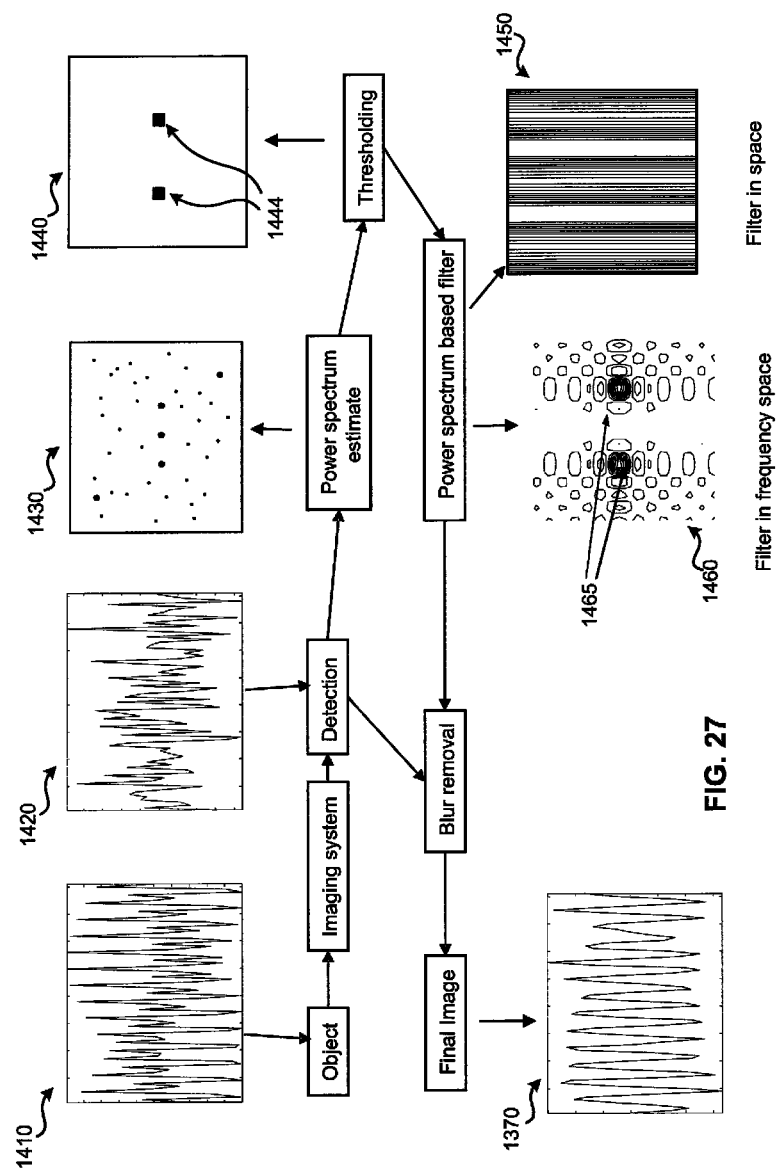

FIG. 27 illustrates a process that is appropriate for processing electronic data that falls within region D of FIG. 11. Steps used in the processing for region D are similar as for regions A and C described above, but the higher noise introduced by the detector, as compared with the signal corresponding to the object being imaged, creates a different result. Object 1020 of FIG. 20, which forms data represented in box 1410, is imaged from region D. A detector imaging region D has the same spatial frequency content as region C, but has higher noise content than the detector imaging regions A and C, and forms data as represented in box 1420. In fact, region D contains so much noise that, although peaks corresponding to the diagonal lines form in the power spectrum estimate, these peaks are comparable to noise in this image region. Box 1430 shows random noise peaks in the power spectrum estimate. The higher noise necessitates raising a threshold to a higher value, leaving peaks 1444 at spatial frequencies ±SF1, but not leaving peaks corresponding to the diagonal lines. Therefore, a filter 1460 formed for region D resembles filter 1260 formed for region A because it is based only on the spatial frequencies corresponding to the vertical lines, which are the only spatial frequencies dominant enough to stand out over the noise. Filter 1460 is also shown in spatial terms in box 1450. A linescan representation 1470 of processed electronic data for region D shows the vertical lines; amplitude of the vertical lines is diminished as compared to the processed electronic data shown in FIG. 25 for image region A, and the diagonal lines are not discernable.

Figure 28:
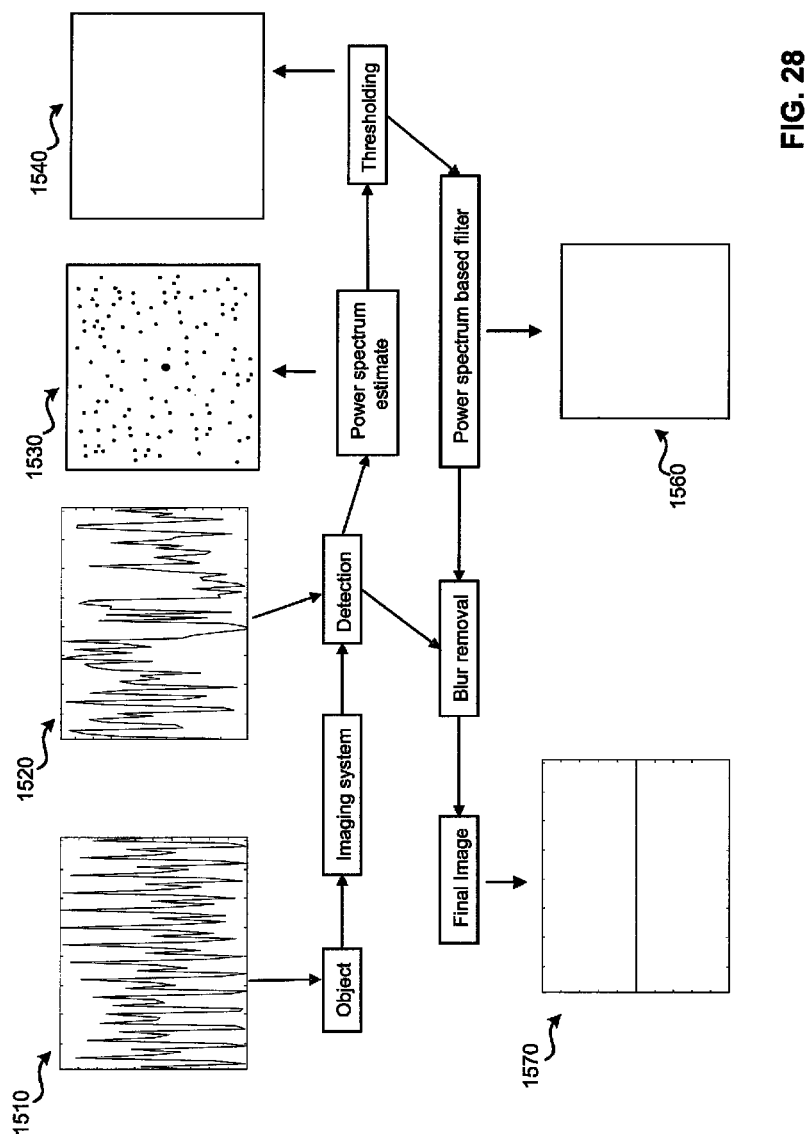

FIG. 28 illustrates a process that is appropriate for processing electronic data that falls within regions B and E of FIG. 11. Object 1020 of FIG. 20, which forms data represented in box 1510, is imaged from regions B and E. A detector imaging regions B and E introduces even more noise than the detector imaging region D, and forms data as represented in box 1520. In regions B and E, the detector-induced noise overwhelms the ability of the processing to identify any spatial frequencies. A power spectrum estimate 1530 includes only a DC point and many peaks caused by the noise; thresholding does not locate any peak, as shown in box 1540, and a corresponding filter 1560 has a constant value. In such cases, output data may be replaced by a constant value, as shown in box 1570, or the original, detected but unfiltered electronic data (as in box 1520) may be substituted.

Nonlinear and/or spatially varying processing may also optimize a processed image that has image regions of high and low contrast. That is, certain image regions of an object may present large intensity variations (e.g., high contrast) with sharp demarcations of intensity, while other image regions present low intensity variations (low contrast) but also have sharp demarcations of intensity. The intensity variations and sharp demarcations may pertain to overall lightness and darkness, or to individual color channels. Human perception of images includes sensitivity to a wide range of visual clues. Resolution and contrast are two important visual clues; high resolution involves sharp or abrupt transitions of intensity or color (but which may not be large changes), while high contrast involves large changes in intensity or color. Such changes may occur within an object or between an object and a background. Not only human perception, but also applications such as machine vision and task based processing, may benefit from processing to provide high resolution and/or high contrast images.

WFC optics may blur edges or reduce contrast as they extend depth of field. Captured data obtained through WFC optics may be processed with a filter that exhibits high gain at high spatial frequencies to make transitions among intensity levels (or colors) sharper or steeper (e.g., increasing contrast); however, such filtering may also amplify image noise. Amplifying noise to the point where variations in intensity (or color) are approximately the same magnitude as transitions in a scene being imaged "masks" the transitions; that is, the increased noise makes the actual transitions indistinguishable from the noise. The human visual system may also respond to noise-free areas with the perception of false coloring and identify the image quality as poor, so reducing the noise to zero does not always produce images with good quality. Therefore, when WFC optics are used, it may be desirable to process certain image regions differently from each other, so as to maintain not only the sharp demarcations of intensity or color, but also the intensity or color variations of each region and desired noise characteristics, as illustrated in the following example of determining processing based on image content.

FIG. 29-37 illustrate how adapting a filter to contrast of an image region may improve a resulting image. As will be described in more detail, FIG. 29 through FIG. 32 show an example of a high contrast image region imaged to a detector and processed with an "aggressive" filter that increases noise gain. This processing is shown to sharpen edge transitions of the high contrast image without "masking" the transitions with amplified noise. In FIG. 33 through FIG. 37, a low contrast image region is imaged at a detector. The resulting electronic data is first processed with the same filter as in the example of FIGS. 29-32 to show how amplified noise masks transitions. Then, the electronic data is processed with a less "aggressive" filter that sharpens the edge transitions somewhat, but does not amplify noise is as much as by the "aggressive" filter, so that amplified noise does not mask the transitions.

Figure 29:
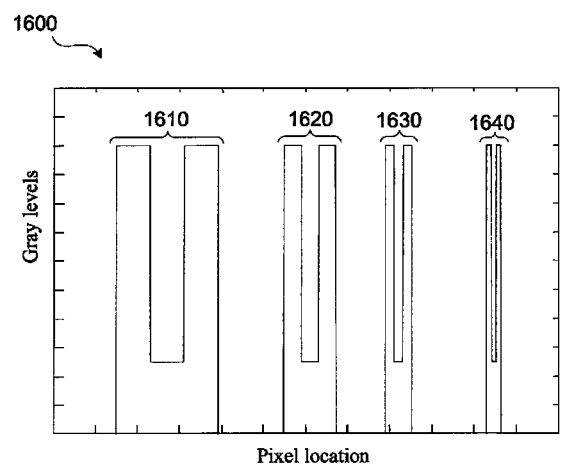
FIG. 29 shows an exemplary linescan of a high contrast object region, in accordance with an embodiment.

FIG. 29 shows a linescan 1600 of object information of a high contrast image region of a scene such as, for example, fence 250 of scene 200, FIG. 2. Object information 1610, 1620, 1630 and 1640 of four corresponding objects is shown in linescan 1600; each of objects represented by object information 1610-1640 is successively smaller and more detailed (i.e., higher resolution imaging is required to show the spatial detail that is present). A gray scale used, corresponding to values along the vertical axis of linescan 1600, ranges from zero to 240 levels. Intensity of object information 1610-1640 varies from zero to 50 to 200 gray levels, with abrupt transitions as a function of pixel location (i.e., the objects represented by object information 1610-1640 have sharp demarcations of intensity from one point to another). Although the terms "gray scale" and "gray levels" are used in this example, variations in intensity in one or more color channels may be similarly processed and are within the scope of the present disclosure.

Figure 30:
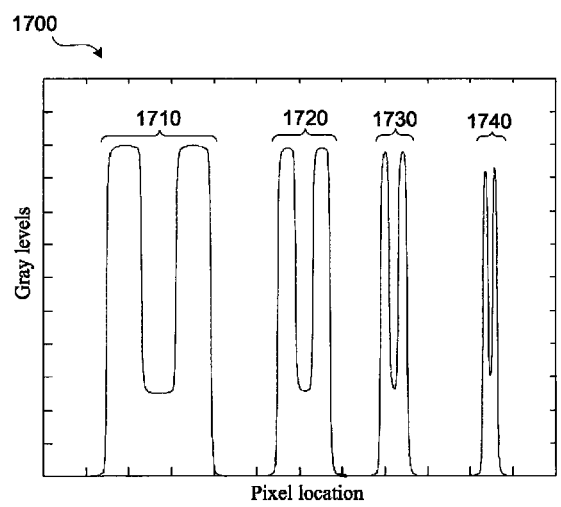
FIG. 30 shows a linescan of an image of the high contrast object region of FIG. 29, in accordance with an embodiment.

Optics, including WFC optics, generate a modified optical image with extended depth of field. FIG. 30 shows a linescan 1700 of the objects represented in linescan 1600 as optical information 1710, 1720, 1730 and 1740. The WFC optics utilized to produce optical information 1710, 1720, 1730 and 1740 implement a pupil plane phase function phase(r,θ) such that $$\text{phase}(r, \theta) = g \sum_{i=1}^{n} a_i z^i \cos(w\theta) \qquad \text{Eq. 1}$$

where $n = 7$, $0 \leq r \leq 1$, $a_1 = 5.4167$, $a_2 = 0.3203$, $a_3 = 3.0470$, $a_4 = 4.0983$, $a_5 = 3.4105$, $a_6 = 2.0060$, $a_7 = -1.8414$, $w = 3$, $0 \leq \theta \leq 2\pi$ radians, and $z = \begin{cases} \dfrac{z-r}{1-r} & \text{when } r \geq 0.5, \\ 0 & \text{when } r < 0.5. \end{cases}$ Optics that follow the form of Eq. 1 fall into a category that is sometimes referred to herein as "cosine optics," which generally denotes an optical element that imparts a phase variation that varies cosinusoidally with respect to an angle θ and aspherically in radius r.

Wavefront coding may degrade sharp demarcations of intensity between adjacent points, as may be seen in the rounded transitions and sloping edges of optical information 1710, 1720, 1730 and 1740.

An optical image captured by an electronic image detector that generates electronic data may introduce noise. For example, a detector may introduce noise that has two components: signal dependent noise, and signal independent, additive noise. Signal dependent noise is a function of signal intensity at a given pixel location. Signal independent noise is additive in nature and does not depend on intensity at a pixel location. Shot noise is an example of signal dependent noise. Electronic read noise is an example of signal independent noise.

Figure 31:
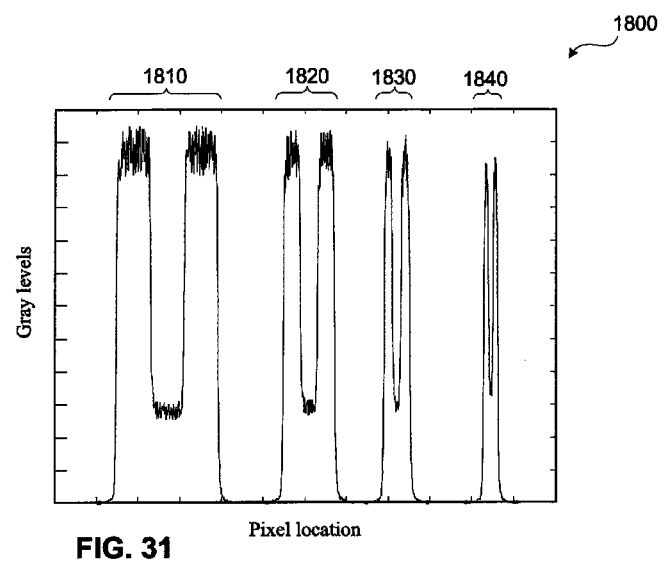
FIG. 31 shows an electronic data representation of the linescan of the high contrast object region of FIG. 29.

FIG. 31 shows a linescan 1800 of the objects represented in linescan 1600 as electronic data 1810, 1820, 1830 and 1840. Note that electronic data 1810, 1820, 1830 and 1840 includes rounded transitions and sloped edges as seen in optical information 1710, 1720, 1730 and 1740, and that areas of high intensity include noise that is roughly proportional to the intensity.

Electronic data 1810, 1820, 1830 and 1840 may be processed with a filter that enhances high spatial frequencies with respect to lower spatial frequencies, thus generating sharp transitions. An example of such a filter is a parametric Wiener filter as described in the frequency domain for spatial frequency variables u and v by the following equations:

$$W(u, v) = \frac{H^*(u, v)}{|H(u, v)|^2 + \gamma \frac{S_N(u, v)}{S_O(u, v)}} \qquad \text{Eq. 2}$$

where W(u,v) is the parametric Wiener filter, H(u,v) is an optical transfer function, H*(u,v) is the conjugate of the optical transfer function, $S_N(u,v)$ is a noise spectrum, $S_O(u,v)$ is an object spectrum and γ is a weighting parameter. Noise spectrum $S_N(u,v)$ is given by $S_N(u,v)=(1/Nw)$ where Nw is a constant. Object spectrum $S_O(u,v)$ is typically given by $$S_O(u, v) = \frac{1}{[1 + (2\pi\mu\rho)^2]^{3/2}}, \text{ where } \rho = \sqrt{(u^2 + v^2)},$$

and μ is a scalar constant.

An inverse Fourier transform of W(u,v) gives a spatial domain version of the Wiener filter. One example of processing (also sometimes called "reconstruction" herein) of images is performed by convolving the image (e.g., as represented by linescan 1800 of electronic data 1810, 1820, 1830 and 1840 shown above) with a spatial domain version of the Wiener filter. Such reconstruction generates sharp edges, but also increases noise power.

Figure 32:
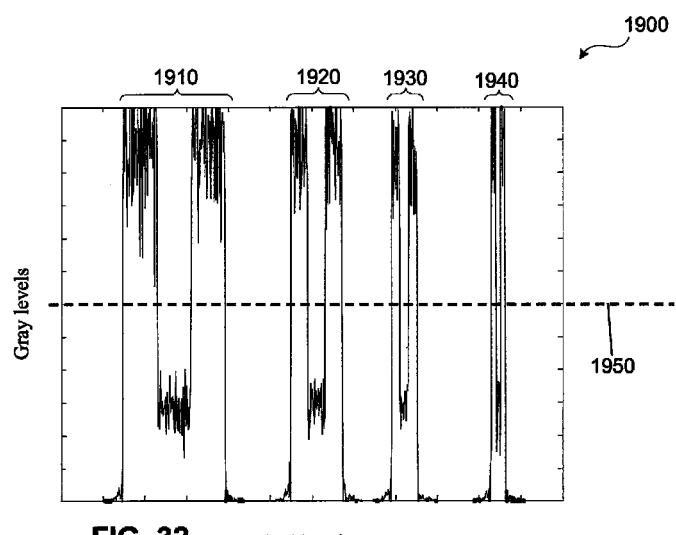
FIG. 32 shows processed electronic data corresponding to the linescan of the high contrast object region of FIG. 29, in accordance with an embodiment.

FIG. 32 shows a linescan 1900 of the objects represented in linescan 1600 as processed electronic data 1910, 1920, 1930 and 1940, that is, electronic data 1810, 1820, 1830 and 1840 after processing with W(u,v) defined above. As seen in the reconstructed electronic data, signal and noise power are increased by about a factor of 3. However, for human perception of resolution, and certain other applications (such as machine vision, or task based processing) where sharp demarcations (e.g., steep slopes) between adjacent areas that differ in intensity are desirable, increased noise may be tolerable. For instance, linescan 1900 is processed with the parametric Wiener filter discussed above, with Nw=250, μ=0.25, and γ=1. Linescan 1900 is seen to have steeper slopes between areas of differing intensity than linescan 1700, and noise at high and low intensity levels is amplified, but does not mask transitions among the areas of differing intensity. For example, noisy data at the high and low intensity levels remains much higher and lower, respectively, than the 120th gray level labeled as threshold 1950. Thus, W(u,v) with the constants noted above may improve human perception of the bright/dark/bright transitions in the high contrast image region.

In addition to the processing steps discussed above, for certain high contrast imaging applications such as, for example, imaging of business cards, barcodes or other essentially binary object information, filtering steps may be followed by a thresholding step, thereby resulting in a binary valued image.

Figure 33:
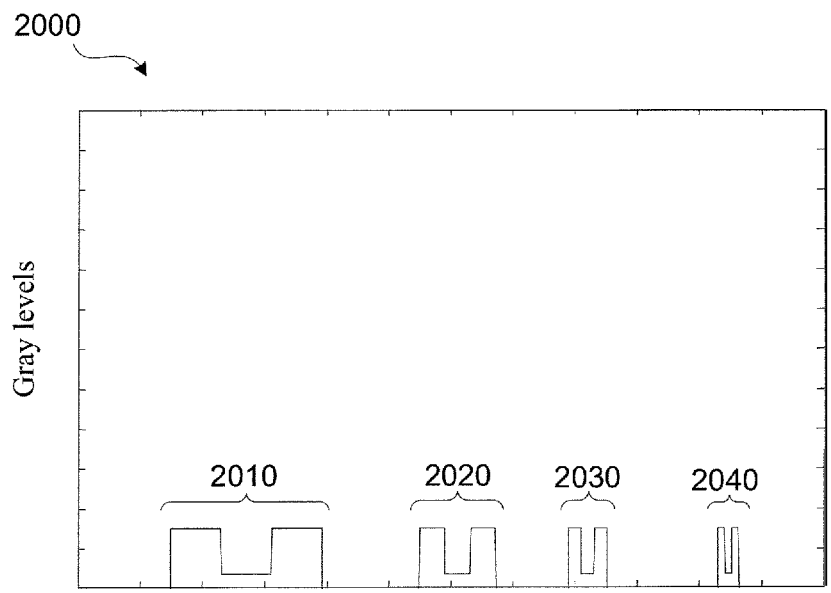
FIG. 33 shows an exemplary linescan of a low contrast object region, in accordance with an embodiment.
Figure 34:
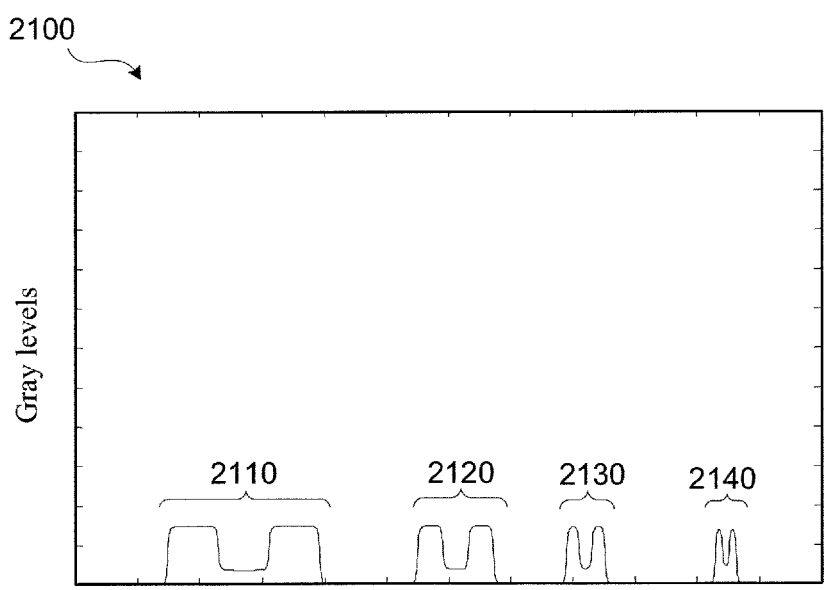
FIG. 34 shows a linescan of an image of the low contrast object region of FIG. 33.
Figure 35:
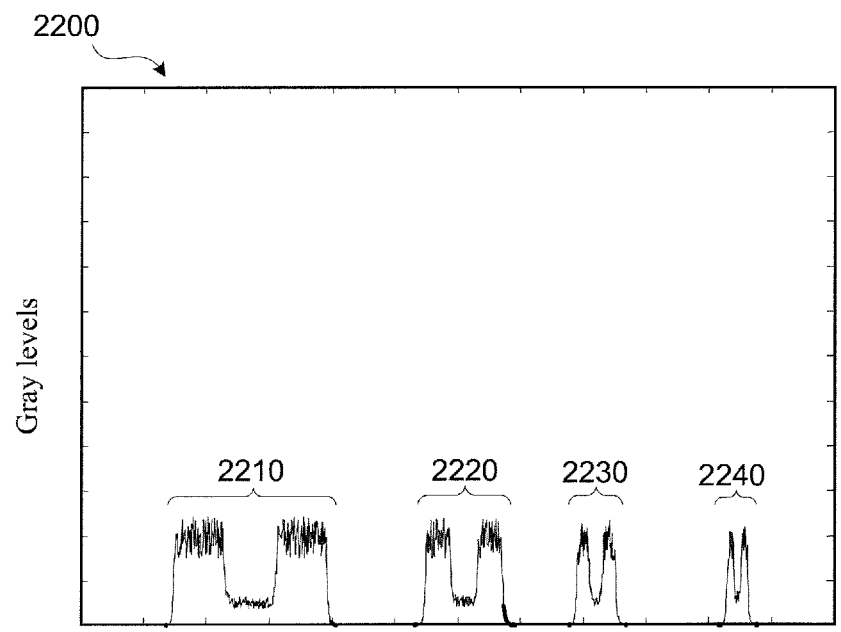
FIG. 35 shows an electronic data representation of the linescan of the low contrast object region of FIG. 33.

Certain image regions of an object being imaged may have reduced intensity variations but, like the image region discussed in connection with FIGS. 29-32, may also have sharp demarcations of intensity. FIG. 33 shows a linescan 2000 of a low contrast image region of a scene—which may be, for example, a second portion of the same scene illustrated in FIGS. 29-32. FIGS. 33-37 use the same gray scale of 240 gray levels as in FIGS. 29-32. Electronic data 2010, 2020, 2030 and 2040 of four corresponding objects are shown in linescan 2000; each object represented by electronic data 2010-2040 is successively smaller and more detailed. However, maximum differences of intensity in electronic data 2010, 2020, 2030 and 2040 are only between zero and 30 gray levels, as opposed to the differences of zero to 200 gray levels in electronic data 1610, 1620, 1630 and 1640, FIG. 29. The same WFC optics as discussed in connection with FIG. 30 modifies the image region illustrated above to generate an optical image with extended depth of field, which is captured by a detector that adds noise, as illustrated in FIG. 34 and FIG. 35.

FIG. 34 shows a linescan 2100 of the objects represented in linescan 2000 as optical information 2110, 2120, 2130 and 2140 that have rounded transitions and sloping edges, similar to what was seen in optical information 1710, 1720, 1730 and 1740, FIG. 30. FIG. 35 shows a linescan 2200 of the objects represented in linescan 2000 as electronic data 2210, 2220, 2230 and 2240. Note that electronic data 2210, 2220, 2230 and 2240 includes rounded transitions and sloped edges as seen in optical information 2110, 2120, 2130 and 2140, and that areas of higher intensity include noise that is roughly proportional to the intensity, although the intensity is lower than the peak intensities seen in FIGS. 29-32.

Figure 36:
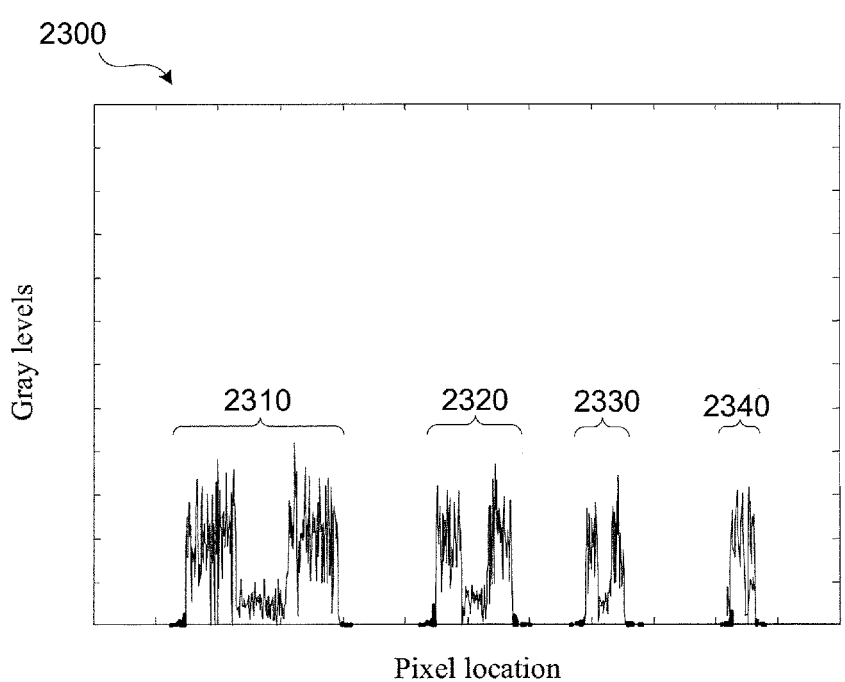
FIG. 36 shows an example of processed electronic data corresponding to the linescan of the low contrast object region of FIG. 33, in accordance with an embodiment.

FIG. 36 shows a linescan 2300 of the objects represented in linescan 2000 as processed electronic data 2310, 2320, 2330 and 2340, that is, electronic data 2210, 2220, 2230 and 2240 after convolution with an "aggressive" parametric Wiener filter as described in Eq. 1 and Eq. 2 above, again with Nw=250, μ=0.25, and γ=1. In FIG. 36, it is evident that noise has been amplified to the point that the noise "masks" transitions; that is, no gray level threshold can be chosen for which only the "bright" or "dark" regions of the original objects represented in linescan 2000 are brighter or darker than the threshold.

Figure 37:
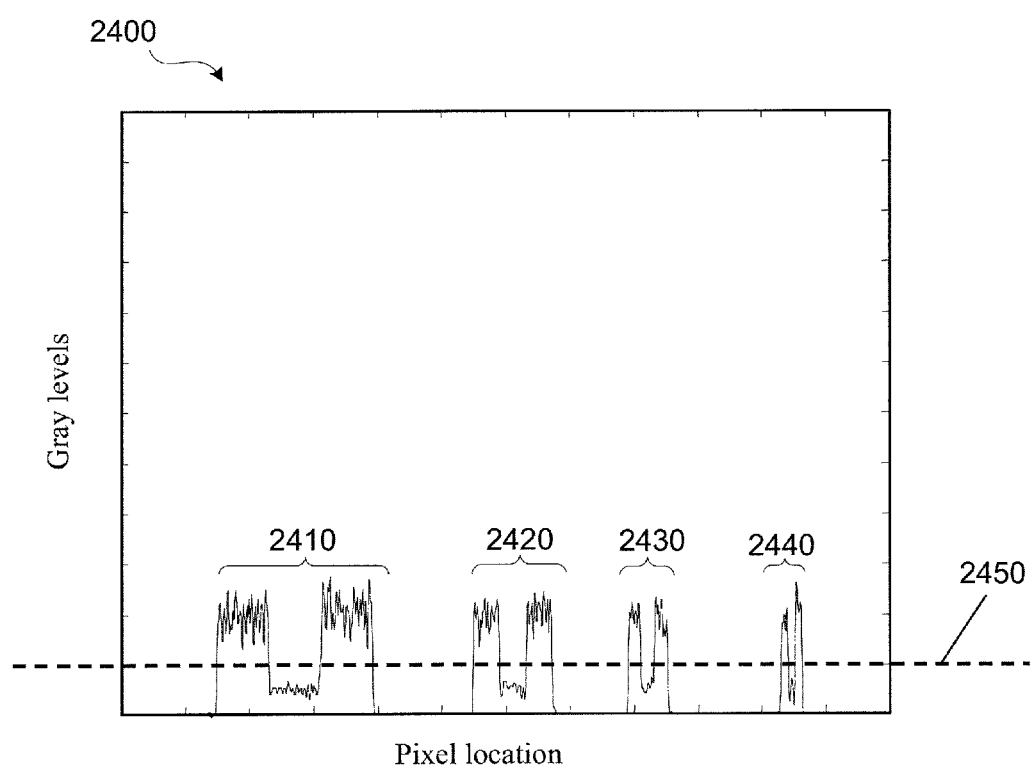
FIG. 37 shows another example of processed electronic data corresponding to the linescan of the low contrast object region of FIG. 33, where the processing performed to obtain

Utilizing a "less aggressive" filter may mitigate the "masking" that may result from noise amplification. FIG. 37 shows a linescan 2400 of the objects represented in linescan 2000 as processed electronic data 2410, 2420, 2430 and 2440, that is, again starting with electronic data 2210, 2220, 2230 and 2240, FIG. 35, but this time utilizing a Wiener filter as described in Eq. 1 and Eq. 2 with "less aggressive" constants Nw=500, μ=1, and γ=1. The "less aggressive" filter constants restore edge sharpness to processed electronic data 2410, 2420, 2430 and 2440, but only increase noise by a factor near unity, thereby not "masking" transitions between the closely spaced high and low intensity levels of the objects represented in linescan 2000. Note that noisy data at the high and low intensity levels remains higher and lower, respectively, than the 20th gray level labeled as threshold 2450.

It has thus been shown how processing may be determined for different data sets of electronic data representing an image. Other forms of processing may be utilized for data sets that are identified in different ways from those discussed above. For example, as compared to the examples illustrated by FIG. 29 through FIG. 37, filtering methods other than Wiener filters may be utilized to modify a degree to which effects introduced by WFC optics are altered. Also, when data sets are identified on the basis of color information instead of intensity information, filters that modify color may be utilized instead of a filter that enhances intensity differences.

Spatially Varying Processing—Implementation

Figure 38:
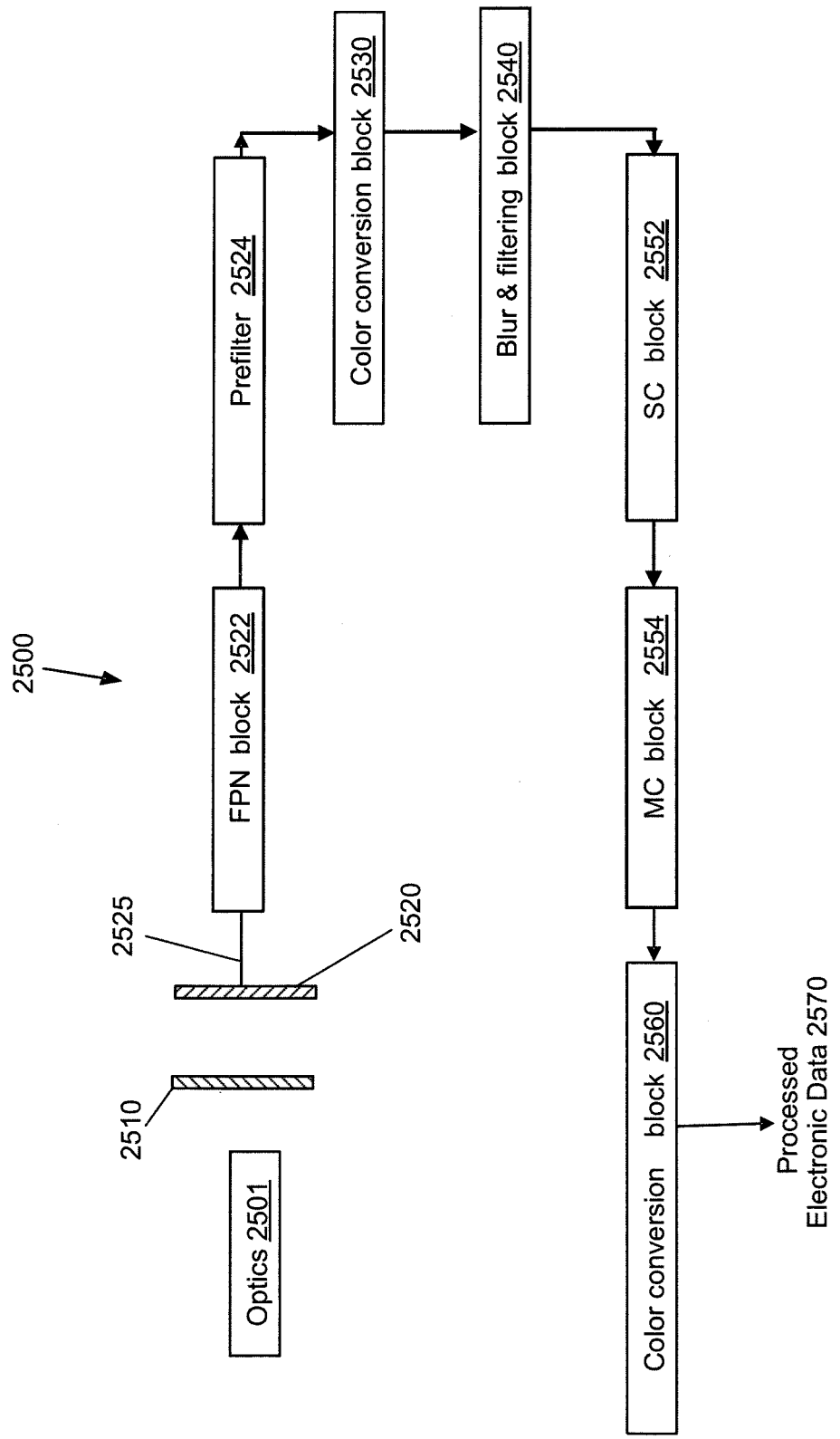
FIG. 38 is a block diagram illustrating an imaging system utilizing nonlinear and/or spatially varying processing, in accordance with an embodiment.

FIG. 38 illustrates an imaging system utilizing nonlinear and/or spatially varying processing. System 2500 includes optics 2501 and a wavefront coding (WFC) element 2510 that cooperate with a detector 2520 to form a data stream 2525. Data stream 2525 may include full frame electronic data or any subset thereof, as discussed above. WFC element 2510 operates to encode the wavefront of electromagnetic energy imaged by system 2500 such that an image formed at detector 2520 has extended depth of field, and includes effects due to the WFC optics that may be modified by post processing to form a processed image. In particular, data stream 2525 from detector 2520 is processed by a series of processing blocks 2522, 2524, 2530, 2540, 2552, 2554 and 2560 to produce a processed image 2570. Processing blocks 2522, 2524, 2530, 2540, 2552, 2554 and 2560 represent image processing functionality that may be, for example, implemented by electronic logic devices that perform the functions described herein. Such blocks may be implemented by, for example, one or more digital signal processors executing software instructions; alternatively, such blocks may include discrete logic circuits, application specific integrated circuits ("ASICs"), gate arrays, field programmable gate arrays ("FPGAs"), computer memory, and portions or combinations thereof. For example, processing blocks 2522, 2524, 2530, 2540, 2552, 2554 and 2560 may be implemented by processor 140 executing software 145 (see FIG. 3), with processor 140 optionally coordinating certain aspects of processing by ASICs or FPGAs.

Processing blocks 2522 and 2524 operate to preprocess data stream 2525 for noise reduction. In particular, a fixed pattern noise ("FPN") block 2522 corrects for fixed pattern noise (e.g., pixel gain and bias, and nonlinearity in response) of detector 2520; a prefilter 2524 utilizes a priori knowledge of WFC element 2510 to further reduce noise from data stream 2525, or to prepare data stream 2525 for subsequent processing blocks. Prefilter 2524 is for example represented by icons 518, 536 or 556 as shown in FIGS. 6, 7 and 8 respectively. A color conversion block 2530 converts color components (from data stream 2525) to a new colorspace. Such conversion of color components may be, for example, individual red (R), green (G) and blue (B) channels of a red-green-blue ("RGB") colorspace to corresponding channels of a luminance-chrominance ("YUV") colorspace; optionally, other colorspaces such as cyan-magenta-yellow ("CMY") may also be utilized. A blur and filtering block 2540 removes blur from the new colorspace images by filtering one or more of the new colorspace channels. Blocks 2552 and 2554 operate to post-process data from block 2540, for example to again reduce noise. In particular, single channel ("SC") block 2552 filters noise within each single channel of electronic data using knowledge of digital filtering within block 2540; multiple channel ("MC") block 2554 filters noise from multiple channels of data using knowledge of optics 2501 and the digital filtering within blur and filtering block 2540. Prior to processed electronic data 2570, another color conversion block 2560 may for example convert the colorspace image components back to RGB color components.

Figure 39:
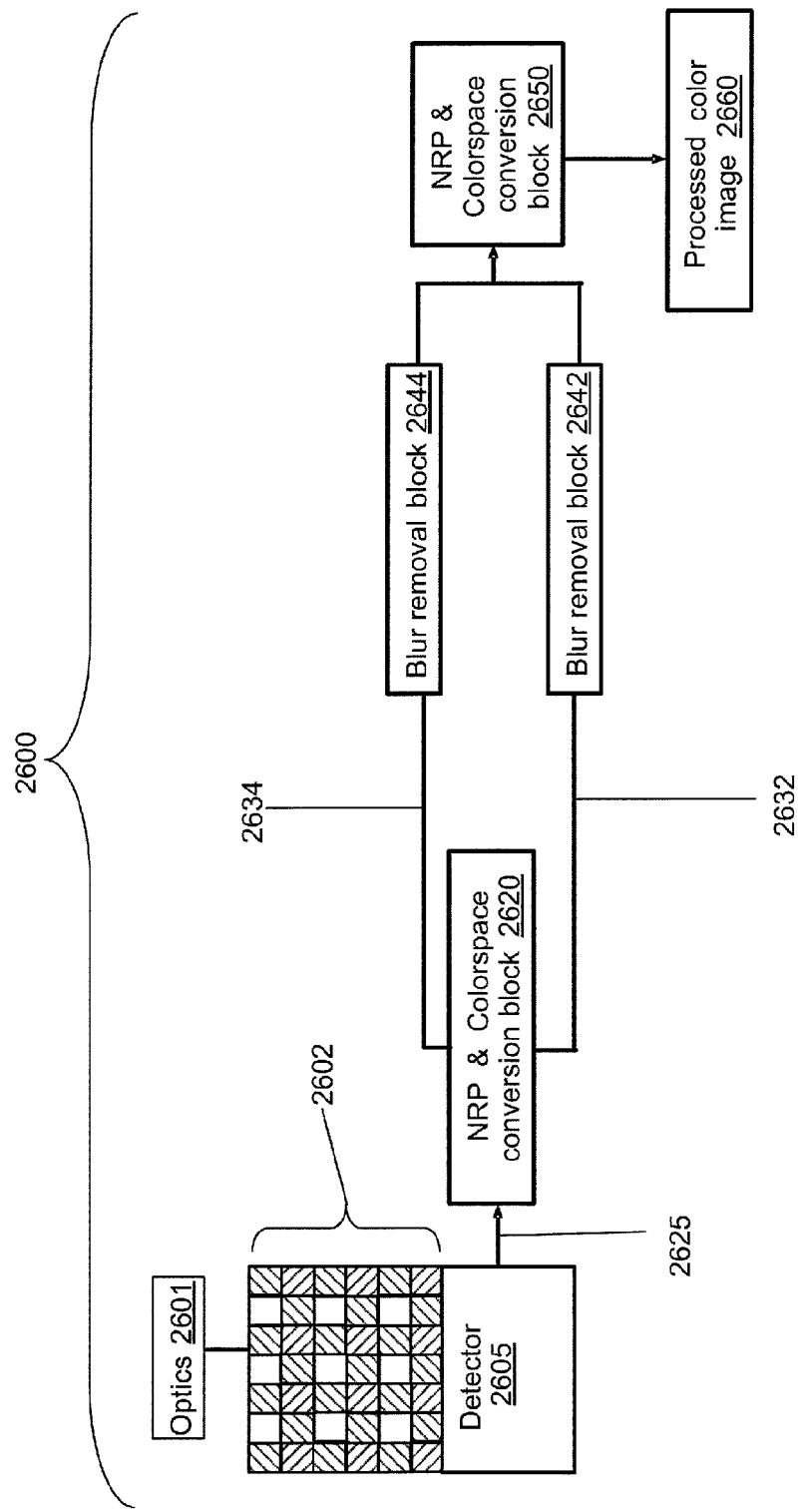
FIG. 39 is a block diagram illustrating another imaging system with nonlinear and/or spatially varying color processing, in accordance with an embodiment.

FIG. 39 schematically illustrates an imaging system 2600 with nonlinear and/or spatially varying color processing. Imaging system 2600 produces a processed three-color image 2660 from captured electronic data 2625 formed at a detector 2605, which includes a color filter array 2602. System 2600 employs optics 2601 (including one or more WFC elements or surfaces) to encode the wavefront of electromagnetic energy through optics 2601 to produce captured electronic data 2625 at detector 2605; an image represented by captured electronic data 2625 is purposely blurred by phase alteration effected by optics 2601. Detector 2605 generates captured electronic data 2625 that is processed by noise reduction processing ("NRP") and colorspace conversion block 2620. NRP functions, for example, to remove detector nonlinearity and additive noise, while the colorspace conversion functions to remove spatial correlation between composite images to reduce the amount of logic and/or memory resources required for blur removal processing (which will be later performed in blocks 2642 and 2644). Output from NRP & colorspace conversion block 2620 is in the form of a data stream that is split into two channels: 1) a spatial channel 2632; and 2) one or more color channels 2634. Channels 2632 and 2634 are sometimes called "data sets" of a data stream herein. Spatial channel 2632 has more spatial detail than color channels 2634. Accordingly, spatial channel 2632 may require the majority of blur removal within a blur removal block 2642. Color channels 2634 may require substantially less blur removal processing within blur removal block 2644. After processing by blur removal blocks 2642 and 2644, channels 2632 and 2634 are again combined for processing within NRP & colorspace conversion block 2650. NRP & colorspace conversion block 2650 further removes image noise accentuated by blur removal, and transforms the combined image back into RGB format to form processed three-color image 2660. As above, processing blocks 2620, 2632, 2634, 2642, 2644 and 2650 may include one or more digital signal processors executing software instructions, and/or discrete logic circuits, ASICs, gate arrays, FPGAs, computer memory, and portions or combinations thereof.

Figure 40:
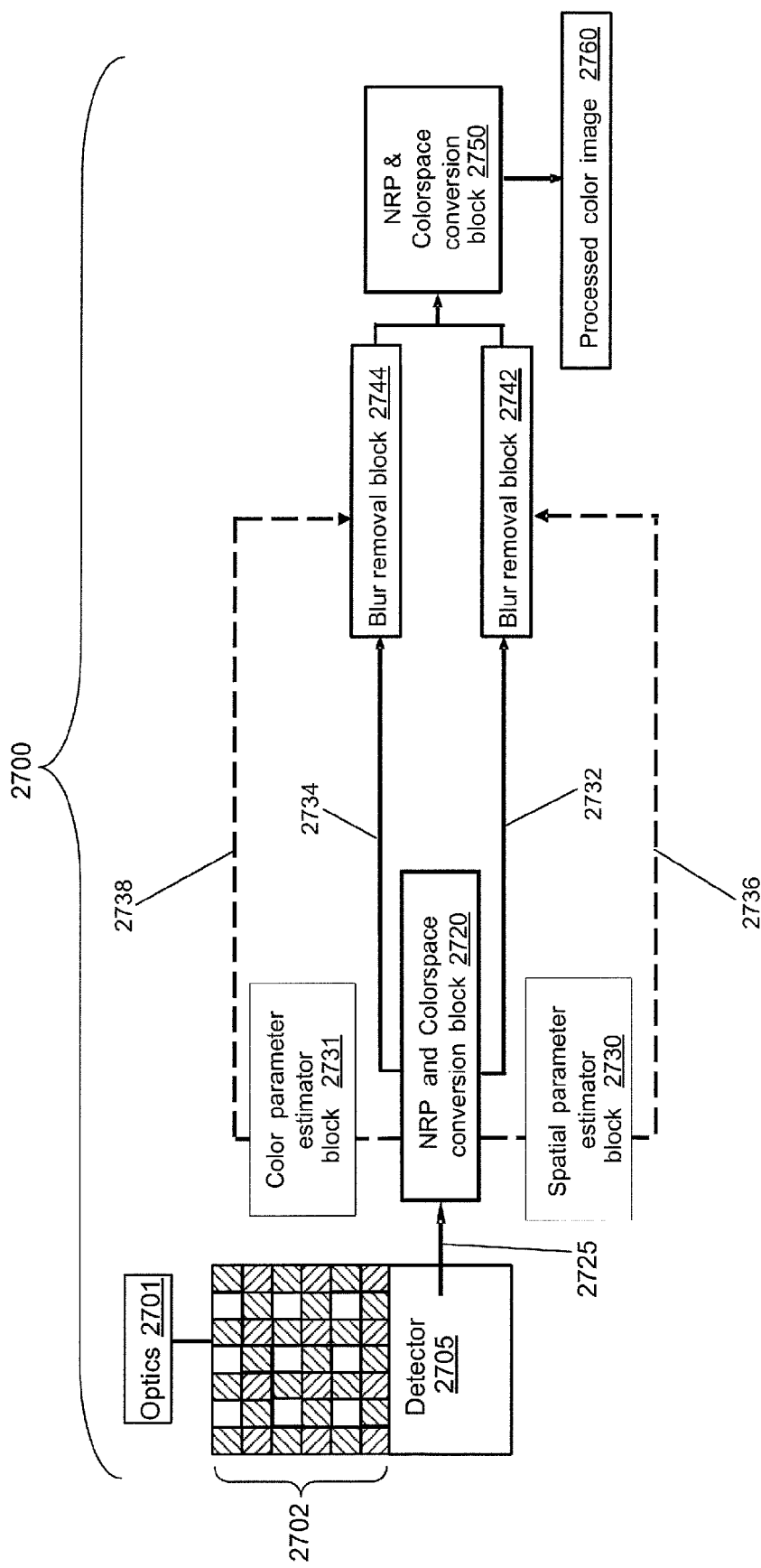
FIG. 40 is a block diagram illustrating another imaging system utilizing nonlinear and/or spatially varying processing, in accordance with an embodiment.

FIG. 40 shows another imaging system 2700 utilizing nonlinear and/or spatially varying processing. While the systems illustrated in FIGS. 38 and 39 provide advantages over known art, system 2700 may generate even higher quality images and/or may perform more efficiently in terms of computing resources (such as hardware or computing time) as compared to systems 2500 and 2600. System 2700 employs optics 2701 (including one or more WFC elements or surfaces) to encode the wavefront of electromagnetic energy through optics 2701 to produce captured electronic data 2725 at detector 2705; an image represented by captured electronic data 2725 is purposely blurred by phase alteration effected by optics 2701. Detector 2705 generates captured electronic data 2725 that is processed by noise reduction processing ("NRP") and colorspace conversion block 2720. A spatial parameter estimator block 2730 examines information of the spatial image generated by NRP and colorspace conversion block 2720, to identify which image regions of the spatial image require what kind and/or degree of blur removal. Spatial parameter estimator block 2730 may also divide captured data 2725 into data sets (for example, a spatial channel 2732 and one or more color channels 2734, as shown in FIG. 40, and/or specific data sets (e.g., data sets corresponding to image regions, as shown in FIGS. 11-19) to enable association of specific blur removal processing parameters with each data set of captured electronic data 2725. Information generated by spatial parameter estimator block 2730 provides processing parameters 2736 for respective image regions (e.g., data sets of electronic data 2725) to a blur removal block 2742 that handles spatial channel 2732. A separate color parameter estimator block 2731 examines information of the color channel(s) 2734 output by NRP and colorspace conversion block 2720 to identify which data sets (e.g., corresponding to image regions) of color channel(s) 2734 require what kind of blur removal. Data sets such as color channels 2734 of captured electronic data 2725, as well as spatial channels 2732, may be processed in spatially varying ways to filter information therein. Processing performed on certain color channels 2734 may vary from processing performed on a spatial channel 2732 or other color channels 2734 of the same captured electronic data 2725. Information generated by color parameter estimator block 2731 provides processing parameters 2738 for respective data sets of captured electronic data 2725 to blur removal block 2744 that handles the color images. Processing parameters may be derived for captured data corresponding to an entire image, or for a data set (e.g., corresponding to a spatial region) of captured electronic data 2725, or on a pixel by pixel basis. After processing by blur removal blocks 2742 and 2744, channels 2732 and 2734 are again combined for processing within NRP & colorspace conversion block 2750. NRP & colorspace conversion block 2750 further removes image noise accentuated by blur removal, and transforms the combined image back into RGB format to form processed three-color image 2760. As above, processing blocks 2720, 2732, 2734, 2742, 2744 and 2750 may include one or more digital signal processors executing software instructions, and/or discrete logic circuits, ASICs, gate arrays, FPGAs, computer memory, and portions or combinations thereof.

TABLE 2 shows non-limiting types of processing that may be applied by a blur removal block (e.g., any of blur removal and/or blur and filtering blocks 2540, FIG. 38; 2642, 2644, FIG. 39, or 2742, 2744, FIG. 40) to different data sets (e.g., corresponding to spatial regions) within a scene such as scene 200, FIG. 2. Table 2 summarizes blur removal processing results for a given spatial region in scene 200, and corresponding processing parameters.

TABLE 2

Exemplary blur removal applications and corresponding processing parameters.

| Spatial Region | Processing Parameters | Exemplary Results |
| --- | --- | --- |
| Sky 210 | Object has very little spatial detail | No signal processing to remove blur is performed |
| Clouds 220 | Object has small amount of spatial detail | Signal processing is adjusted so that blur is removed at low spatial frequencies |
| Grass 230 | Object has high spatial detail but low contrast | Signal processing is adjusted to remove blur at all spatial frequencies but without excessive sharpening, since amplified noise may overwhelm signal |
| Shadow 240 | Object has very low intensity | No signal processing to remove blur is performed |
| Fence 250 | Object has moderate spatial detail and high contrast | Signal processing is adjusted so that blur is removed from low and mid spatial frequencies |
| Sun 260 | Intensity saturates sensor | No signal processing to remove blur is performed |
| Basket 270 | Object has high spatial detail and high contrast | Signal processing is adjusted to remove blur from high and low spatial frequencies |
| Balloon 280 | Object has moderate spatial detail in the form of color variations | Signal processing is adjusted so that blur is removed from low and mid spatial frequencies in appropriate color channels |

Figure 41:
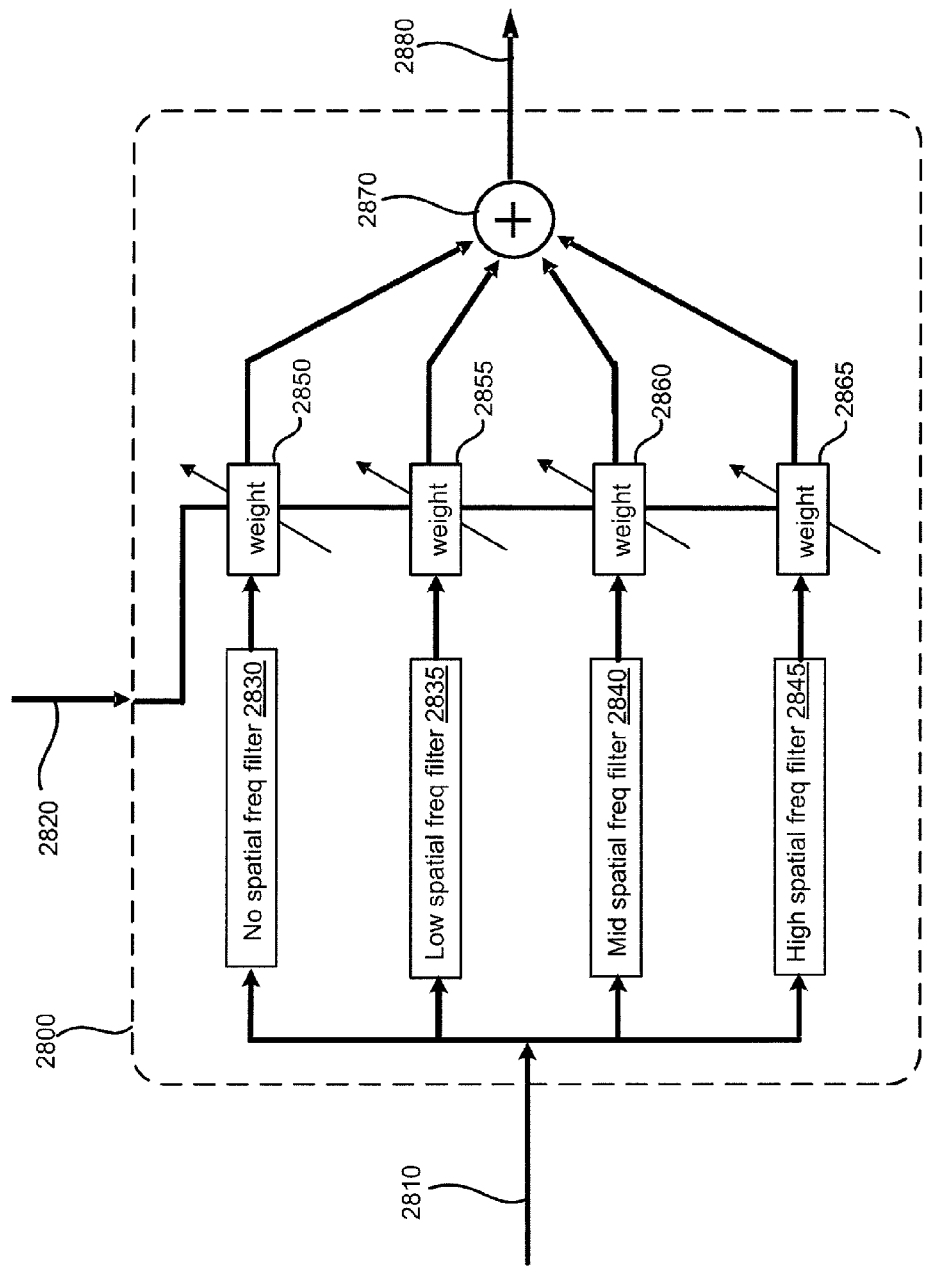
FIG. 41 is a diagrammatic illustration of a blur removal block, shown here to illustrate the processing of electronic data according to weighting factors of various spatial filter frequencies, in accordance with an embodiment.

A blur removal block (e.g., any of blur removal and/or blur and filtering blocks 2540, FIG. 38; 2642, 2644, FIG. 39, or 2742, 2744, FIG. 40) may also generate and sum weighted versions of separate processes that work with different spatial frequencies, such as those summarized in FIG. 41.

FIG. 41 illustrates how a blur removal block 2800 may process electronic data according to weighting factors of various spatial filter frequencies. Input electronic data (e.g., captured data) is supplied as data 2810. Spatial frequency content analysis of the input electronic data (e.g., by either of spatial parameter estimator block 2730 or color parameter estimator block 2731, FIG. 40) determines processing parameters 2820. Filters 2830, 2835, 2840 and 2845 are no-, low-, mid- and high-spatial frequency filters that form output that is weighted by weights 2850, 2855, 2860 and 2865 respectively before being summed at an adder 2870 to form processed data 2880. For example, filters 2830 and 2835, for no- or low-spatial frequency filtering, have high weights 2850 and 2855 respectively for processing homogeneous image regions (e.g., in blue sky region 210, FIG. 2, where there is little or no image detail) and low weights 2850 and 2855 for processing regions with high spatial frequencies (e.g., in grass 230, fence 250 or basket 270 regions in scene 200, FIG. 2, that contain fine detail).

Blur removal block 2800 thus (a) utilizes processing parameters 2820 to select weights 2850, 2855, 2860 and 2865, (b) generates weighted versions of filters 2830, 2835, 2840 and 2845, and (c) sums the weighted versions, as shown, before passing the processed electronic data 2880 as output or for further image processing. Instead of three spatial frequency filters corresponding to "low," "mid" and "high" spatial frequencies, a spatial frequency spectrum may be divided into only two or more than three spatial frequency ranges. The illustrated sequence of operations may be reversed; that is, each channel may perform frequency filtering after a weight is applied.

Figure 42:
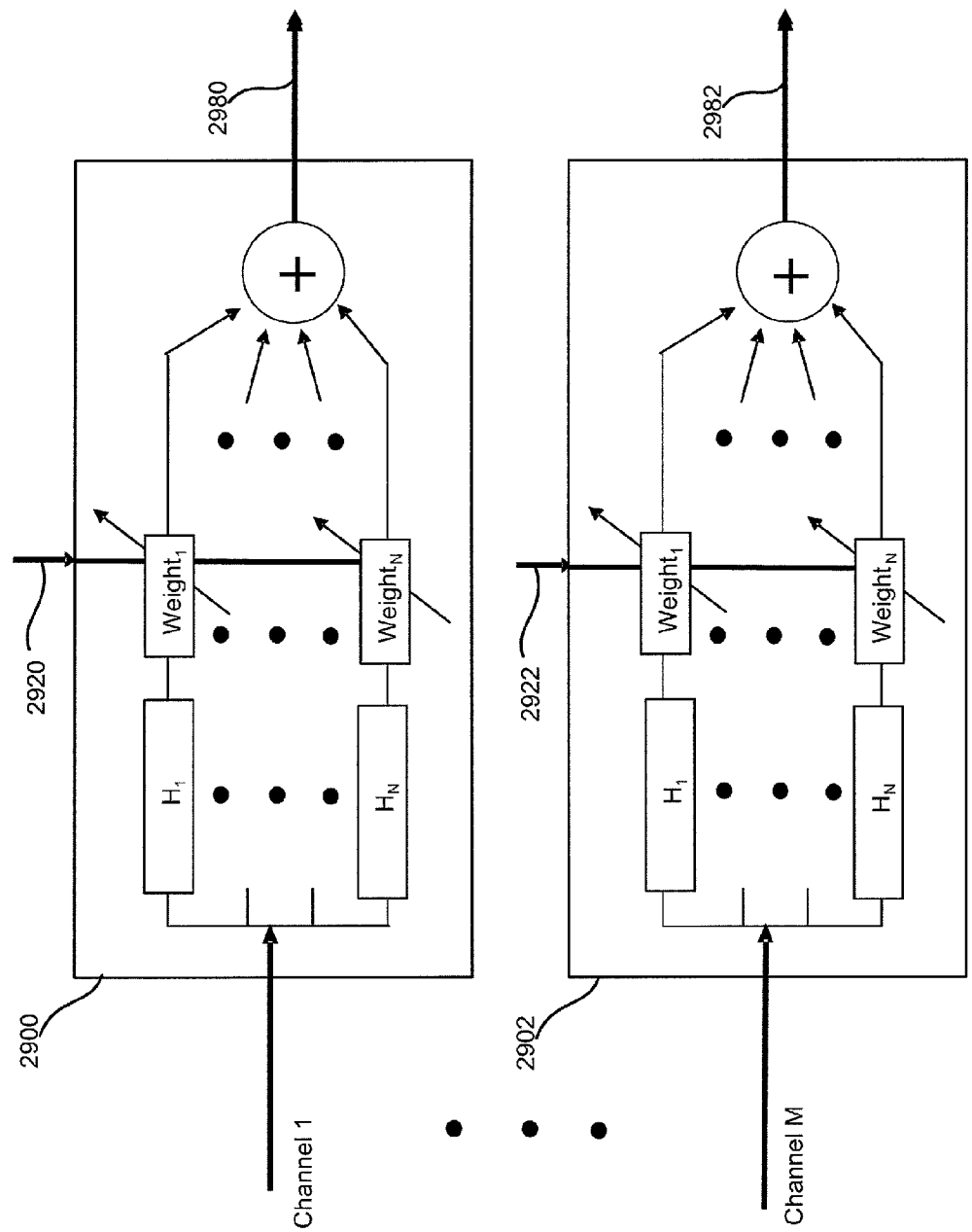
FIG. 42 is a diagrammatic illustration of another blur removal block, shown here to illustrate the implementation of N processes across M multiple channels, in accordance with an embodiment.

Blur removal may also be performed on a plurality of channels, such as channels corresponding to different color components of a digital image. FIG. 42 shows a generalization of weighted blur removal for N processes across M multiple channels. Channels 1 through M may be, for example, each color in a 3-channel RGB image, where M=3 (ellipsis indicating where an appropriate number of blur removal blocks may be utilized to support any number M of channels). Blur removal blocks 2900 and 2902 are representative blur removal blocks for an M-channel system. $H_1$ through $H_N$ represent, for example, spatial frequency dependent filters (e.g., spatial frequency filters 2830, 2835, 2840 and 2845 of FIG. 41, replicated for each of blur removal blocks 2900 and 2902 and indicated by ellipsis as replicated for any number N of spatial frequency filters). Weights $Weight_1$ through $Weight_N$ for each of blur removal blocks 2800, 2802 are adjusted according to processing parameters 2920, 2922 respectively. Output of each of blur removal blocks 2900, 2902 are processed data 2980 and 2982 respectively.

Nonlinear Processing—Techniques

Figure 43:
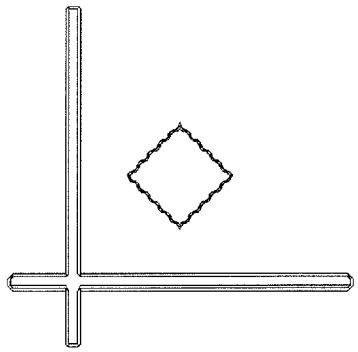
FIGS. 43-46 show progression of exemplary processing of electronic data corresponding to an exemplary object, shown here to illustrate operation of a prefilter to remove a portion of blur while a nonlinear process removes remaining blur to form a further processed image, in accordance with an embodiment.
Figure 44:
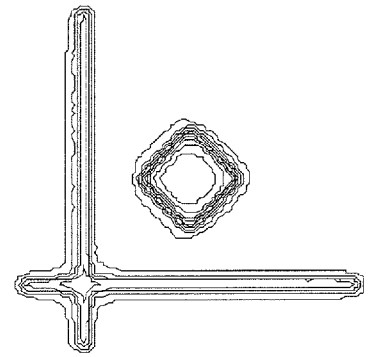

FIGS. 43-46 illustrate operation of a system in which a prefilter performs a certain portion of blur removal while a nonlinear process removes remaining blur to form a further processed image. FIG. 43 shows an object to be imaged, and FIG. 44 represents an intermediate image formed utilizing cosine optics that implement wavefront coding with a phase (r, θ) as defined by Eq. 1 above where, again, n=7, 0≦r≦1, $a_1$=5.4167, $a_2$=0.3203, $a_3$=3.0470, $a_4$=4.0983, $a_5$=3.4105, $a_6$=2.0060, $a_7$=−1.8414, w=3, 0≦θ≦2π radians and $$z = \begin{cases} \frac{z-r}{1-r} & \text{when } r \geq 0.5, \\ 0 & \text{when } r < 0.5. \end{cases}$$

Figure 45:
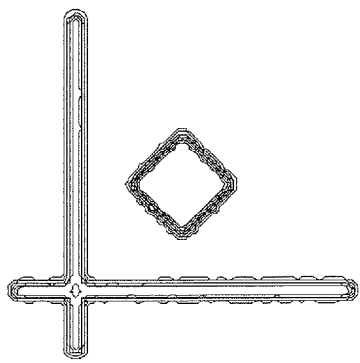

FIG. 45 represents electronic data from FIG. 44 after prefiltering by performing a linear convolution of the electronic data with a prefilter kernel that has unity sum and an RMS value of 0.8729. The unity sum of the prefilter kernel may be construed to indicate that the average intensity of the prefiltered image (FIG. 45) is equal to the average intensity of the intermediate image (FIG. 44). However, in the present context, "unity sum" may be understood to mean that the sum of point-by-point intensities after prefiltering may equal a scalar number, as opposed to one, since prefiltering may be implemented by hardware that executes integer multiplication and addition instead of floating point arithmetic. An RMS value below 1.0 means that noise in the prefiltered image is reduced relative to noise in the intermediate image.

The prefilter kernel may be derived by dividing a complex autocorrelation of $e^{-j2\pi(phase(r,\theta))}$ into a Gaussian shaped target q(r, θ) that is defined by $$q(x, y) = e^{bx^2 - by^2}, \text{ AND } q(r, \theta) = q(x, y)|_{\substack{x=r\cos\theta \\ y=r\sin\theta}} \quad \text{EQ. 3}$$

where −1≦x≦1, −1≦y≦1, radius 0≦r≦1, 0≦θ≦2π radians, b=2.5. Target shapes other than a Gaussian are also usable. After dividing, the division result is inverse Fourier transformed and the real part is taken to obtain the prefilter kernel.

As may be seen in the above figure, FIG. 45 continues to be blurred after the prefiltering operation.

Figure 46:
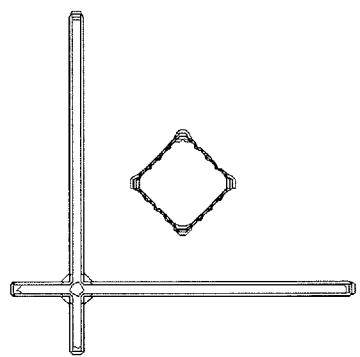
Figure 47:
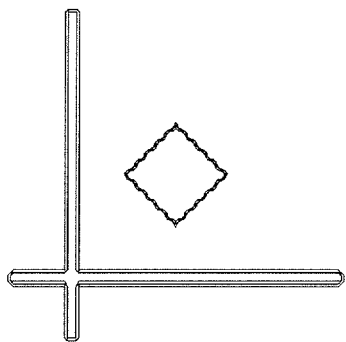
FIGS. 47-50 show progression of another exemplary processing of electronic data corresponding to the same exemplary object, shown here to illustrate operation of a prefilter to remove a portion of blur while a nonlinear process removes remaining blur to form a further processed image, in accordance with an embodiment.

FIG. 46 is obtained from FIG. 45 by implementing a shock-filter routine such as that described in "Diffusion PDEs on Vector-Valued Images," IEEE Signal Processing Magazine, pp. 16-25, vol. 19, no. 5, September 2002. FIG. 46 may be seen to closely resemble the original object shown as FIG. 43.

FIGS. 47-50 illustrate operation of a system similar to that illustrated in FIGS. 43-46 except that, in FIGS. 47-50, the prefilter is formed such that it has an RMS value of 1.34. A prefilter RMS value greater than 1.0 may lead to noise amplification greater than one in the processed image.

Figure 48:
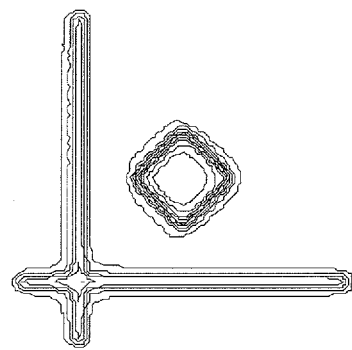
Figure 49:
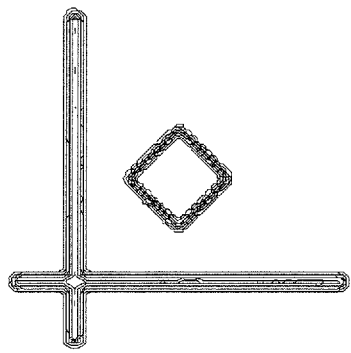
Figure 50:
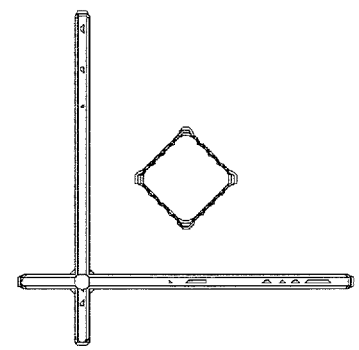

FIG. 47 again represents an object to be imaged; FIG. 48 represents an intermediate image formed from FIG. 47 utilizing cosine optics that implement the same phase(r, θ) function described by Eq. 1 above. FIG. 49 represents data corresponding to FIG. 48 after prefiltering with a kernel formed with a value of b=2.1 in Eq. 2, leading to the prefilter RMS value of 1.34. FIG. 50 is obtained from FIG. 49 by implementing the shock-filter routine described above in connection with FIGS. 43-46. FIG. 50 may be seen to closely resemble the original object shown as item A, except that FIG. 50 contains artifacts due to the prefilter used, as compared to FIG. 46.

Nonlinear and spatially varying processing may also be utilized to compensate for variations in optics induced, for example, by temperature. A temperature detector in or near optics of an imaging system may provide input to a processor which may then determine a filter kernel that adjusts processing to compensate for the temperature of the optics. For example, a system may derive a filter kernel for processing of each image, utilizing a parameter chosen, depending on temperature of the optics, from a lookup table. Alternatively, a set of filter kernels may be stored, and a lookup table may be utilized to load an appropriate filter kernel, depending on the temperature of the optics.

Figure 51:
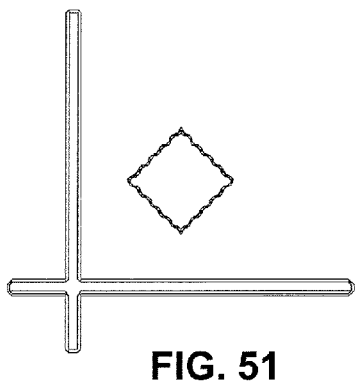
FIGS. 51-54 show processing progressions of the same exemplary object of FIGS. 43-46 and FIGS. 47-50 but including temperature dependent optics in the imaging system.
Figure 52:
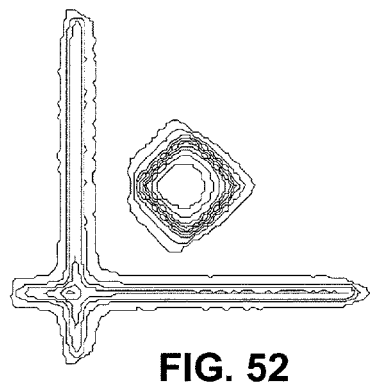
Figure 53:
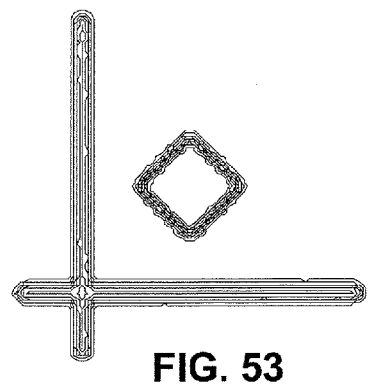
Figure 54:
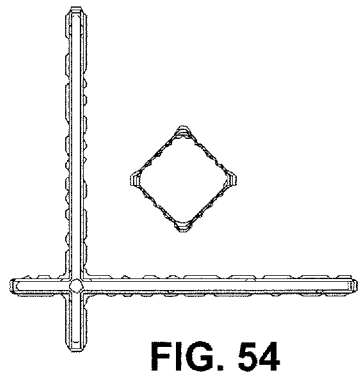

FIGS. 51-54 illustrate compensation for variation in optics induced by temperature. In a simulated optical system, operation at a second temperature temp2 causes a second order ½ wave defocus aberration as compared to performance of the system at a nominal temperature temp1. This effect may be expressed as phase(r, θ)$_{temp2}$=phase(r, θ)$_{temp1}$+0.5$r^2$, where 0≦r≦1. Therefore, a prefilter kernel that may be utilized with a data stream acquired when optics are at temperature temp2 may be derived by dividing an autocorrelation of $e^{-j2\pi(phase(r,\theta)_{temp2})}$ into the Gaussian target described in Eq. 3 above. This transforms a representation of the filter in frequency space from the filter shown at left below, to the filter shown at right below, both representations being shown in spatial coordinates:

FIGS. 51-54 show images of the same object shown in FIGS. 43-46 and FIGS. 47-50, but for a system utilizing temperature dependent optics. FIG. 51 represents an object to be imaged. FIG. 52 represents an intermediate image formed utilizing cosine optics that implement the same phase(r, θ) function described by Eq. 1 above at a temperature temp 1, but the image in FIG. 52 is taken at a temperature temp2, adding ½ wave of misfocus aberration. FIG. 53 represents the electronic data of FIG. 52 after prefiltering with a prefilter that includes the ½ wave misfocus aberration correction described above. FIG. 54 is obtained from FIG. 53 by implementing the shock-filter routine described above in connection with FIGS. 43-46. FIG. 54 may be seen to resemble the original object shown as FIG. 51.

Figure 55:
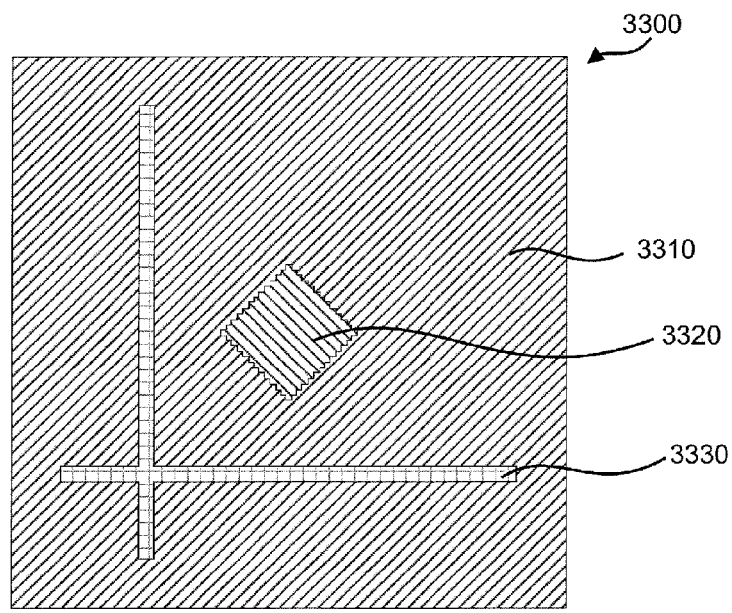
FIG. 55 shows a black-and-white representation of a color object, wherein different linear shading patterns correspond to different colors in the color object.

FIG. 55 shows an object 3300 to be imaged, and illustrates how color intensity information may be utilized to determine spatially varying processing. A diamond 3320 included in object 3300 has color information but not intensity information; that is, diamond 3320 is orange (represented by a first diagonal fill) while a background 3310 is gray (represented by a second diagonal fill), with diamond 3320 and background 3310 having the same overall intensity. Crossed bars 3330 in object 3300 have both color and intensity information; that is, they are pink (represented by crossed horizontal and vertical fill) and are lighter than background 3310. The difference in the information content of the different portions of object 3300 is illustrated below by way of red-green-blue ("RGB") and luminance-chrominance ("YUV") images of object 3300, as shown in FIGS. 56-58 and FIGS. 59-61. Note that numerals 3310, 3320 and 3330 are utilized in the following drawings to indicate the same background, diamond and crossed bars features shown in FIG. 55 even though the appearance of such features may differ from appearance in FIG. 55.

Figure 56:
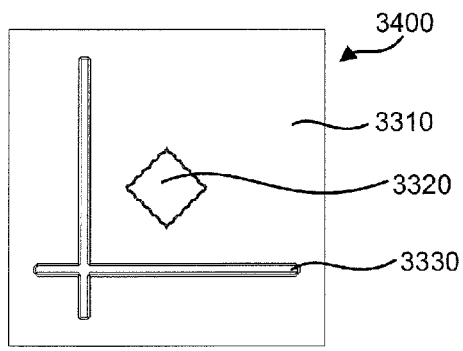
FIGS. 56-58 show electronic data representations of red, green and blue images, respectively, as obtained from imaging the color object of FIG. 55, in accordance with an embodiment.
Figure 57:
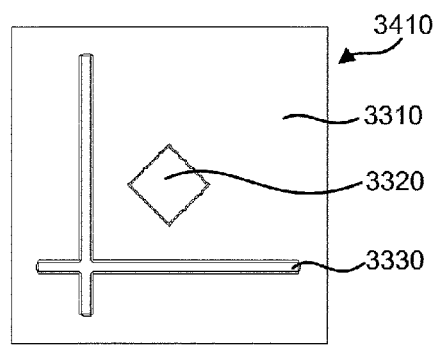
Figure 58:
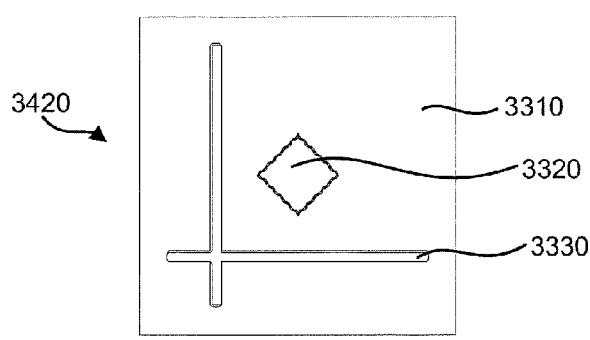

FIGS. 56-58 show RGB images obtained from imaging object 3300. Image 3400 shows data of the R (red) channel, image 3410 shows data of the G (green) channel and image 3420 shows data of the B (blue) channel. As may be seen in FIGS. 56-58, diamond 3320 and crossed bars 3330 are clearly visible against background 3310 in each of images 3400, 3410 and 3420.

Figure 59:
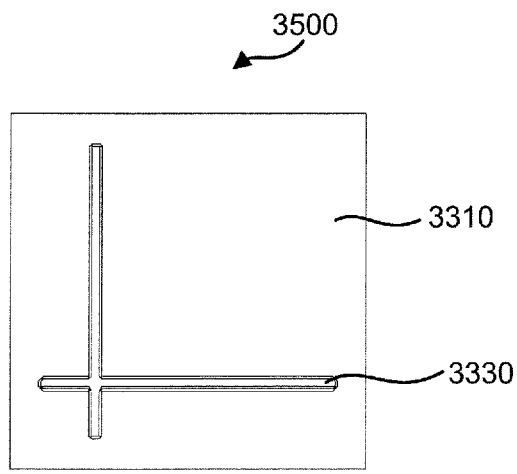
FIGS. 59-61 show electronic data representations of YUV images, respectively, as obtained from imaging the color object of FIG. 55, in accordance with an embodiment.
Figure 60:
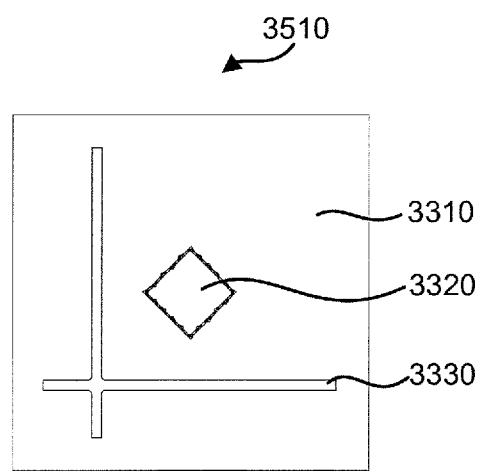
Figure 61:
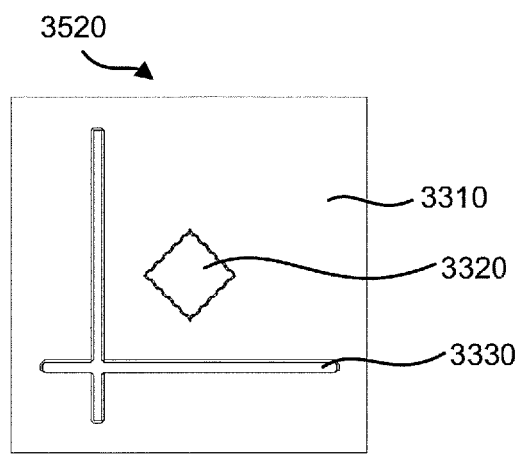

However, when object 3300 is instead converted into luminance (Y) and chrominance (U and V) channels, diamond 3320 is not present in the Y channel. FIGS. 59-61 show YUV images obtained from imaging object 3300. Image 3500 shows data of the Y (intensity) channel, image 3510 shows data of the U (first chrominance) channel and image 3520 shows data of the V (second chrominance) channel. U and V channel images 3510 and 3520 do show both diamond 3320 and crossed bars 3330, but Y channel image 3500 shows only crossed bars 3330, and not diamond 3320.

Therefore, diamond 3320 and crossed bars 3330 in object 3300 both present information in each of three color (RGB) channels when processed in the RGB format (see FIGS. 56-58), but diamond 3320 presents no information in the Y channel (FIG. 59) when processed in the YUV format. Although YUV format is preferred in certain applications, lack of Y information may hinder effective reconstruction of an image.

Processing that detects an absence of intensity information and modifies processing accordingly (sometimes referred to herein as "adaptive reconstruction") may produce a superior processed image as compared to a system that does not vary processing according to an absence of intensity information (sometimes referred to herein as "non-adaptive reconstruction"). In other words, adaptive processing may improve a processed image when information is completely missing from one channel.

Figure 62:
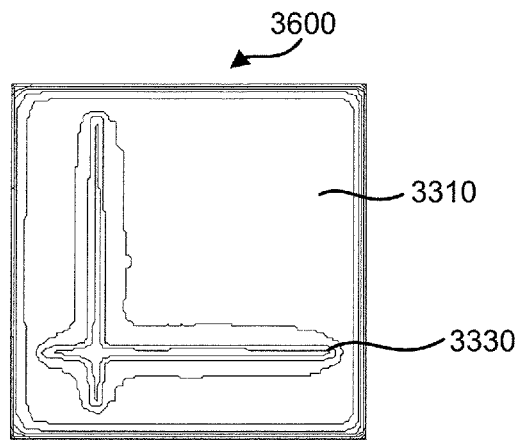
FIGS. 62-64 show electronic data representations of YUV images, respectively, as obtained from imaging the color object of FIG. 55, by an imaging system including cosine optics to form RGB images then processing the RGB images to convert them into YUV format, in accordance with an embodiment.
Figure 63:
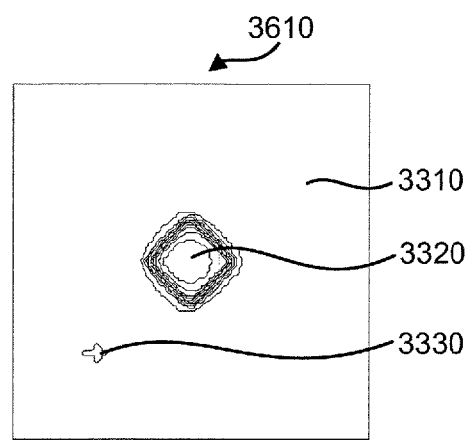
Figure 64:
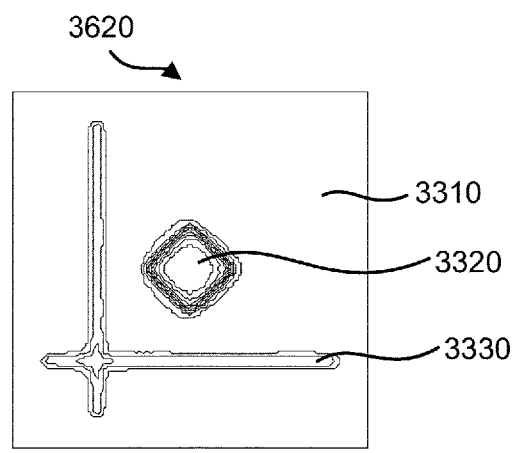

FIGS. 62-64 show electronic data 3600, 3610 and 3620 respectively of object 3300, taken through an imaging system that utilizes cosine optics as described earlier, and converts the image into YUV format. Diamond 3320 is recognizable in each of the U and V electronic data 3610 and 3620 respectively, but not in the Y electronic data 3600.

Figure 65:
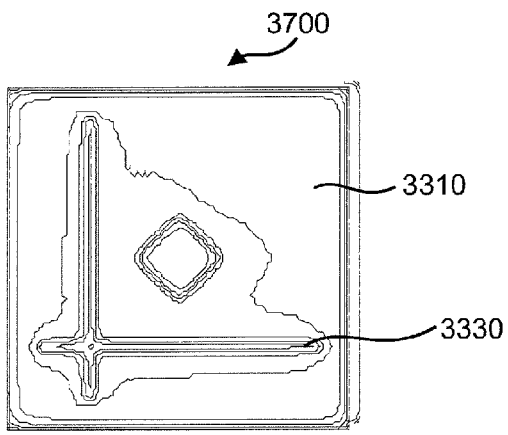
FIGS. 65-67 show electronic data representations of RGB images, respectively, as obtained by processing the YUV electronic data of FIGS. 62-64 to convert them back into RGB format, in accordance with an embodiment.
Figure 66:
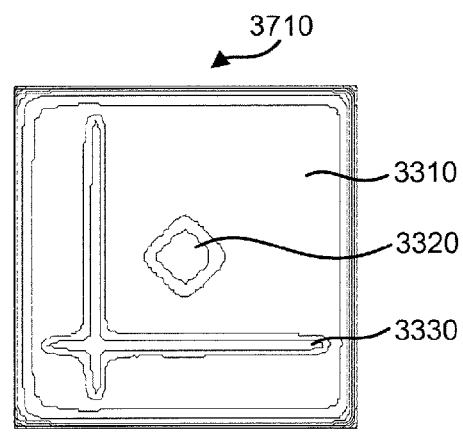
Figure 67:
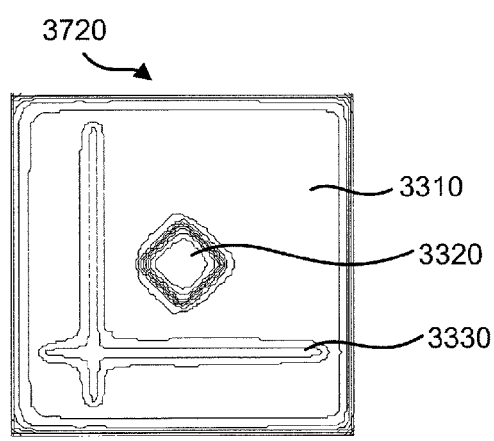

FIGS. 65-67 illustrate results obtained when the YUV electronic data shown in FIGS. 62-64 is processed and converted back into RGB format. FIGS. 65-67 show R electronic data 3700, G electronic data 3710 and B electronic data 3720 respectively. Note that electronic data in each of the channels, and particularly G electronic data 3710, is different from the original RGB data shown in FIGS. 56-58. In RGB electronic data 3700, 3710 and 3720, generated with cosine optics, diamond 3320 is visible in all three R, G and B channels.

Figure 68:
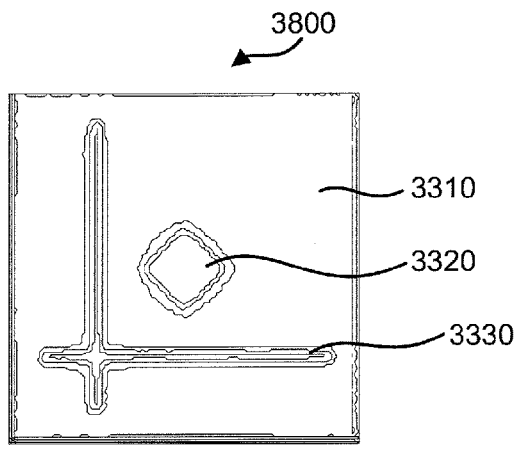
FIGS. 68-70 show electronic data representations of RGB images, respectively, as obtained by performing an RGB reconstruction of the YUV electronic data of FIGS. 62-64 using only the Y channel, in accordance with an embodiment.
Figure 69:
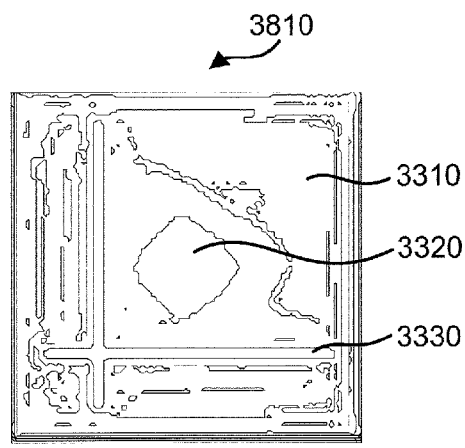
Figure 70:
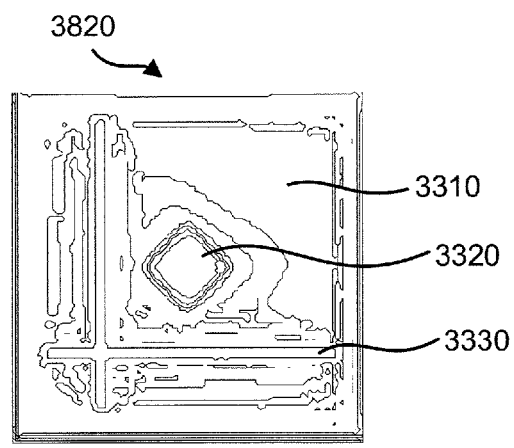

FIGS. 68-70 illustrate results obtained when RGB reconstruction of the image uses only the Y channel of a YUV image. FIGS. 68-70 show R electronic data 3800, G electronic data 3810 and B electronic data 3820 respectively. Use of Y channel information alone is seen to result in RGB images with degraded image quality in all channels.

Figure 71:
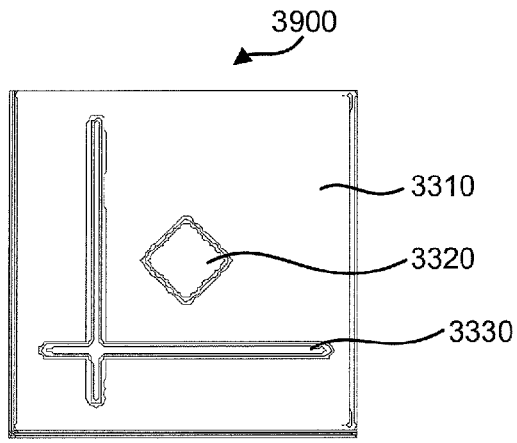
FIGS. 71-73 show electronic data representations of RGB images, respectively, as obtained by performing an RGB reconstruction of the YUV electronic data of FIGS. 62-64 with variable processing according to lack of intensity information, in accordance with an embodiment.
Figure 72:
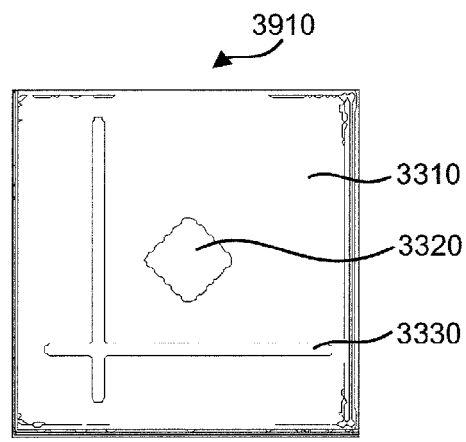
Figure 73:
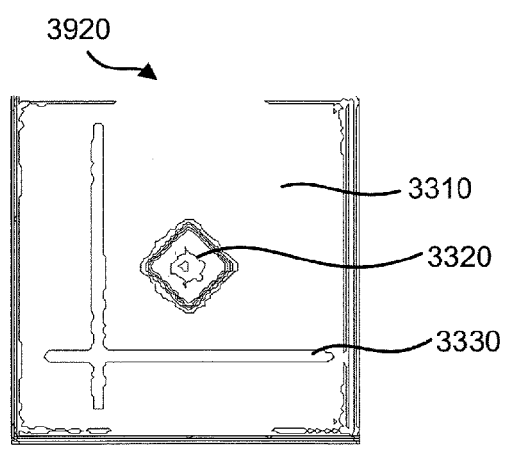

FIGS. 71-73 illustrate results obtained when YUV electronic data 3600, 3610 and 3620 are processed and converted back into RGB format, with the processing varied according to the lack of intensity information (e.g., lack of diamond 3320) in electronic data 3600. FIGS. 71-73 show R electronic data 3900, G electronic data 3910 and B electronic data 3920 respectively. Note that electronic data 3900, 3910 and 3920 show diamond 3320 are "tighter" (i.e., lines that are straight in object 3300 are straighter) than in electronic data 3800, 3810 and 3820 (FIG. 38). Also, electronic data 3910 (i.e., the green channel) looks more like object 3300 than does electronic data 3810. Therefore, reconstruction using all of the Y, U and V channels results in RGB images with improved quality in all channels over reconstruction using only the Y channel.

Nonlinear Processing—Implementation

A variety of nonlinear operations may be classified as "operators" herein and may be utilized in a blur removal block (e.g., any of blur removal and/or blur and filtering blocks 2540, FIG. 38; 2642, 2644, FIG. 39, or 2742, 2744, FIG. 40). A threshold operator may, for example, discard or modify electronic data above or below a certain threshold (e.g., a pixel or color intensity value). The threshold operator may create a binary image, clip a bias or create saturation from a grayscale image, and may operate in the same manner for all data of an image or may vary depending on the electronic data. An edge enhancement operator may, for example, identify edges and modify the electronic data in the vicinity of the edges. The edge enhancement operator may utilize a differentiator or directionally sensitive transforms, such as wavelet transforms, to identify edges, and may perform identical enhancement of all edges in an image, or may vary the edge enhancement for various parts of the image. An inflection emphasis operator may, for instance, identify inflections and modify the electronic data in the vicinity of the inflections. The inflection emphasis operator may include shock filters and diffusion operators such as described in "Diffusion PDEs on Vector-Valued Images", *IEEE Signal Processing Magazine*, pp. 16-25, vol. 19, no. 5, September 2002. The inflection emphasis operator may perform identical modification of all inflections in an image, or may vary the modification for various parts of the image. A gradient operator may identify gradients in electronic data and may modify the electronic data identically at all gradients in an image, or may vary the modification for various parts of the image. The gradient operator may be used to process images based on the difference between adjacent pixel values (e.g., a local gradient). A diffusion operator may identify homogeneous or inhomogeneous regions and may perform an operation on the homogeneous or inhomogeneous regions, or may identify the regions for additional processing.

Figure 74:
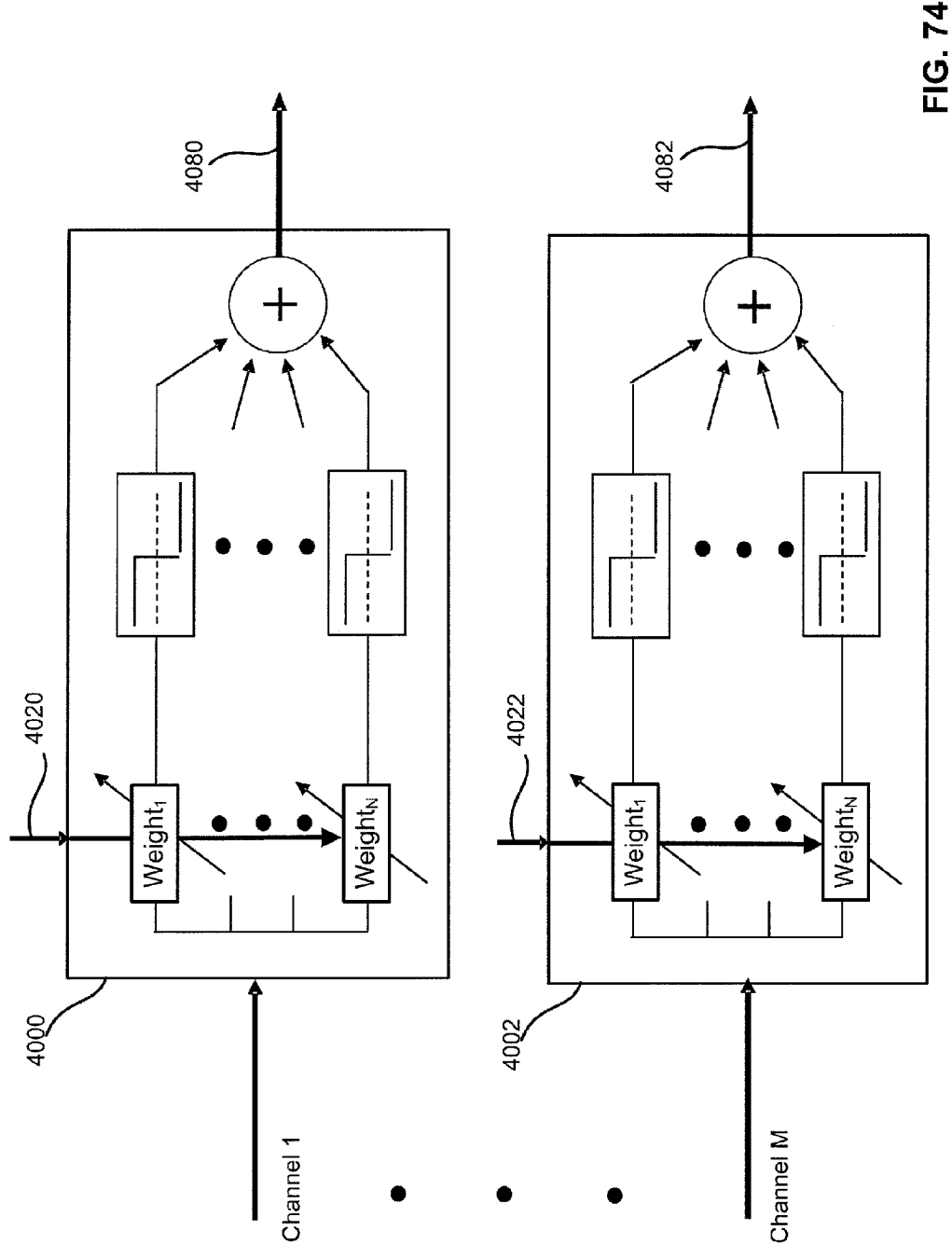
FIG. 74 is a diagrammatic illustration of a blur removal block may for generating a weighted sum of nonlinear operators, in accordance with an embodiment.

FIG. 74 illustrates how a blur removal block 4000 (e.g., any of blur removal and/or blur and filtering blocks 2540, FIG. 38; 2642, 2644, FIG. 39; or 2742, 2744, FIG. 40) may generate a weighted sum of nonlinear operators. FIG. 74 shows blur removal blocks 4000 and 4002 (or any number M of blur removal blocks, as indicated by ellipsis) that process nonlinear operators and sum their outputs before passing electronic data output 4080 and 4082 as output or for further image processing. Analysis of electronic data (e.g., by either of spatial parameter estimator block 2730 or color parameter estimator block 2731, FIG. 40) may determine optional processing parameters 4020 and 4022; alternatively, each of blur removal blocks 4000 and 4002 may utilize fixed weighting. The illustrated sequence of operations may be reversed; that is, each channel may apply nonlinear operators before applying a weight and summing the outputs.

Figure 75:
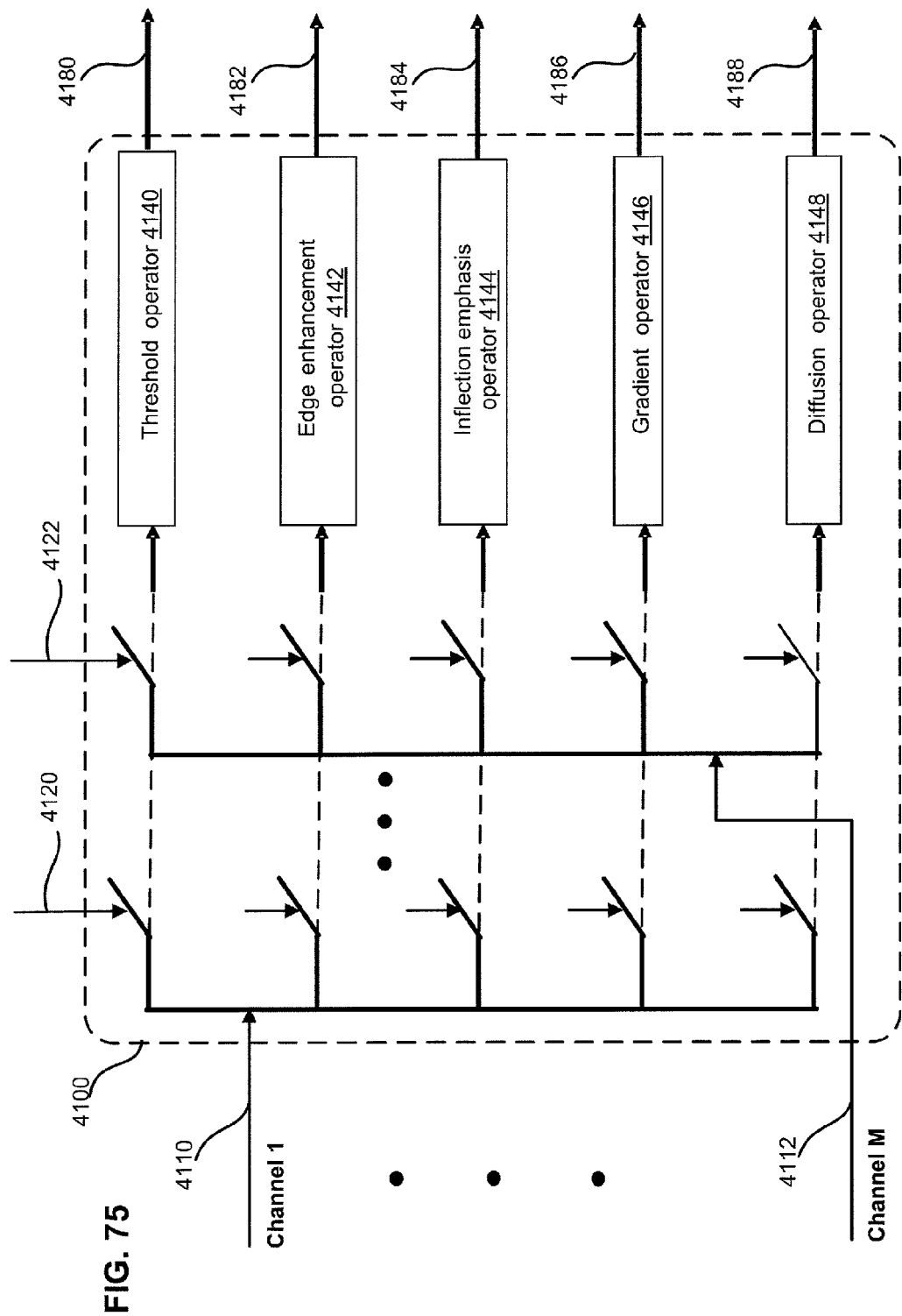
FIG. 75 is a diagrammatic illustration of a blur removal block containing nonlinear operators that operate differently on different data sets of an image or on different image channels, in accordance with an embodiment.

FIG. 75 illustrates how a blur removal block 4100 (e.g., any of blur removal and/or blur and filtering blocks 2540, FIG. 38; 2642, 2644, FIG. 39, or 2742, 2744, FIG. 40) may contain nonlinear operators that operate in a different fashion on different data sets of an image, or may operate on different image channels. Input electronic data channels 4110, 4112 (and, as indicated by ellipsis, up to M electronic data channels) may be operated on by different operators depending on image input parameters 4120, 4122 (and up to M corresponding input parameters). Nonlinear operators shown in FIG. 75 include a threshold operator 4140, an edge enhancement operator 4142, an inflection emphasis operator 4144, a gradient operator 4146 and a diffusion operator 4148, but other nonlinear operators may also be utilized. Output data 4180, 4182, 4184, 4186 and 4188 may be passed as output or for further image processing.

Figure 76:
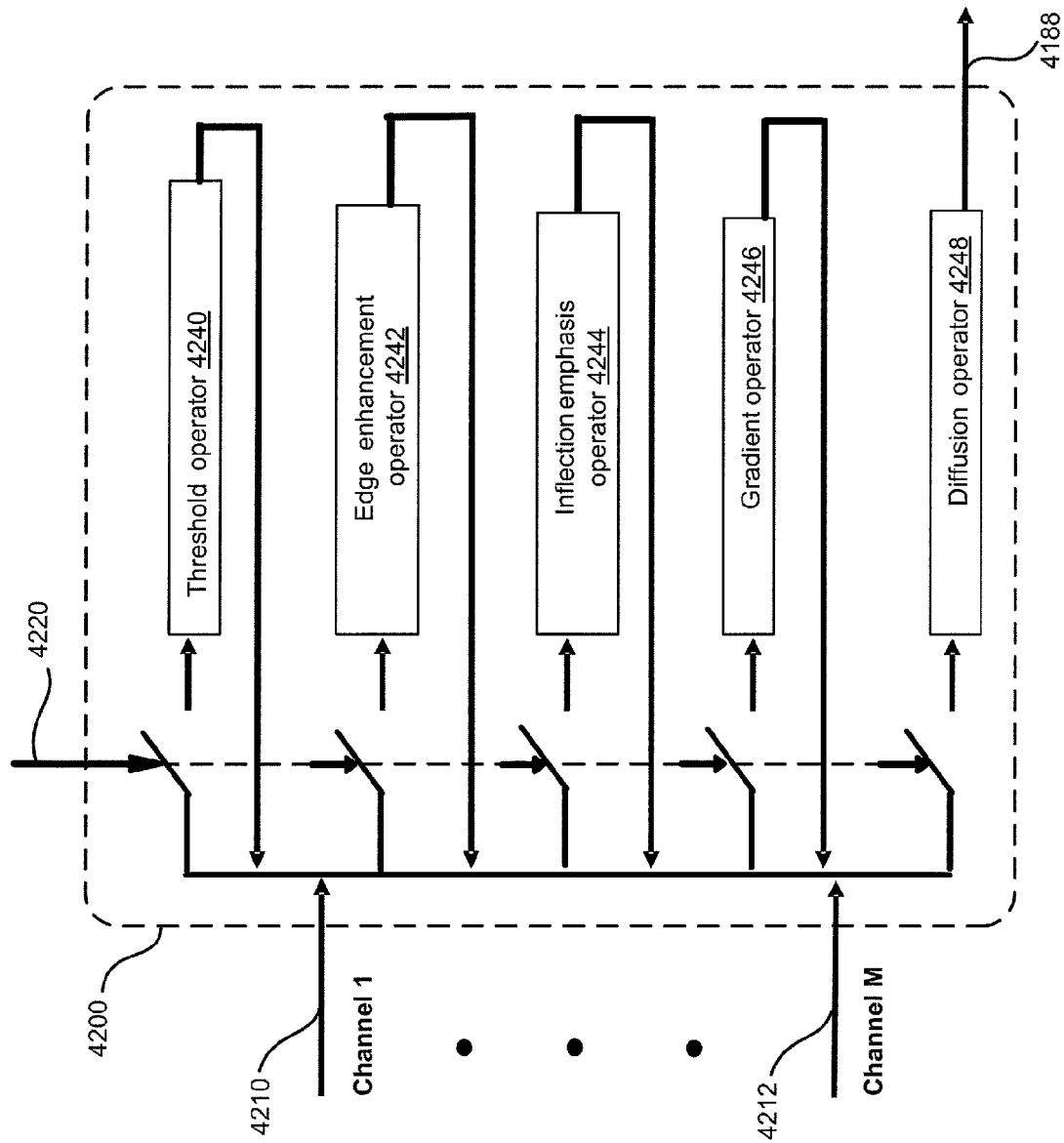
FIG. 76 is a diagrammatic illustration of a blur removal block for processing electronic data from different data sets of an image, or from different channels, in a serial, parallel or recursive manner, in accordance with an embodiment.

FIG. 76 illustrates how a blur removal block 4200 (e.g., any of blur removal and/or blur and filtering blocks 2540, FIG. 38; 2642, 2644, FIG. 39, or 2742, 2744, FIG. 40) may process electronic data from different data sets of an image, or from different channels, in either serial or parallel fashion, or recursively. Input electronic data channels 4210, 4212 (and, as indicated by ellipsis, up to M electronic data channels) may be operated on by different operators depending on image input parameters 4220 (and up to M corresponding input parameters, not shown, corresponding to the N input channels). Nonlinear operators shown in FIG. 76 include a threshold operator 4240, an edge enhancement operator 4242, an inflection emphasis operator 4244, a gradient operator 4246 and a diffusion operator 4248, but other nonlinear operators may also be utilized. Output data 4288 may be passed as output or for further image processing. Results from one nonlinear operator (e.g., partially processed electronic data) may thus be further processed by another nonlinear operator before being passed on to the next part of the image processing, as shown. Recursive processing may be employed; that is, a given data stream may be processed repeatedly through any one of the nonlinear operators shown. When recursive processing is utilized, the processing may be repeated in a fixed sequence or number of iterations, or processing may proceed until a figure of merit for a resulting image is met.

Systems utilizing nonlinear and/or spatially varying processing may advantageously utilize a prefilter to prepare data for further processing. A prefilter may accept as input electronic data and processing parameters for one or more image regions. A particular prefilter may utilize processing parameters and produce an output. For example, a prefilter may be an all-pass filter, a low-pass filter, a high-pass filter or a band-pass filter. Relationships between a prefilter type, processing parameters and output of the prefilter are shown in TABLE 3 below.

TABLE 3

Prefilter types, processing parameters and outputs.

| Prefilter Type | Processing Parameters | Output |
| --- | --- | --- |
| All-pass | Processed response has no RMS value increase or decrease | Starting with a non-symmetric response, forms a symmetric response that is better suited to nonlinear signal processing that performs blur removal |
| Low-pass | Processed response has a small decrease in RMS value, $0.5 \leq \Delta RMS \leq 1.0$ | Provides a smoother image that is better suited to nonlinear signal processing that performs aggressive blur removal |
| Band-pass or High-pass | Processed response has a small increase in RMS value, $1.0 \leq \Delta RMS \leq 1.5$ | Provides a sharper image that is better suited to nonlinear signal processing that performs non-aggressive blur removal |

Additionally, an all-pass or low-pass filter may be desirable in low signal-to-noise applications where a band-pass or high-pass filter may contribute to a poor processed image due to noise amplification.

Capture of User Preferences for User Optimized Processing

Figure 77:
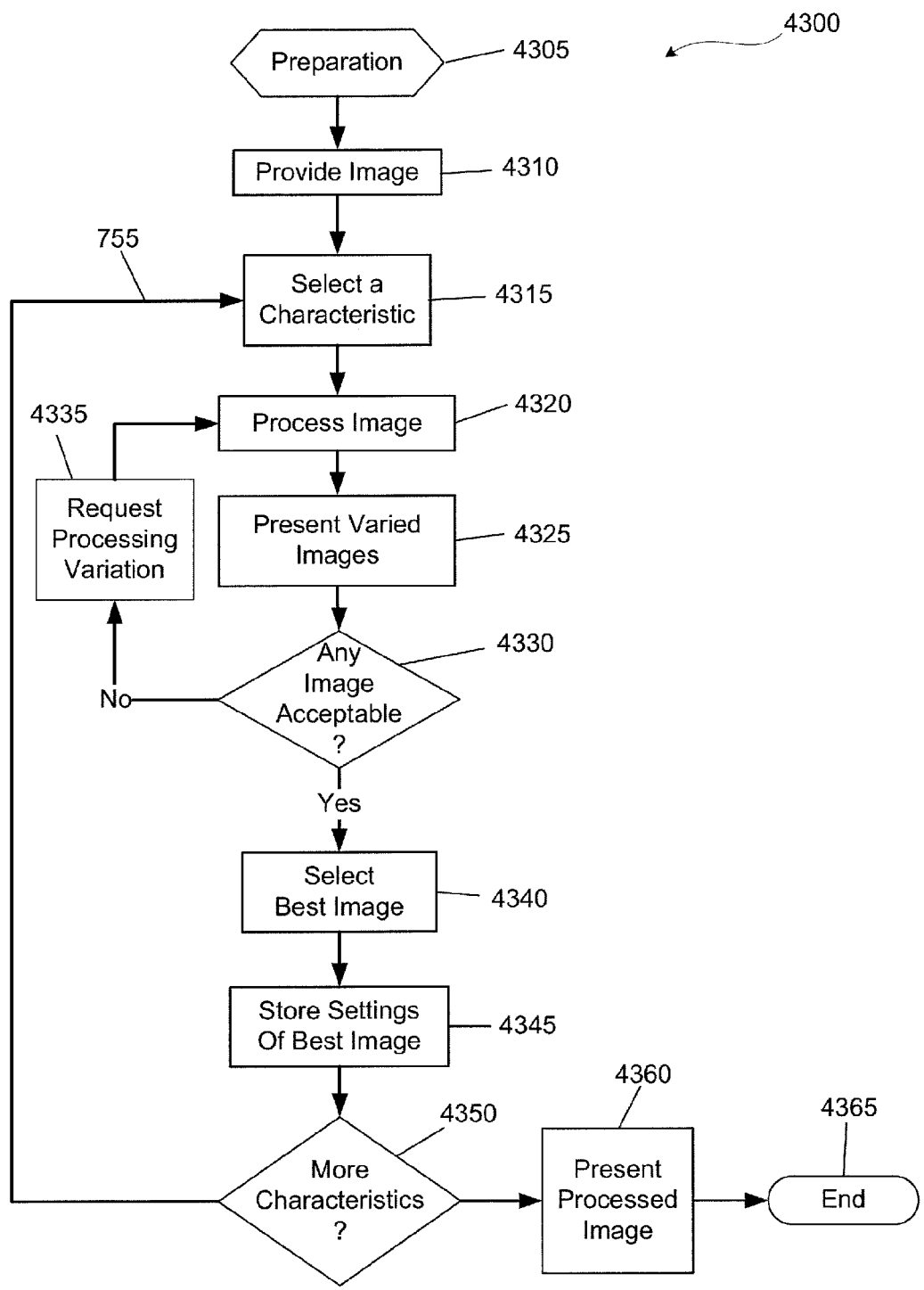
FIG. 77 shows a flowchart of a process for selecting processing parameters for enhancing image characteristics, in accordance with an embodiment.

FIG. 77 shows a flowchart of a method 4300 for selecting process parameters for enhancing image characteristics. Method 4300 provides for quantifying processing parameters that relate to subjective characteristics and factors that a particular user associates with image quality. Method 4300 starts with an optional preparation step 4305 wherein any necessary setup operations are performed. For example, exposure times, aperture and digital image formatting may be determined or configured in step 4305. After step 4305, method 4300 advances to step 4310 that provides an image for the user to evaluate. Step 4310 may include capturing one or more images are using the settings determined in step 4305, or step 4310 may provide the one or more images from a library of stored images. Next, in step 4315 a characteristic is selected; such characteristics may include, for example, sharpness, brightness, contrast, colorfulness and/or noisiness. In step 4320, an image provided by step 4310 is processed by an algorithm associated with the selected characteristic. For example, if sharpness is the selected characteristic, then a sharpening or de-sharpening algorithm is applied to the image at varying degrees whereby producing a series of sharpened or de-sharpened images. Next, in step 4325, the series of processed images are presented through a display device to the user for review. The series of images may include, for example, a set of three images that are individually unsharpened, lightly sharpened and heavily sharpened by applying a default set of sharpening parameters (a set of three images is exemplary; two, four or more images may also be presented). In step 4330, the user determines if any of the images are acceptable as an enhanced image. If none of the presented images is acceptable, method 4300 advances to step 4335, in which processing variations may be requested (e.g., more or less sharpening), and returns to step 4320. If one or more of the presented images are acceptable, the image most acceptable to the user is selected during step 4340. Once an image has been selected during step 4340, the settings and parameters associated with processing of the selected characteristic are stored for later retrieval. Next, in step 4350, the user is presented with an option to select and modify further characteristics of the image. If a decision is made to modify another characteristic then method 4300 returns to step 4315 via looping pathway 4335 and another characteristic may be selected. If a decision is made to not modify other characteristics then method 4300 proceeds to step 4360 wherein the processed image is presented. Following presentation, method 4300 ends with an end step 4365 wherein finalization tasks such as clearing memory or a display device may be performed.

Compensating for Over-Processing

Figure 78:
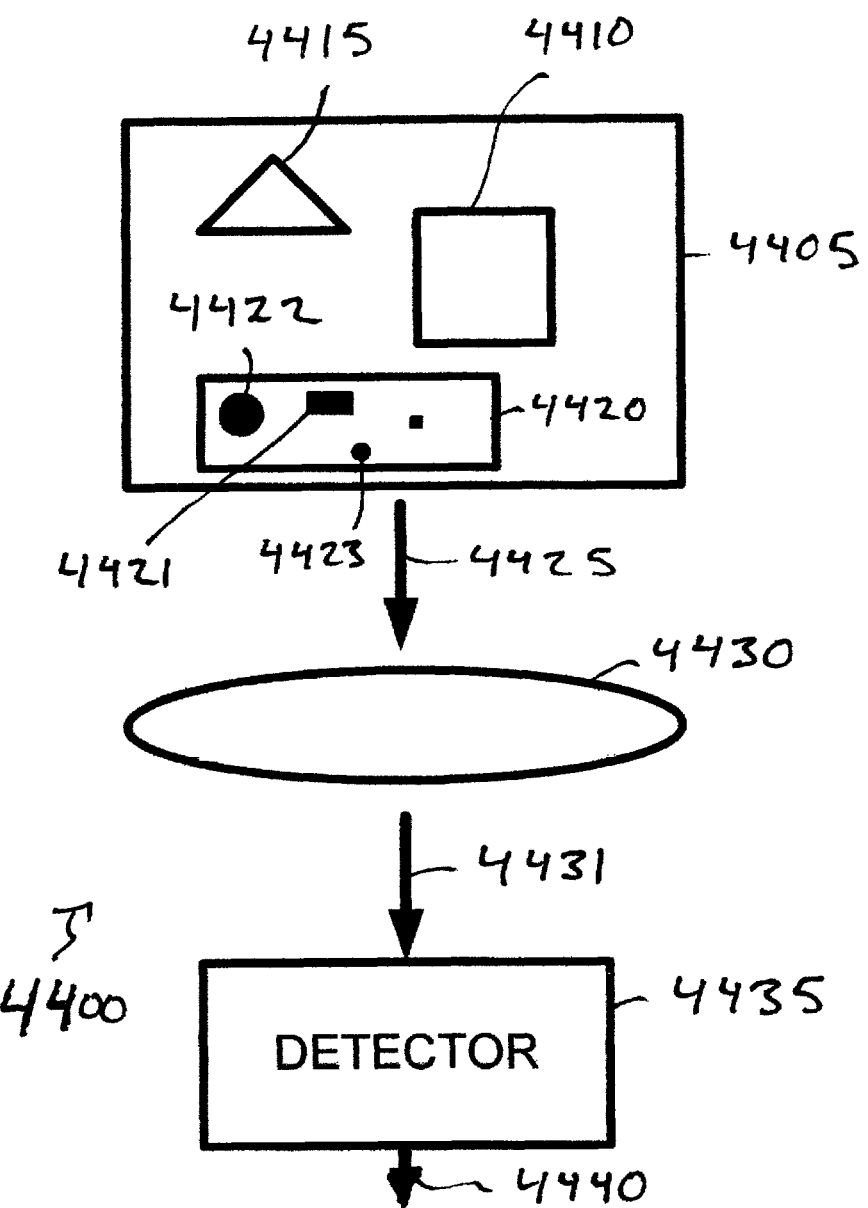
FIG. 78 shows a diagrammatic illustration of an imaging system, in block diagram form and according to the prior art, for directing electromagnetic energy from a scene to produce therefrom electronic image data.

By way of characterizing the discussions which follow in appropriate perspective, attention is initially turned to FIG. 78 which illustrates an imaging system, not including phase modifying optics, generally indicated by reference number 4400. A scene 4405 includes objects 4410, 4415, and 4420 any of which objects may contain features such as rectangular feature 4421, relatively large feature 4422 and relatively small feature 4423. Although shown in FIG. 78 as simple geometric shapes, a feature may have a variety of other shapes. Electromagnetic energy 4425 emitted by or reflected from scene 4405 is imaged by optics 4430 as imaged electromagnetic energy 4431 that is captured by a detector 4435 which produces therefrom electronic image data 4440 electronically representing scene 4405 for subsequent use. It can be appreciated, as discussed previously above, that electronic image data 4440, previously referred to as "electronic data", may be used in imaging applications not only for human perception, but also for other applications such as machine vision and task based processing. In imaging applications such as the digital camera of FIG. 1, electronic image data 4440 at least generally represents the scene 4405 according to image characteristics, including but not limited to, previously discussed depth of field, sharpness, discriminability, texture, noisiness, identifiability and contrast.

Figure 79:
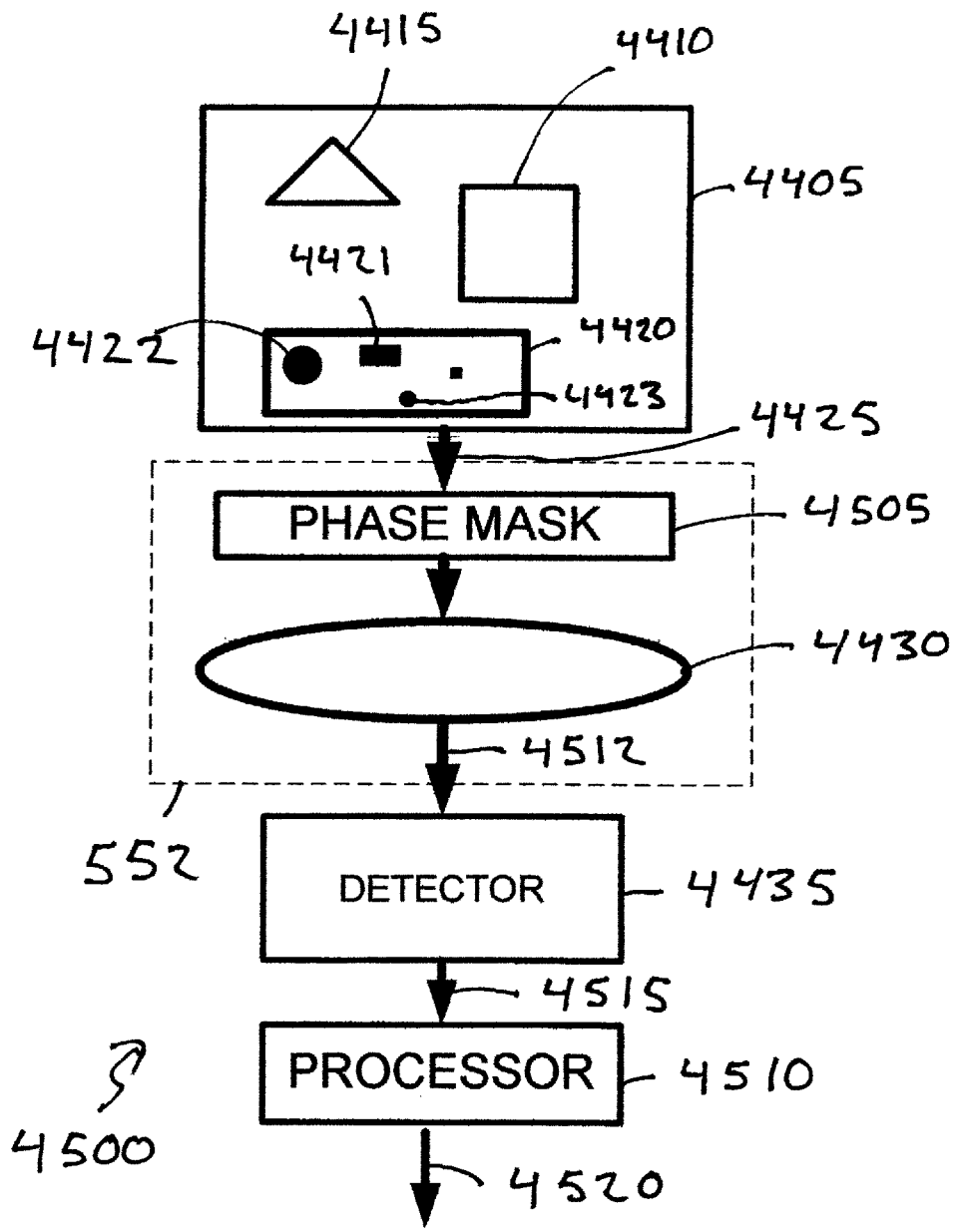
FIG. 79 shows a diagrammatic illustration of another imaging system, also in block diagram form and according to the prior art, that includes a processor for processing electronic image data.

Referring to FIG. 79 in conjunction with FIG. 78, the former illustrates an imaging system previously disclosed by the above-incorporated Cathey '371 patent, generally indicated by reference number 4500. Imaging system 4500 includes all the elements of imaging system 4400 along with a phase modifying element 4505 and a processor 4510. As described in the Cathey '371 patent, and as discussed previously herein, phase modifying element 4505 and optics 4430 cooperate with one another to act as WFC optics 552 previously represented by icon 552 and enclosed by a dashed box in FIG. 79. It should be appreciated that the icons described previously in FIG. 8 refer to specific associated components, processes, images, data, or linescans, that may be referred to hereinafter as such. The WFC optics 552 receive electromagnetic energy 4425 and produce therefrom imaged and encoded electromagnetic energy 4512 that is received by detector 4435 which produces therefrom raw electronic image data 4515 that is encoded as compared to electronic image data 4440 that would be produced by previously discussed imaging system 4400 and in the absence of phase modifying element 4505. Processor 4510 then acts to at least partially decode raw electronic image data 4515 to produce processed electronic image data 4520 representing an image corresponding to scene 4405 that has at least one improved image characteristic as compared to a corresponding characteristic of the electronic image data 4440 that would be produced from the same scene by previously discussed imaging system 4400 in the absence of phase modifying element 4505 and without processor 4510.

In particular, still referring to FIG. 78 and FIG. 79, the Cathey '371 patent discloses one example wherein WFC optics 552 incorporates phase modifying element 4505 which acts cooperatively with optics 4430 and processor 4510 in a specific way such that processed electronic image data 4520 exhibits an improved depth of field, as the improved image characteristic, as compared to electronic image data 4440 that would produced by the previously discussed imaging system 4400 of FIG. 78.

As discussed above with reference to FIG. 8, the combination of encoding and decoding operations, in certain instances, can produce artifacts as a byproduct of cooperation between the encoding and the decoding operations. For example, as will be discussed in detail immediately hereinafter, undesired features such as previously discussed overshoot 558A and undershoot 558B may arise as depicted in icon 558 of FIG. 8. Previously defined overshoots 558A and undershoots 558B may hereinafter be referred to as "artifacts". Additionally, for the remainder of the disclosure, the terms "overshoot" and "undershoot" will be referred to by single term "overshoot", and features such as 558A and 558B will be referred to interchangeably as either "artifacts" or as "overshoots".

Referring to FIG. 79 in terms of its relationship to FIG. 8, it is noted that FIG. 79 shows a diagrammatic representation of a given set of imaging and processing functions, and that phase modifying element 4505 and optics 4430 together form WFC optics 552 and are not necessarily configured as separate elements. For example, phase modifying element 4505 can be provided as one or more coatings or layers on one or more surfaces of at least one lens within optics 4430. In another example, a given lens (or set of lenses) can be configured to simultaneously provide the imaging qualities of optics 4430 while also providing the phase modifying functionality depicted herein by phase modifying element 4505.

Figure 80:
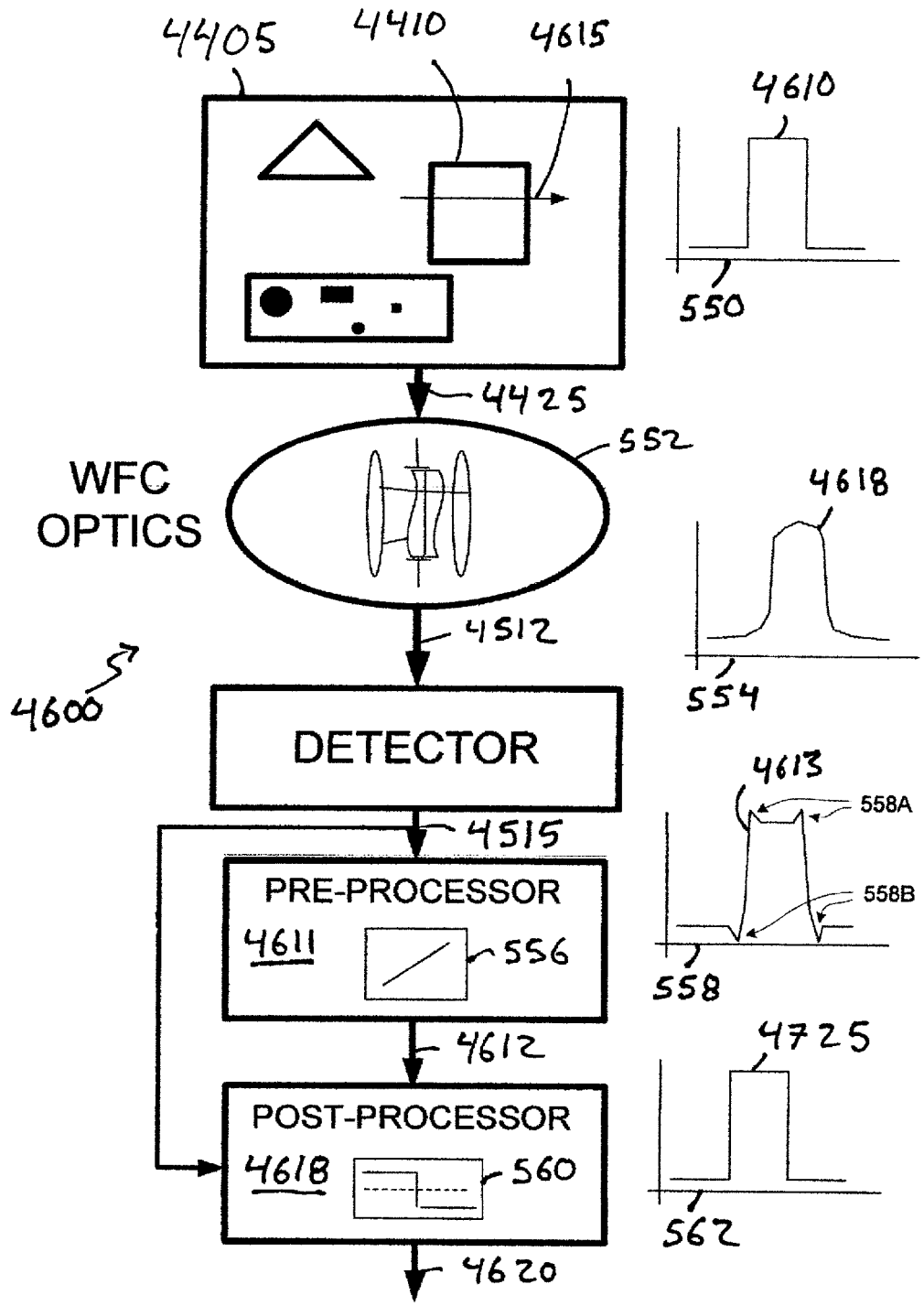
FIG. 80 shows a diagrammatic illustration of an imaging system, in block diagram form, which includes a pre-processor and a post-processor for processing electronic image data, in accordance with an embodiment.

Turning now to FIG. 80 with ongoing reference to FIGS. 8 and 79, FIG. 80 illustrates an imaging system generally indicated by the reference number 4600 that includes a number of the elements associated with imaging system 4500 including aforedescribed WFC optics 552, shown here as a single element for purposes of the present example. Imaging system 4600 differs from previously discussed imaging system 4500 as follows: processor 4510 from imaging system 4500 is replaced in imaging system 4600 by two separate processors including (i) a pre-processor 4611 for applying aforedescribed linear processing operation 556 previously represented by icon 556 of FIG. 8, to decode the encoded raw electronic image data 4515 and thereby producing pre-processed image data 4612, and (ii) a post-processor 4618 for applying a nonlinear processing operation 560 as represented by icon 560 of FIG. 8 to at least partially compensate for any artifacts that may be produced by pre-processor 4611. It is noted that icons 556 and 560, described previously above with reference to FIG. 8, refer to specific associated processes that may accordingly be referred to hereinafter as pre-processing operation 556 and post-processing operation 560.

It is to be understood that representations in FIG. 80 of pre-processor 4611 and post-processor 4618 are diagrammatic in nature, and are intended to reflect an order of operations wherein pre-processor 4611 first applies linear pre-processing operation 556, and post-processor 4618 next applies nonlinear post-processing operation 560. In this regard, pre-processor 4611 and post-processor 4618 are not necessarily embodied in separate circuits or subsystems. For example, using techniques known in the art in combination with and in view of the teachings herein, both processes could be implemented within one digital signal processor that includes a microprocessor for implementing software and/or firmware in order to execute pre-processing operation 556 and post-processing operation 560.

Considering FIG. 80 in conjunction with FIG. 8, it should be appreciated that imaging system 4600 in FIG. 80 provides one particular physical representation corresponding to an exemplary imaging system that can be employed in accordance with FIG. 8. In view of this correspondence, the functionality of each successive element of imaging system 4600 in relation to FIG. 8 is reviewed immediately hereinafter.

Electromagnetic energy 4425 from scene 4405 is imaged and encoded by WFC optics 552 for producing encoded electromagnetic energy 4512 representing scene 4405 and the objects and features therein. It is noted that a linescan 4610, depicted by icon 550, corresponds to one linescan of electromagnetic energy 4425 (prior to encoding) across object 4410 along a line 4615. In particular, linescan 4610 may, for example, represent a spatial variation (or shift) in either optical intensity or color across object 4410.

Encoded electromagnetic energy 4512 is received by detector 4435 which produces therefrom raw electronic image data 4515. Icon 554 depicts a linescan 4618 from the subset of raw electronic image data 4515 that is produced by detector 4435 and is associated with linescan 4610 of object 4410. In accordance with the Cathey '371 patent and previous discussions herein, linescan 4618 illustrates an encoded representation of linescan 4610 across object 4410, and therefore is depicted as being distorted as compared to the yet-to-be-encoded linescan 4610.

Raw electronic image data 4515 is received by pre-processor 4611 which then at least partially decodes the raw electronic image data according to linear pre-processing operation 556 in order to produce pre-processed image data 4612 including at least one characteristic (i.e. depth of field) that is changed (i.e. has greater depth of field) relative to an associated characteristic of scene 4405 that would be produced by a conventional imaging system. Icon 558 depicts a linescan 4613 from pre-processed image data that is produced as a result of linear pre-processing operation 556 (see FIG. 8) by pre-processor 4611. As a specific example, linescan 4613 may represent a pre-processed linescan of optical intensity in pre-processed image data 4612 that is associated with object 4410. As a byproduct of the cooperation between the encoding and the decoding, at least one artifact (such as overshoots 558A and 558B) may be produced within the pre-processed data set.

Post-processor 4618 receives pre-processed data 4612 and applies thereto nonlinear post-processing operation 560 to alter a part of the pre-processed data that contains the artifact while retaining the changed characteristic in the balance of the pre-processed image data. In addition to receiving pre-processed data 4612 for subsequent processing, post-processor 4618 may also receive and utilize raw electronic image data 4515 which is filtered for use in part of nonlinear post-processing operation 560, as will be described at an appropriate point below. Icon 562 depicts a subset of post-processed image data 4620 that is produced in post-processing operation 560 (see FIG. 8) by post-processor 4618. As a specific example, a linescan 4725 may represent a post-processed linescan of optical intensity in post-processed data set 4620 that is associated with object 4410. As shown in FIG. 80, and as previously discussed with reference to FIG. 8, nonlinear post-processing operation 560 is configured in this example to restore vertical sides and sharp corners (whilst removing overshoots 558A and 558B) as depicted diagrammatically in linescan 4725 of icon 562.

Having reviewed the functionality of imaging system 4600, further discussions will now be directed to additional details relating to identifying and compensating for artifacts including but not limited to overshoots.

Figure 81:
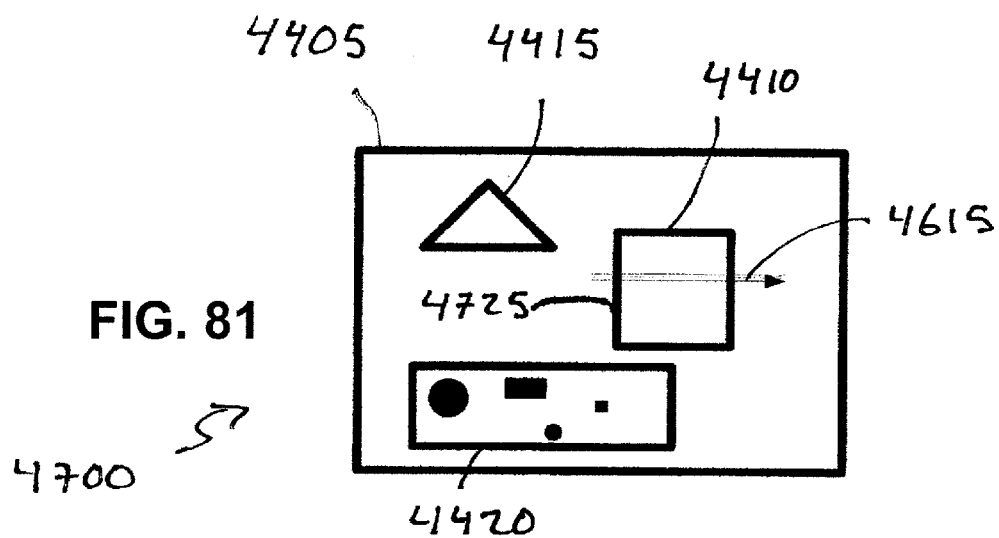
FIG. 81 shows an enlarged diagrammatic representation of the scene imaged in FIG. 80, shown here to illustrate further details of objects and features therein.
Figure 82:
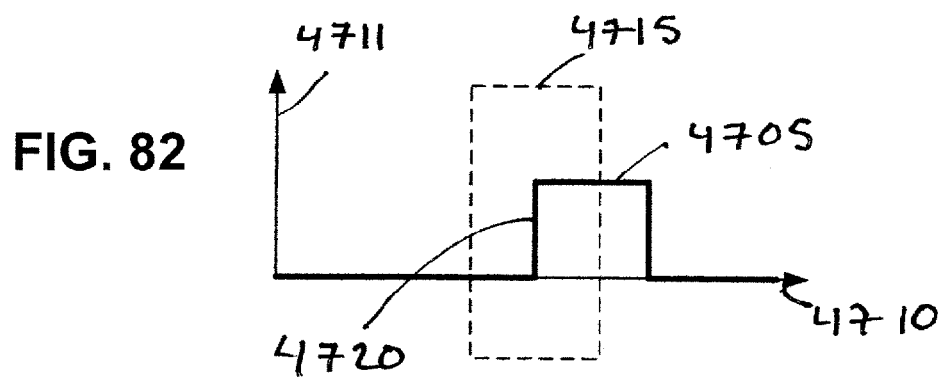
FIG. 82 shows a diagrammatic illustration of a linescan taken across a portion of the enlarged scene of FIG. 81.

Attention is now directed to FIG. 81 and FIG. 82, the former illustrating scene 4405 including objects 4410, 4415, and 4420, and the latter being a linescan plot with (i) a horizontal axis 4710 corresponding to line 4615 in FIG. 81, and (ii) a vertical axis 4711, representing an electronic image data value of interest. A linescan 4705 is taken through at least a subset of electronic image data representing scene 4405. FIG. 82 is diagrammatic in nature, and linescan 4705 may be representative of electronic image data taken from different stages of imaging system 4600 including but not limited to (i) raw electronic image data 4515, (ii) pre-processed image data 4612, and (iii) post-processed image data 4620. In one example, irrespective of which stage the linescan is associated with, linescan 4705 may represent part of an electronic image data relating to optical intensity for electromagnetic energy from object 4410. In another example, linescan 4705 may represent a variable related to color of electromagnetic energy from object 4410.

It may be appreciated by those skilled in the art that many different image variables or properties can be represented by a given data set in a variety of different ways known in the art, and more than one image variable may be associated with a given location within an image. On one hand, in monochromatic (i.e. black and white) imaging systems, individual discrete image regions such as pixels are typically represented by a single electronic image data value corresponding to intensity. On the other hand, in more complex color imaging systems a variety of techniques can be utilized in such a way that individual pixels, or discrete image regions, are each represented by combinations of more than one variable. For example, one technique known in the art for representing color images is the "YUV" scheme wherein for each pixel a "Y" variable represents luminance, and a pair of variables "U" and "V" together represent chrominance. In a particular YUV color scheme, linescan 4705 may correspond to a linescan of electronic image data representing any one of variables Y, U or V, or it may represent a derived parameter that is determined from some combination of the variables Y, U and V. For "CMY" (cyan magenta and yellow) or "RGB" (red green blue) color schemes, the individual colors C, M, Y, R, G and B may be use as variables or the individual colors may be combined into derived parameters which may be used as variables.

Still referring to FIGS. 81 and 82 in conjunction with FIG. 80, attention is drawn to a section 4715 of linescan 4705, shown within a dashed box, that includes an exemplary transition 4720 which can result in artifacts such as overshoots 558A and 558B as seen in FIG. 80. Transition 4720 represents a change in a value of a specific electronic image data variable or combination of variables as described by linescan 4705. For example, transition 4720 may represent a rapid change in intensity arising from an edge 4725 of object 4410. Alternatively, in another example, transition 4720 may represent a color transition in electronic image data; for example, object 4410 may appear as an area of scene 4405 that differs sharply in color as compared to the rest of the scene. In the latter example, linescan 4705 can represent a linescan in electronic image data representing color variables U, V or a combination thereof.

It is again noted that FIG. 82 presents, for purposes of discussion, a simplified diagrammatic representation of some transition in the form of transition 4720, and the actual transition can be more complex while remaining within the scope of this discussion Discussions following immediately hereinafter will focus in more detail on section 4715 of linescan 4705 wherein some actual transition that takes place gives rise to at least one artifact.

Figure 83:
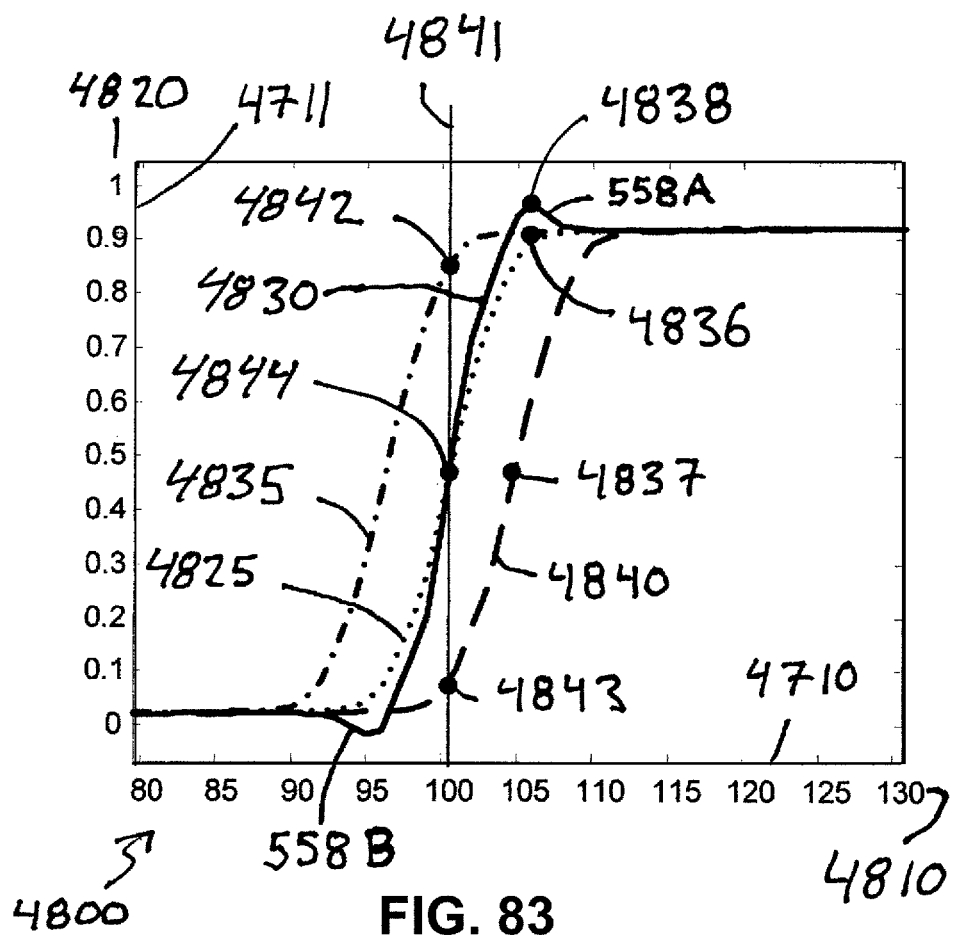
FIG. 83 shows a plot of various linescans of an edge feature in a scene, including linescans corresponding to raw electronic image data, post-processed image data, and pre-processed image data.

Attention is now directed to FIG. 83, which illustrates several different linescans of electronic image data in a plot generally indicated by the reference number 4800. In this example, horizontal axis 4710 may represent, for example, spatial location as a variable along an axis in a raw electronic image data, and a set of horizontal axis values 4810 may, for example, refer to discrete image regions such as pixels that are associated with a given raw electronic image data. Vertical axis 4711 may, for example, refer to intensity, represented here using dimensionless normalized indices 4820.

Considering now FIG. 83 in view of FIGS. 8, 80, and 81, a linescan 4825 shown as a dotted line in FIG. 83 represents a first linescan from raw electronic image data 4515 that is produced by detector 4435, and exhibits a transition corresponding to edge 4725 in object 4410. Additionally, a second linescan 4830 shown as a solid line represents a corresponding transition in pre-processed image data 4612, and includes the pair of overshoots 558A and 558B caused by pre-processor 4611 as a result of pre-processing operation 556.

As discussed previously with reference to FIGS. 8 and 80, nonlinear post-processing operation 560 may be applied to compensate for overshoots 558A and 558B. As an example of an initial step, post-processor 4618 may be configured to apply a nonlinear filtering operation to raw electronic image data 4515, as part of the nonlinear post-processing operation 560, for filtering the raw electronic image data 4515 to produce two filtered electronic image data sets illustrated in FIG. 83 as an upper bounding curve 4835 and a lower bounding curve 4840.

The filtered electronic image data illustrated by upper and lower bounding curves 4835 and 4840 together define for each spatial location X an upper bound UB(X) and a lower bound LB(X), thereby establishing for each location a predicted range of data values between and including the upper and lower bounds. As a first example, a discrete location within electronic image data, corresponding to value 100 on axis 4710 and indicated by line 4841, is bounded by an upper bound UB(100) at a point 4842 and a lower bound LB(100) at a point 4843, and therefore the predicted range PR(100) for location 100 is defined according to the relation LB(100)≦PR(100)≦UB(100). A pre-processed data value 4844, on linescan 4825, lies within this predicted range and therefore requires no compensation.

In another example, a different discrete location in an electronic image data, corresponding to value 105 on axis 4710, is bounded by a upper bound UB(105) at a point 4836 and a lower bound LB(105) at a point 4837, and the predicted range PR(105) for location 105 defined by upper and lower bounding curves 4835 and 4840 is defined according to the relation LB(105)≦PR(105)≦UB(105). A pre-processed data value 4838 lies outside and above this predicted range and therefore does require compensation as will be described immediately hereinafter.

Having established spatially dependent upper and lower bounding curves 4835 and 4840, post-processor 4618 may compare pre-processed linescan 4830 with upper and lower bounding curves 4835 and 4840 in order to identify and subsequently compensate for overshoots 558A and 558B by producing a post processed data set 4620 wherein the overshoots 558A and 558B have been reduced or removed as compared to pre-processed data set 4612. An example of a technique for identifying and removing overshoots 558A and 558B will be discussed immediately hereinafter.

Figure 84:
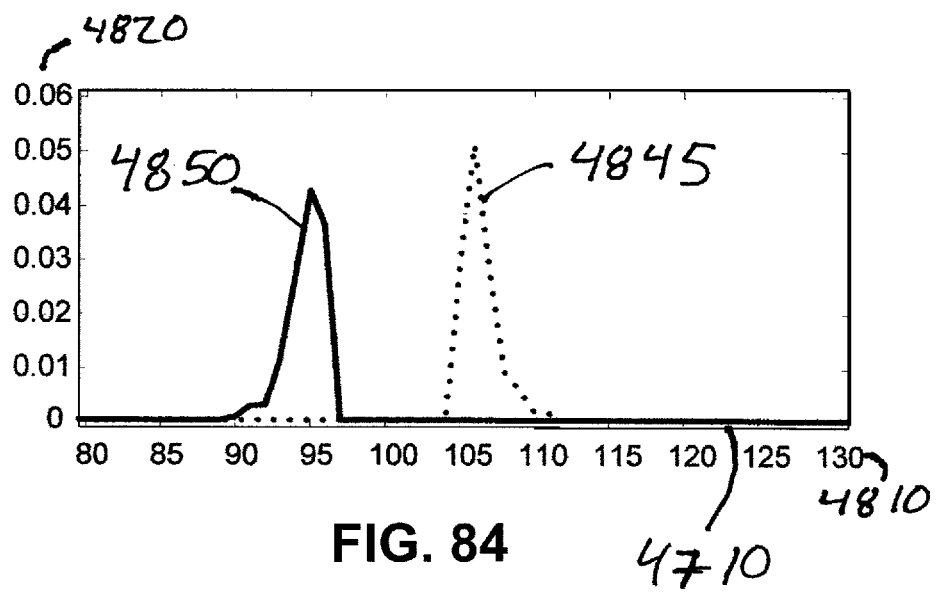
FIG. 84 shows a plot of error signals representing artifacts in the pre-processed image data of FIG. 83.

Attention is directed now to FIG. 84 with ongoing reference to FIG. 83. FIG. 84 is a plot illustrating an error signal in a vertically aligned relationship with FIG. 83 and repeating the axes of FIG. 83 but with magnified scale on the vertical axis. In this example, a first error signal 4845 (shown to the right side as a dotted line) is associated with overshoot 558A, and is established as part of nonlinear post-process 560 by (i) subtracting (at each point along horizontal axis 4710) upper bounding curve 4835 from pre-processed linescan 4830 to generate a subtracted curve (not shown) and, (ii) applying a thresholding or "zero clipping" operation to the subtracted curve wherein any negative values in the subtracted curve are set to zero so that error signal 4845 does not include any values less than zero. Similarly, a second error signal 4850 (shown to the left as a solid line and associated with overshoot 558B) is generated by subtracting (with thresholding) pre-processed linescan 4820 from lower bounding curve 4840.

Figure 85:
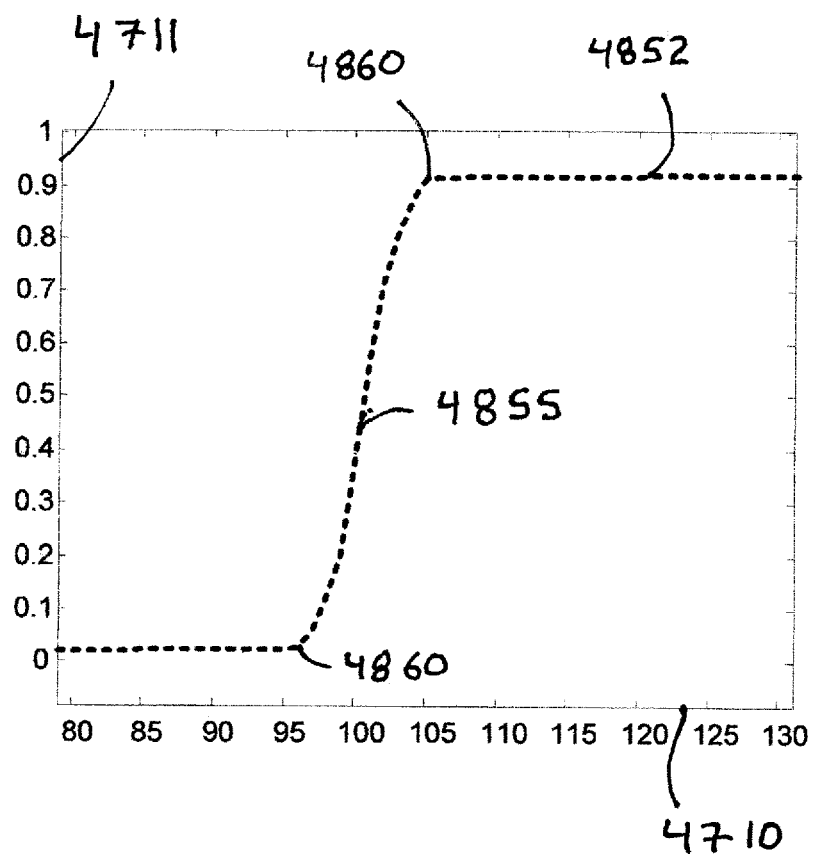
FIG. 85 shows a plot of a linescan of post-processed image data, wherein artifacts have been compensated as compared to the pre-processed image data of the linescan of FIG. 83.

Attention is now directed to FIG. 85 with continuing reference to FIGS. 83 and 84 and in conjunction with FIG. 80. FIG. 85 shows a plot repeating the axes of FIG. 83 to illustrate a post-processed linescan 4852 that is established as a final stage of post-process 560 by (i) subtracting error signal 4845 from pre-processed linescan 4830 and (ii) adding error signal 4850 to pre-processed linescan 4830. In accordance with previous discussions above with reference to FIG. 80, nonlinear post-process 560 thus compensates for overshoots 558A and 558B such that post-processed image data represented by linescan 4852 is conformed to a predicted range that is defined in this example as lying between and including bounding curves 4835 and 4840. In addition, and as a result of cooperation between (i) the WFC optics, (ii) the pre-processing, and (iii) the post-processing, post-processed linescan 4852 is improved as compared to raw electronic image data 4825 and accordingly generally exhibits a steeper slope and more pronounced corners 4860 when compared to raw electronic image data 4825.

It should be appreciated that FIGS. 83-85 illustrate only a single segment of a linescan corresponding to a one dimensional subset of raw electronic image data 4515. In general, upper and lower bounding data values are generated over an entire electronic image data set, or at least over a two dimensional portion therein. It can be further appreciated that nonlinear post-processing operation 560 is defined herein as "nonlinear" because typically at least one part of post-processing operation 560 includes a nonlinear step. For example, the thresholding ("zero clipping") discussed above is clearly nonlinear in nature. As another example of a nonlinear step that is part of post-processing operation 560, it is noted that post-processing operation 560, as described in the immediately foregoing examples, typically leaves some data values unchanged such as those that lie within the predicted range while selectively changing other values such as those that represent artifacts.

It should be further appreciated that the specific order of operations discussed immediately above in reference to FIGS. 83-85 is not in any way limiting, and the described approach can be implemented according to different nonlinear techniques and according to different orders of operations. Descriptions of three additional embodiments are provided immediately hereinafter in order to further illustrate this point. In one embodiment, pre-processed image data is processed "globally" in a post-processing operation that identifies and compensates for one or more subsets of pre-processed image data that correspond to artifacts. In second and third embodiments, pre-processed image data is processed "locally" in a post-processing operation that identifies and compensates for artifacts sequentially and one discrete region or pixel at a time.

Figure 86:
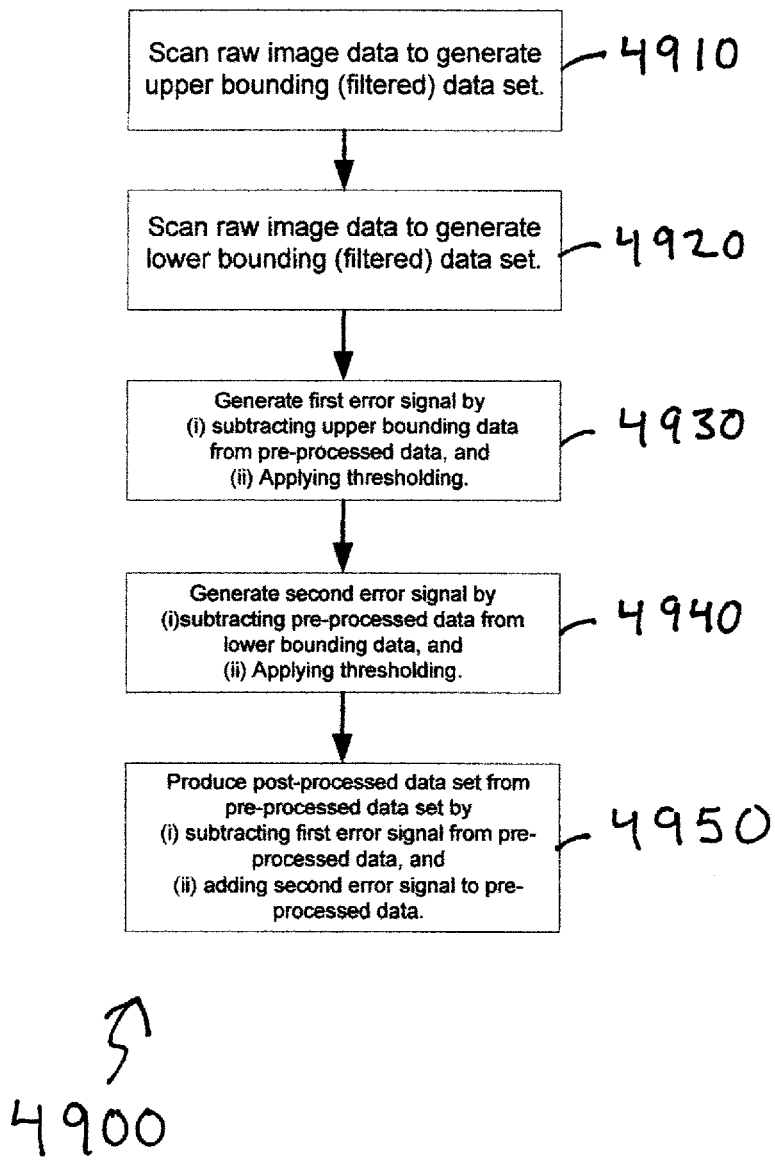
FIG. 86 shows a flowchart representing an embodiment of a "global" post-processing operation in accordance with the present disclosure.

Attention is now directed to FIG. 86 with ongoing reference to FIGS. 83-85. The former shows a flowchart, generally indicated by reference number 4900 that describes one embodiment of a technique wherein electronic image data is processed "globally" such that each step provides a corresponding set of electronic image data values that is generated in its entirety before proceeding to the next step. This global approach reflects one particular order of operations that is similar to the order of operations as described immediately above with reference to FIGS. 83-85.

In a first step 4910, raw electronic image data 4515 is filtered as part of a nonlinear processing operation in order to produce the data set of upper bounding data values illustrated in FIG. 83 by upper bounding curve 4835. In a second step 4920, raw electronic image data 4515 can be again filtered in order to produce the data set of lower bounding data values illustrated in FIG. 83 by lower bounding curve 4840. It is noted that filtered electronic image data corresponding to upper and lower bounding curves 4835 and 4840 can be produced from a set of raw electronic image data in a variety of ways as will be discussed in detail later hereinafter.

In a third step 4930, error signal 4845 can be generated as a first set of error values by subtracting upper bound 4835 from pre-processed linescan 4830 and then applying a thresholding operation such that all resulting values below zero are set to zero. In a fourth step 4940, error signal 4850 is generated by subtracting (in conjunction with thresholding) pre-processed linescan 4830 from lower bounding curve 4840. It is noted that non-zero values in error signals 4850 and 4845 are indicative of artifacts, since non-zero values only occur within subsets of pre-processed image data wherein pre-processed data values lie outside of the predicted range that is defined by the upper and lower bounding curves.

In a fifth step 4950, post-processed image data 4852 is generated from the pre-processed image data by (i) subtracting the first error signal 4845 from the pre-processed image data, and (ii) adding the second error signal 4850 to the pre-processed image data.

Figure 87:
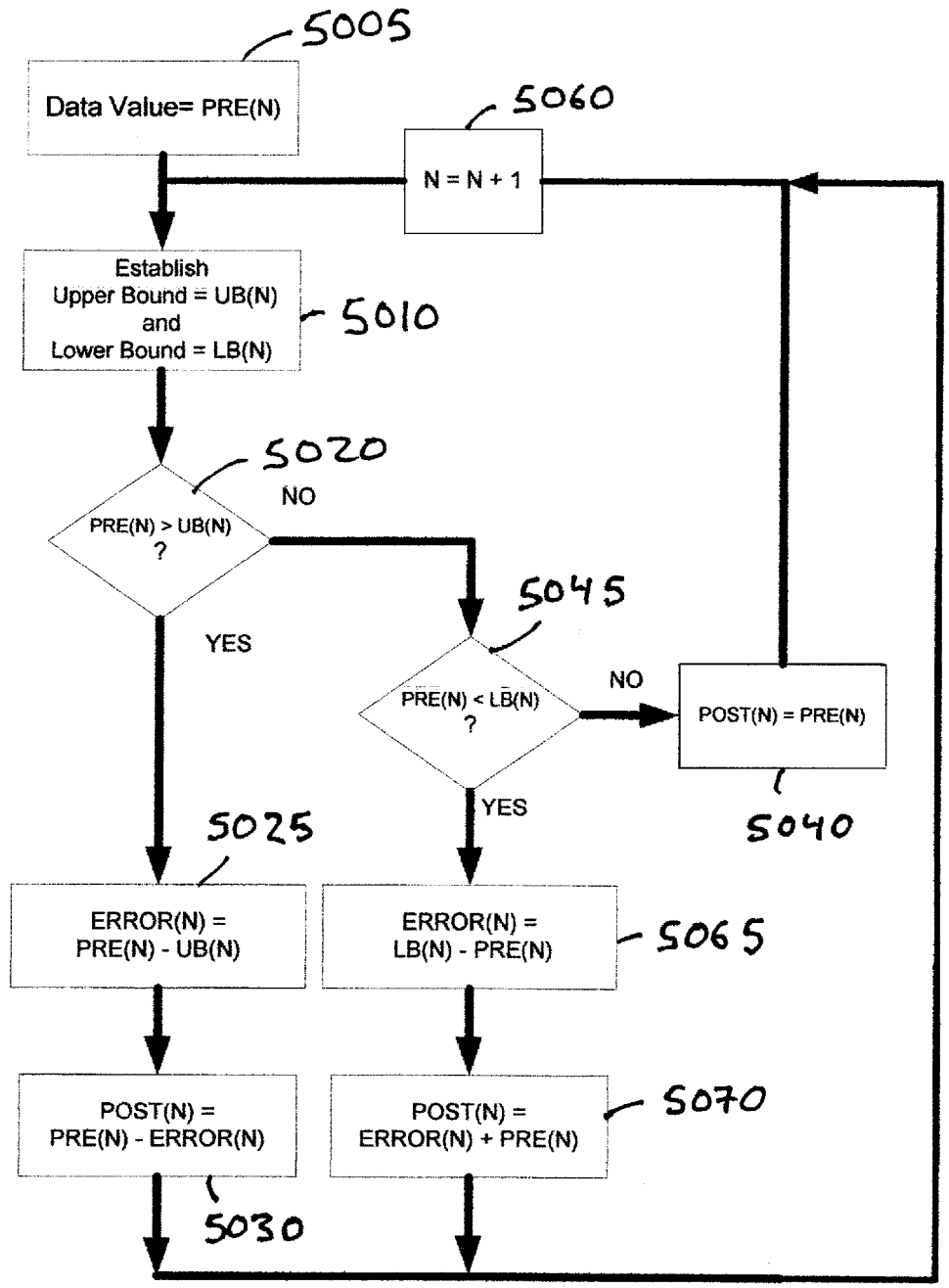
FIG. 87 shows a flowchart representing an embodiment of a "local" post-processing operation in accordance with the present disclosure.

Turning now to FIG. 87 with continuing reference to FIG. 80, the former shows a flowchart, generally indicated by reference number 5000, illustrating another embodiment of a "local" process. In this example, pre-processed image data 4612 is processed one discrete region (pixel) at a time in conjunction with raw electronic image data 4515, and each step of the process is executed according to flowchart 5000 in order to generate a post-processed image data value for each discrete region in the scan. In the discussion immediately hereinafter, each discrete region of electronic image data will be referred to simply as a "pixel".

At 5005, the process is initiated for an electronic image data location corresponding a pixel N. Pixel N, in the electronic image data 4515, is assumed to have at least one associated data value PRE(N) as a data value in pre-processed image data 4612 corresponding to pixel N. For example, as discussed above, PRE(N) may correspond to either intensity, color, or any other electronic image data parameters of interest that are associated with pixel N.

At 5010, post-processor 4618 establishes for pixel N an upper boundary value UB(N) and lower boundary value LB(N). It is noted that upper and lower bounds UB(N) and LB(N) can be produced from a set of raw electronic image data in a variety of ways as will be discussed in detail at an appropriate point below.

At 5020 PRE(N) is compared to UB(N). If PRE(N) is greater than UB(N), then PRE(N) corresponds to at least part of an artifact and the corresponding POST(N) will need to be corrected as compared to PRE(N). In this event, at 5025, the process defines an error value ERROR(N)=PRE(N)−UB(N) and then moves to 5030 where a corrected data value POST(N) is established such that POST(N)=PRE(N)−ERROR(N). The process subsequently moves to 5060 where N is incremented and the process begins again for processing pixel N=N+1.

Considering the alternative outcome of decision 5020, wherein PRE(N) is not greater than UB(N), an additional comparison between PRE(N) and LB(N) is needed at 5045 in order to determine if PRE(N) represents at least part of an artifact.

At 5045, PRE(N) is compared to lower bound LB(N). If PRE(N) is not less than LB(N) then it is determined that PRE(N) does not represent part of an artifact and the process moves to 5040 where POST(N) is established according to the relation POST(N)=PRE(N), and the process returns to 5060 where N is incremented in order to process the next pixel.

Again considering 5045, in the case where PRE(N) is less than LB(N), then PRE(N) corresponds to at least part of an artifact and the corresponding POST(N) should be corrected as compared to PRE(N). Accordingly, at 5065 the process defines an error value ERROR(N)=LB(N)−PRE(N) and then moves to 5070 where a corrected data value POST(N) is established such that POST(N)=PRE(N)+ERROR(N). The process subsequently moves to 5060 where N is incremented and the process begins again in order to process pixel N=N+1. It may be appreciated that steps 5025 and 5030 may be combined into a single step without the intermediate calculation of ERROR(N) and POST(N) may be established such that POST(N)=UB(N). Likewise steps 5065 and 5070 may be combined and POST(N) may be established such that POST(N)=LB(N).

It can be appreciated in view of the foregoing that multiple variations of process 5000 are possible for achieving the same or similar results on a pixel-by-pixel basis. As one possible example, another embodiment of a local process is discussed immediately hereinafter.

Figure 88:
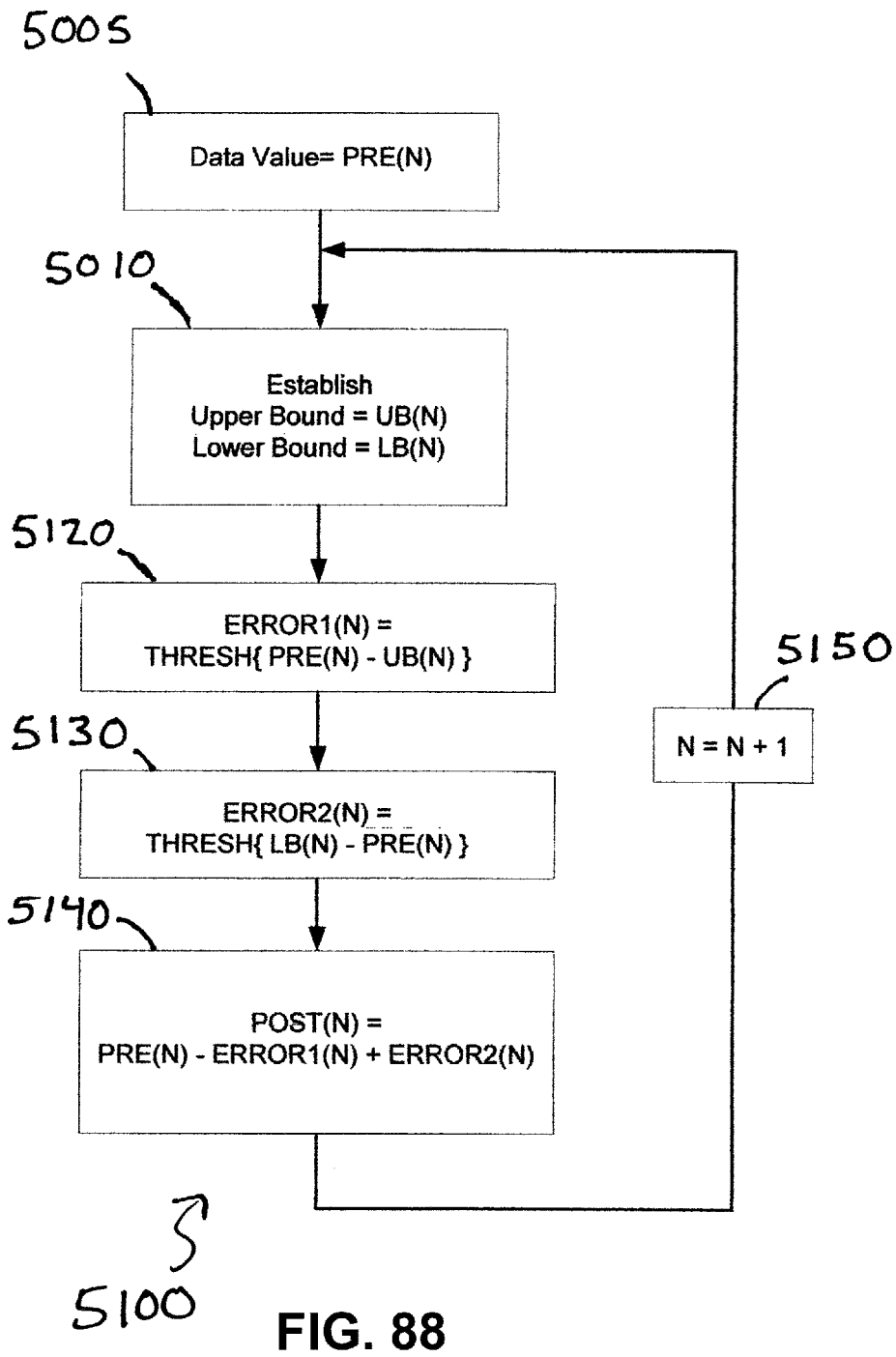
FIG. 88 shows a flowchart representing another embodiment of a different local post-processing operation in accordance with the present disclosure.

Considering now FIG. 88 in conjunction with FIGS. 80, 83-85 and 87; FIG. 88 illustrates another embodiment of a nonlinear process, generally indicated by the reference number 5100, to be performed as part of nonlinear operation 560 for scanningly producing post-processed data set 4620 from pre-processed data set 4612 one pixel at a time and whilst utilizing raw electronic image data 4515. Process 5100 is similar to process 5000 discussed immediately above, but may use fewer steps. This is accomplished, as will be discussed immediately hereinafter, by employing a thresholding operation set forth in a manner that is analogous to previous discussions relating to FIGS. 83-85.

As in process 5000 above, at 5005 the process is initiated for a scanning region located at a pixel N. Pixel N in the electronic image data 4515 is again assumed to have at least one associated data value PRE(N) as a data value in pre-processed image data 4612. At 5010 upper and lower data value bounds UB(N) and LB(N) are generated for a given pixel "N" associated with an electronic image data value PRE(N), as described above. It is again noted that upper and lower bounds UB(N) and LB(N) can be produced from a set of raw electronic image data in a variety of ways, as will be discussed in detail later hereinafter.

At 5120 a first error signal ERROR1(N) is produced by (i) subtracting UB(N) from PRE(N) and (ii) applying a thresholding operation to the resulting difference {PRE(N)−UB(N)} such that if the difference {PRE(N)−UB (N)} is less than zero, then ERROR1(N) is set to zero. Step 5020 therefore produces a first error signal according to the equation ERROR1(N)=THRESH {PRE(N)−UB(N)}, wherein the function "THRESH { . . . }" is defined according to the immediately foregoing definition. Based on the foregoing discussion it can be appreciated that ERROR1(N) can only take on positive or zero values, and that a positive value represents an artifact associated with pixel N wherein PRE(N) lies above upper bound UB(N). It can be further appreciated that a zero value indicates one of two possibilities: either (i) PRE(N) lies within the predicted range of values defined by upper bound UB(N) and lower bound LB(N) and therefore does not correspond to an artifact, or (ii) PRE(N) lies below lower bound LB(N) and corresponds to a yet-to-be-detected artifact.

At 5130, a second error signal ERROR2(N) is produced by (i) subtracting PRE(N) from LB(N) and (ii) applying a thresholding operation, to the resulting difference {LB(N)−PRE(N)}. Step 5130 therefore produces a second error signal according to the equation ERROR2(N)=THRESH {LB(N)−PRE(N)}. It can be appreciated that ERROR2(N) can only take on positive or zero values, and that a positive value represents an artifact associated with pixel N wherein PRE(N) lies below lower bound LB(N). It can be further appreciated that a zero value for ERROR2(N) indicates one of the following two possibilities: either (i) PRE(N) lies within the bounded range of values defined by upper bound UB(N) and lower bound LB(N) and therefore does not correspond to an artifact, or (ii) PRE(N) lies above upper bound UB(N) and corresponds to the already-detected artifact identified by ERROR1(N).

At 5140, a post-processed image data value is generated for pixel N according to POST(N)=PRE (N)−ERROR1(N)+ERROR2(N), and process 5100 proceeds to a fifth step 5150 wherein N is incremented (to sequentially move to the next pixel) and the process 5100 is repeated for the next adjacent pixel.

While the embodiments of process 5000 and process 5100 are similar, the latter process utilizes thresholding operations to null (set to zero) an error signal that is not required in order to continue processing the error signal according to a predetermined set of operations. The former process, by contrast, utilizes decision branches in such a way that a given error signal is only processed if the given error signal is established as being associated with an existing artifact.

Processes 4900, 5000 and 5100 are three embodiments among many possible embodiments of processes that can be implemented in accordance with the teachings herein for receiving a pre-processed image data and applying thereto a post-processing operation that includes compensating for any artifacts that may be present in the pre-processed image data. All three post-processes include compensating for the artifact by applying a nonlinear post-processing operation to alter part of the pre-processed electronic image data that contains the artifact while retaining changes to image characteristics that occur as part of the pre-processing operation. The latter two of the three examples described (process 5000 and process 5100) are two of many possible "local" process embodiments for producing the post-processed data sequentially on a pixel-by-pixel basis and one pixel at a time.

Referring to FIGS. 80 and 83 and having generally described both global and local embodiments of post-processing operation 560, attention is now directed to details with respect to producing bounding curves such as, for example, upper and lower bounding curves 4835 and 4840. Previous discussions have assumed that upper and lower bounds are produced from raw electronic image data 4515, and upper and lower bounds have so far been illustrated, for example, by upper and lower bounding curves 4835 and 4840, or represented by variables UB(N) and LB(N) corresponding to upper and lower bounding data values associated with each pixel N of a given electronic image data. The discussions below present several embodiments encompassing how upper and lower bounding data values can be generated as part of a post-processing operation 560. More specifically, referring again to FIGS. 86, 87, and 88, the discussions of these embodiments entail manners in which upper bounds and lower bounds (and the corresponding predicted range of data values) can be established in order to accomplish (i) steps 4910 and 4920 of process 4900, (ii) steps 5010 and 5020 of process 5000, and (iii) step 5010 of process 5100.

Figure 89:
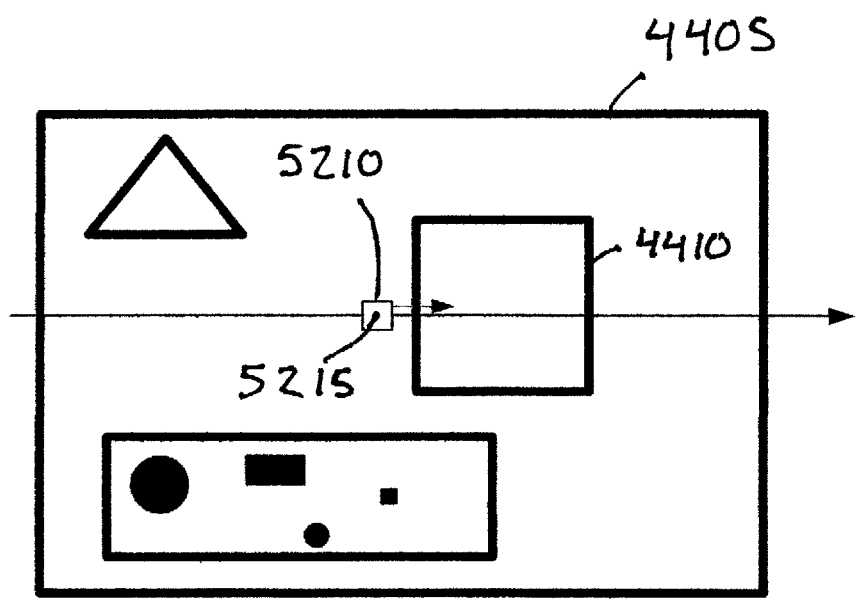
FIG. 89 shows an enlarged representation of a scene that includes an overlaid scanning region for processing electronic image data associated with the scene and in accordance with the present disclosure.

FIG. 89 shows a diagrammatic illustration wherein aforedescribed scene 4405 has been repeated for purposes of facilitating the present discussion. In addition, FIG. 89 illustrates a scanning region 5210 included for scanningly processing the raw electronic image data associated with scene 4405. Scanning region 5210 overlays a portion of the raw electronic image data and encompasses a subset of electronic image data values therein. For a given location 5215 of scanning region 5210, processing parameters such as upper and lower bounds UB and LB (corresponding to a location 5215) can be generated by processing the encompassed electronic image data values. As will be described immediately hereinafter, by scanning the scanning region 5210 across the entire scene 4405, upper and lower bounds UB and LB can be scanningly established for all locations, and for each of the locations a predicted range can be defined as lying between and including upper bound UB and lower bound LB.

Figure 90:
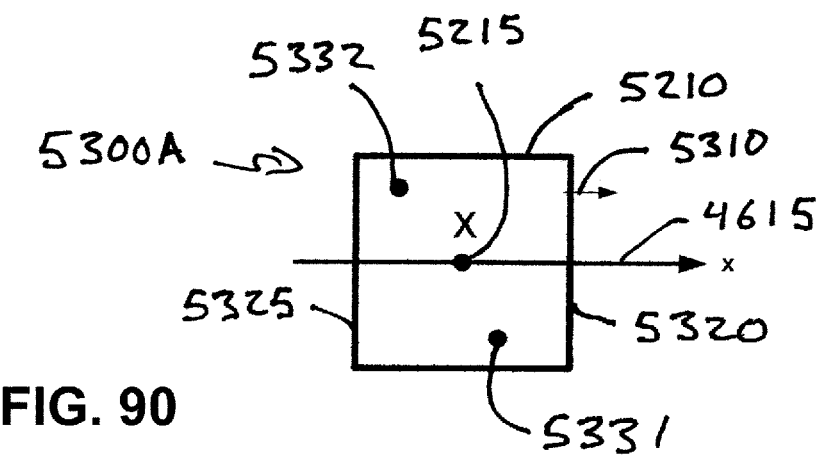
FIG. 90 shows an enlarged view of the scanning region of FIG. 89.

Attention is now directed to FIG. 90 which illustrates an enlarged view of scanning region 5210, generally indicated by reference number 5300A and corresponding to given scanning region location 5215 within the electronic image data. Scanning region 5210 overlays the image date set (see FIG. 89) and encompasses a plurality of electronic image data values therein. It is emphasized that the encompassed data values include any data values that are utilized in any way as part of the nonlinear post-processing associated with the scanning region. An arrow 5310 in FIG. 90 indicates a direction of scanning along an axis 4710, and scanning region 5210 includes a leading edge 5320 and a trailing edge 5325.

Scanning region location 5215 corresponds in this example to a central point within scanning region 5210 that serves as a reference point for describing the location of the scanning region within electronic image data. It is not necessary that location 5215 is the central point. The reference point can be any point within an interior or on boundaries of the scanning region or may be located outside of the scanning region. It is further noted, as will be described in detail at one or more points below, that location 5215 can correspond to a specific reference pixel to designate a location of the scanning region. For example the specific reference pixel can be a central pixel, some other pixel that forms part of the scanning region, or some pixel that is located outside the scanning region.

Referring to FIG. 90 in conjunction with FIG. 80, post-processor 4618 may utilize scanning region 5210 for applying to pre-processed image data 4515, and as part of nonlinear post-process 560, a variety of possible operations for determining an upper bound UB(X) and a lower bound LB(X), both corresponding to location 5215 at position X on axis 4710.

Figure 91:
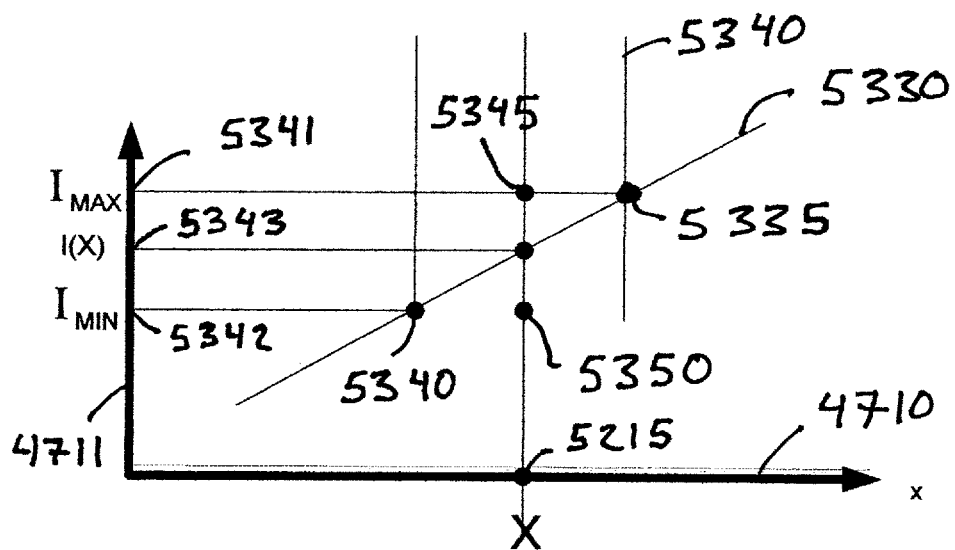
FIG. 91 shows a plot of a raw electronic image data linescan including selected exemplary data values for illustrating image processing operations in accordance with the present disclosure.

Considering now FIG. 91 in conjunction with FIG. 90, FIG. 91 shows a plot illustrating a raw electronic image data linescan and having horizontal x axis 4710 corresponding to position and vertical axis 4711 corresponding to an electronic image data value of interest. A location X along axis 4710 corresponds, in this example, to scanning region position 5215 on axis 4710. Furthermore, FIG. 91 is illustrated in a vertically aligned relationship with FIG. 90.

A linescan segment 5330 represents a subset of given raw electronic image data 4515 (see FIG. 80) to be operated upon as part of nonlinear post-process 560 and utilizing scanning region 5210 of FIG. 90. While linescan 5330 shows a linear increase in the value of the variable for purposes of illustrative clarity, the value will typically change in a nonlinear manner and hence the linescan can be referred to generally as a curve. Although linescan 5330 as depicted herein represents a line, it may be understood that a scanning region may act upon a series of associated linescans that define an area.

A data value 5335 corresponds to a data value in linescan 5330 associated with the x position of leading edge 5320, as indicated by a line 5344. In this example, a value $I_{MAX}$ 5341 corresponds to a maximum value from linescan 5330 that is within or on a boundary of scanning region 5210. Another data value 5340 corresponds to a value $I_{MIN}$ 5342 (aligned with trailing edge 5325 as indicated by a line 5343) and corresponds to a minimum data value from linescan 5330 that lies within or on a boundary of scanning region 5210.

Still considering FIG. 91, one example of an operation for establishing upper and lower bounds for location 5215 is to identify values $I_{MAX}$ and $I_{MIN}$, as discussed immediately above, and to then establish upper bound UB(X) and lower bound LB(X) according to the relations UB(X)=$I_{MAX}$ and LB(X)=$I_{MIN}$. It is submitted that this approach constitutes one useful manner in which to establish upper and lower bounds UB(X) and LB(X): assuming linescan 5330 to be a continuous function, it is noted that a value I(X) 5343 (corresponding to position 5215) could be reasonably expected to lie within a predicted range of data values PR(X) lying below and including UB(X) and above and including LB(X) such that LB(X)≦PR(X)≦UB(X).

For purposes of the present discussion, upper and lower bounds UB(X) and LB(X) correspond solely to location 5215, and not to any other location within the scanning region 5210. This concept is demonstrated by points 5345 and 5350 which represent UB(X) and LB(X), respectively, produced by post-processing operations as described above. Moreover, location 5215 can correspond for example to a single pixel of raw electronic image data, and scanning region 5210 could overlay a surrounding region including a plurality of pixels that lie in the neighborhood of location 5215. Furthermore, it is noted that while the illustrative example above considers, for purposes of enhancing the reader's understanding, data values within one dimensional linescan 5330, nonlinear operation 560 can define and establish UB(X) and LB(X) as maximum and minimum data values respectively of raw electronic image data points that lie anywhere within scanning region 5210 and not just from points along one dimensional linescan 5330. For example UB=$I_{MAX}$ may occur within scanning region 5210 at a point 5331 and LB=$I_{MIN}$ may occur at a different point 5332.

Referring again to FIGS. 86, 87 and 88, it is again noted that the technique discussed immediately above, with reference to FIGS. 90 and 91, can be utilized, for example, to accomplish steps 5010 and steps 5020 in FIG. 87 as part of nonlinear post-process 5000. Additionally, the same technique can be applied in order to perform step 5010 of FIG. 88 as part of nonlinear post-processing operation 5100. In this regard, the techniques discussed immediately above can be employed as part of step 4910 in process 4900 as will be discussed further immediately hereinafter.

Figure 92:
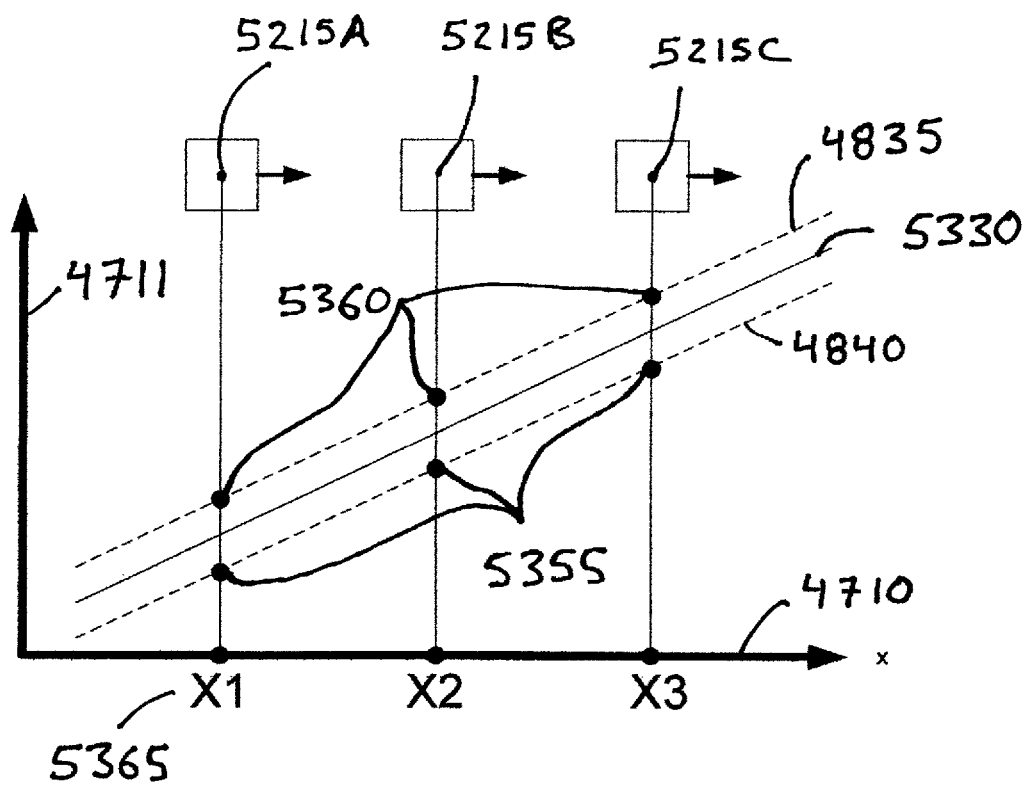
FIG. 92 shows a plot illustrating an exemplary post-processing operation utilizing a scanning region for generating post processed linescans from raw linescans of electronic image data, in accordance with the present disclosure.

Attention is now directed to FIG. 92 in conjunction with FIGS. 90 and 91 and with ongoing reference to FIGS. 80 and 82. FIG. 92 illustrates an electronic image data plot having horizontal axis 4710 corresponding to position, and vertical axis 4711 corresponding to an electronic image data value of interest. FIG. 92 also shows scanning region 5210 in three successive positions 5215A, 5215B, and 5215C as part of a sequential scan that produces example electronic image data linescan 5330. At each of the three sequential positions 5215A-5215C, the scanning region is utilized in accordance with the discussion immediately above with reference to FIGS. 90-91, to generate minima 5355 and maxima 5360 associated with each of the three successive positions at X1, X2, and X3 respectively. A resulting lower bounding curve 4840 and an upper bounding curve 4835 are shown in FIG. 92 using interpolation along minima 5355 and maxima 5360, respectively.

It is noted that FIG. 92 is a diagrammatic representation that is shown not-to-scale for purposes of enhancing the reader's understanding. In the course of a typical scan, as will be discussed hereinafter, the x position of scanning region 5210 may be shifted incrementally at each step and closely spaced such that from one position to the next scanning region 5210 largely overlaps its prior position in the scan. Accordingly, successive post-processed data values (e.g., maxima 5360) would be more closely spaced along horizontal axis 4710.

Referring again to FIG. 83, it is further noted that the process described immediately above with reference to FIG. 92 could be employed, for example, for generating upper and lower bounding curves 4835 and 4840 based on raw electronic image data linescan 4825.

With ongoing reference to FIGS. 90-92, it is noted that many possible algorithms can be utilized for generating upper and lower bounds corresponding to position 5215 of scanning region 5210 in view of this disclosure. In general, scanning region 5210 defines a shape that overlays a portion of the raw electronic image data and encompasses a plurality of electronic image data values within the raw electronic image data. The plurality of electronic image data values can be mathematically operated upon as part of a nonlinear post-processing procedure in a variety of ways in order to establish upper and lower bounds UB and LB corresponding to a given scanning position 5215. For example, various statistical measures may be applied to the plurality of data values encompassed by the scanning region in order to establish upper and lower bounds for a given scanning position. For instance, for a given position 5215 of scanning region 5210 within raw electronic image data 4515, a mean (e.g., an average) data value can be established as a first statistical measure by considering all data values encompassed by the scanning region and computing the mean value thereof. Thereafter, a standard deviation (of encompassed data values) from the mean value can be determined (as a second statistical measure), and the upper boundary UB can be defined for position 5215 as the sum of the mean value plus a multiple of the magnitude of the standard deviation. Similarly, the lower boundary LB can be defined and established as the mean value minus a multiple of the magnitude of the standard deviation. The examples immediately above are not intended to be limiting, and it should be appreciated that the lower and upper bounds may be established according to a variety of different algorithms, using many possible combinations of mathematical operations, in conjunction with statistical measures derived from electronic data values encompassed by scanning region 5210, including additions, subtractions, multiplications and divisions. It is again noted that for the nonlinear post-processing operation associated with a given location 5215, the electronic data values encompassed by scanning region 5210 include all data values that are utilized in any way as part of the nonlinear post processing associated with position 5215.

Figure 93:
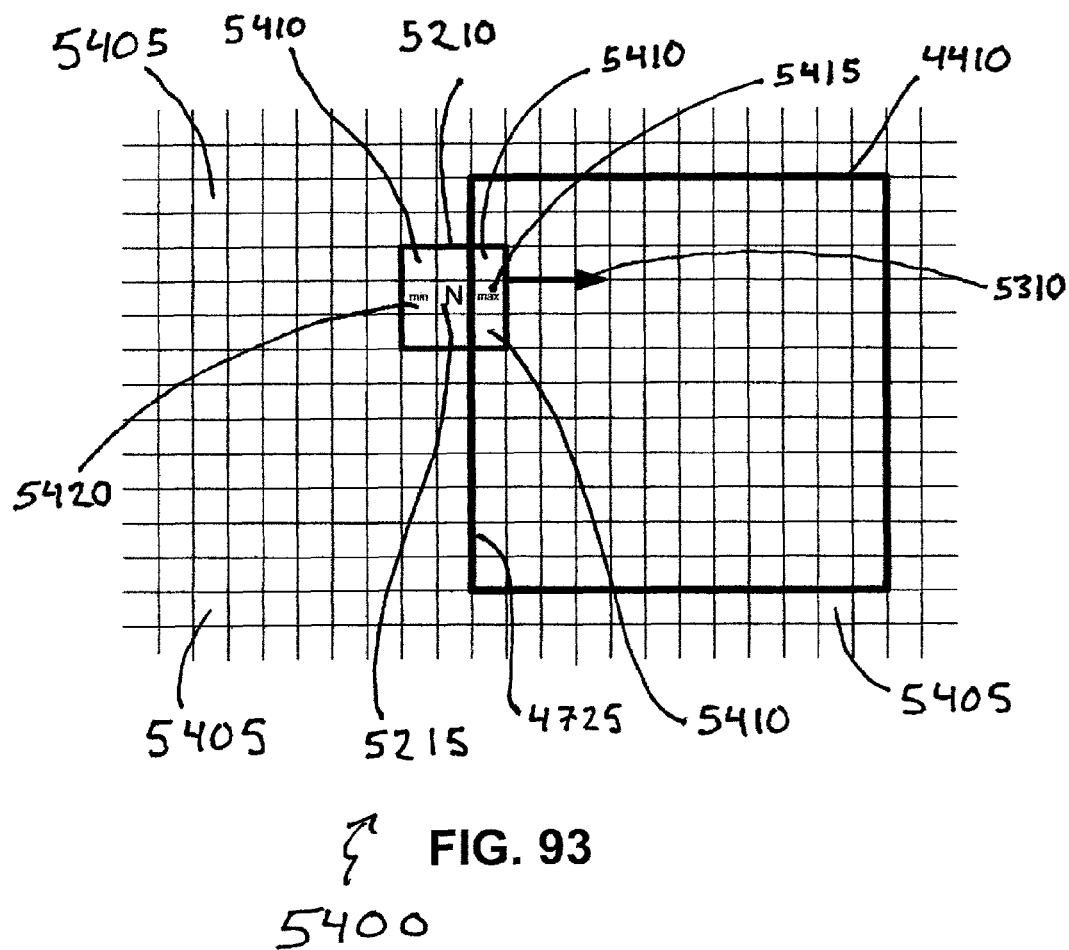
FIG. 93 shows a diagrammatic representation of a pixelated portion of electronic image data that includes an object such as object 4410 of FIG. 81, and a scanning region such as the scanning region of FIG. 90.
Figure 94:
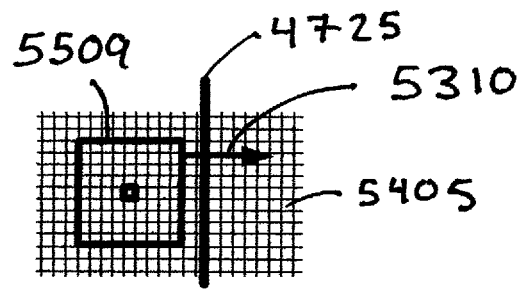
FIGS. 94-98 show diagrammatic representations of the image data and the scanning region from FIG. 93 in an ordered sequence of successive positions of a scan, as an example utilizing the scanning region in a post-processing operation in accordance with the present disclosure.
Figure 95:
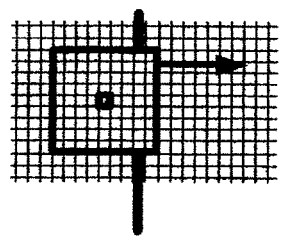
Figure 96:
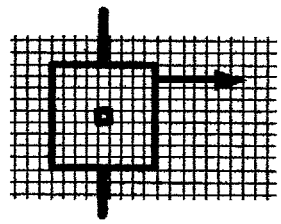
Figure 97:
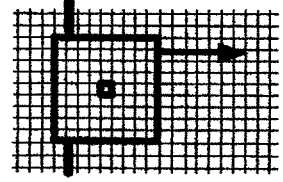
Figure 98:
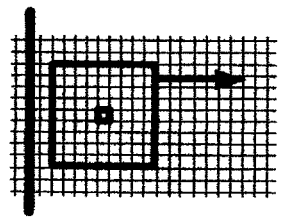

Attention is now directed to FIG. 93 in conjunction with FIG. 89 and FIG. 80. FIG. 93 illustrates an electronic data portion 5400, from raw electronic image data 4515 that contains object 4410. Scanning region 5210 is illustrated in location 5215 such that the scanning region spans object edge 4725. In this example electronic data portion 5400 is divided into discrete regions 5405 (for example pixels), a number of which are indicated accordingly. Scanning region 5210 is configured to cover a plurality of encompassed discrete regions 5410, several of which are indicated. Taking each discrete region 5405 to be identifiable by a suitable indexing system, upper bounds UB(N) and lower bound LB(N) can be generated for any given discrete region that coincides with scanning region location 5215. It is noted that previous discussions have referred to positions within electronic image data according to either a position "X" (in cases where a reference x axis is provided) or an index "N" depending on whether the given discussion is (i) a general discussion with no diagrammatic representations of discrete regions or subsets (for example, pixels) of electronic image data, or (ii) a particular discussion or example (as in the example discussed with reference to FIG. 93) in which at least some of the electronic image data is presumed to be divided into discrete regions (i.e., pixels) and therefore constitutes a "pixelated" data set. It can be appreciated by one skilled in the art that pixelated electronic image data can be interchangeably described according to position X or index N. In this regard, any suitable frame of reference may be imposed while still employing the concepts that have been brought to light herein.

It is further noted that discrete regions of electronic image data are herein referred to interchangeably as "discrete regions" or as "pixels". It is recognized herein that given electronic image data may be divided into such discrete regions in a number of suitable ways and according to a number of suitable data structures either currently known or yet to be developed. In the discussion immediately hereinafter, electronic image data is pixelated, and discrete regions of electronic image data are referred to as "pixels". Accordingly, for purposes of reference in the discussions below, positions within electronic image data will be identified according to integral indices in the form of pixel numbers and oftentimes referring to a specific pixel number or generically as pixel N. Furthermore, "pixels" may be selected and operated upon in groups such as a 2×2 matrix of pixels or other samplings of the electronic image data.

Referring to FIG. 93 in conjunction with FIGS. 90-92 and FIG. 80, scanning region 5210 constitutes a 3×3 array of 9 encompassed scanning region pixels 5410 and overlays electronic data portion 5400 such that scanning region 5210 can be utilized to perform operations (as part of post-processing operation 560) employing data values associated with the 9 pixels 5410 that are encompassed by the scanning region. It is again noted that for a given position of scanning region 5210, the encompassed electronic image data values overlaid by scanning region 5210 include any data values that are utilized in any way by post-processing operation 560. As an example, for a process step associated with scanning region location 5215, assuming a given pixel (not shown) is only partially overlaid by scanning region 5210, electronic image data associated with the pixel is encompassed by the scanning region if the associated data is utilized as part of nonlinear post processing operation 560. It is recognized that a variety of operations are possible. For example, scanning region 5210 can be used, as will be discussed hereinafter, to establish an upper boundary UB(N) and a lower boundary LB(N) associated with pixel N and corresponding to location 5215 of the scanning region. As introduced previously with reference to FIGS. 90-92, the post-processing operation establishes a set of upper and lower bounds associated with the central location of scanning region 5210. In the particular example illustrated in pixelated scanning region 5210 of FIG. 93, the post-processing operation may for example, compare the 9 encompassed pixels with one another to identify a pixel 5415 having a maximum data value $I_{MAX}$ as compared to the other 8 and to establish an upper bound UB(N) associated with pixel N according to the relation UB(N)=$I_{MAX}$. Similarly, and in accordance with previous discussions, the post-processing operation may identify a different pixel 5420 having a minimum data value $I_{MIN}$ as compared to the other 8 pixels, and establish therefrom a lower bound for pixel N according to the relation LB(N)=$I_{MIN}$. The post-processing operation may then determine for pixel N a predicted range of data values PR(N) as all values between and including UB(N) and LB(N) according to the relation LB(N)≦PR(N)≦UB(N).

Referring to FIG. 93 in conjunction with FIGS. 90-92, it should be appreciated that the general discussions with respect to FIGS. 90-92 remain applicable even in the instance of a pixelated region such as, for example, scanning region 5210 of FIG. 93. It is again noted that a variety of methods can be employed for determining upper and lower bounds associated with scanning region 5210 in FIG. 93, including but not limited to applying statistical measures to the data values encompassed by scanning region 5210 in FIG. 93.

As one example of processing utilizing pixelated scanning region 5210, data values associated with pixels 5410 that are encompassed by scanning region 5210 can be organized in ascending order of magnitude, from lowest to highest data values, to establish a "rank ordering" from a lowest rank order (corresponding to a lowest encompassed data value 5420) to a highest rank order (corresponding to a highest encompassed data value 5415). In other words, a rank ordering process organizes the data values encompassed by the scanning region into an ordered set of values wherein each value has a "rank order" statistic that designates its position relative to the other encompassed data values. Thus, the encompassed data value having the lowest value, as compared to the others, is designated as having rank order of 1, and the highest encompassed data value is designated with a rank order equal to the total number of encompassed data values. For example, applying a rank ordering process to 9 data values encompassed by a 3×3 scanning region, the lowest of the nine data values would have a rank order of 1, the highest would have a rank order of 9.

Given a rank ordered set of data values encompassed by a scanning region, a post-processing operation may utilize scanning region 5210 to employ a "rank order filter" wherein a filtered data value is generated by setting the filtered data value to the value associated with a given specific rank. For example, utilizing 3×3 scanning region 5210 that encompasses 9 pixels 5410 therein, a filtered value corresponding to a lower bound LB may be generated by setting the lower bound LB to the value associated with the lowest (i.e. first) rank. Similarly a different filtered value can be generated corresponding to an upper bound UB by setting the upper bound UB to the encompassed data value corresponding to the highest (i.e. ninth) rank. This process could, for example, be scanningly employed in order to generate upper and lower bounding curves as discussed previously above. Based on the immediately foregoing discussion and the definitions therein, generating upper and lower bounding curves produced in this way, from given raw electronic image data, may be considered as establishing a mathematical relationship between rank order statistics, and also as being produced according to a "rank order filter".

It is noted that the rank order filter process described immediately above, while not inherently "statistical" in nature, may nevertheless produce results that can be interpreted at least to some extent in a statistical way. As an illustrative example, assuming scanning region 5210 encompasses a set of pixels corresponding to an image of a wide flat surface of uniform color and having no texture, data value variations amongst the nine pixels may arise strictly as a result of correlated or uncorrelated noise in the imaging system, such has photon shot noise, thermal noise and/or readout noise. In this instance, the data value corresponding to a $5^{th}$ rank represents a median data value within the nine encompassed pixels. The median data value may approximate a mean value for the nine encompassed pixels. Given that rank order processes accordingly produce results that can be interpreted in a statistical way, filtered values generated by rank ordering processes are often referred to as "rank order statistics". Another example is presented immediately hereinafter to draw further attention to the connection that can exist between rank order processes and statistical manipulations.

With continuing reference to FIG. 93, it can be appreciated that rank ordering of data values can be employed in many different ways, and it may be advantageous to employ statistical considerations in defining a given process. For example, assuming a given degree of noise in data values associated with pixels 5405, it may be advantageous to define lower bound LB and upper bound UB as the $2^{nd}$ and $8^{th}$ rank orders, respectively, within the encompassed data values as opposed to the lowest and highest ($1^{st}$ and $9^{th}$) rank orders as described previously above. In view of the assumed noise, it can be appreciated that use of the $2^{nd}$ and $8^{th}$ rank order values, as opposed to the lowest and highest rank order data values, may reduce the statistical likelihood that the upper and lower bounds UB and LB, so generated, fall outside a predetermined limit. The foregoing example illustrates a connection between rank order process and statistical manipulations in that the use of second and eighth rank order for designating lower and upper bounds, respectively, is based on statistical considerations.

Referring again to FIGS. 86, 87 and 88, it is noted that the process discussed with reference to FIG. 93 can be utilized in any case where upper and lower bounds are being established, for example, to accomplish steps 5010 and 5020 in FIG. 87 as part of process 5000. Additionally, the process can be similarly applied in order to perform step 5010 of FIG. 88 as part of process 5100. Furthermore, the same process can be employed as part of global process 4900 for scanningly producing upper and lower bounding curves of filtered raw electronic image data.

Attention is turned to FIGS. 94-98 which generally illustrate a scanning sequence that is applicable for scanningly processing a subset of electronic image data in the context of the discussions above. A scanning region 5509 forms a 9×9 array and scanningly functions in an essentially identical way as aforedescribed scanning region 5210. Scanning region 5509, however, encompasses 81 pixels from amongst electronic image data pixels 5405 within raw electronic image data. A sequence of movements is depicted in FIGS. 94-98 as 9×9 scanning region 5509 is sequentially scanned along direction of arrow 5310 over pixels 5405 such that the scan crosses edge 4725 that gives rise to a transition in the raw electronic image data. For each measurement in the scan, upper and lower boundaries UB and LB are generated (for the center position) as will be described immediately hereinafter. It is noted that the sequence of FIGS. 94-98 represents a sample of 5 steps in a representative scanning sequence that simplifies this material for purposes of illustrative clarity, and that there may be multiple steps therebetween that are not illustrated. For the present example, electronic image data pixels 5405 may be understood to have a first value for those pixels to the left of edge 4725 and a second and larger value for those pixels to the right of edge 4725.

Figure 99:
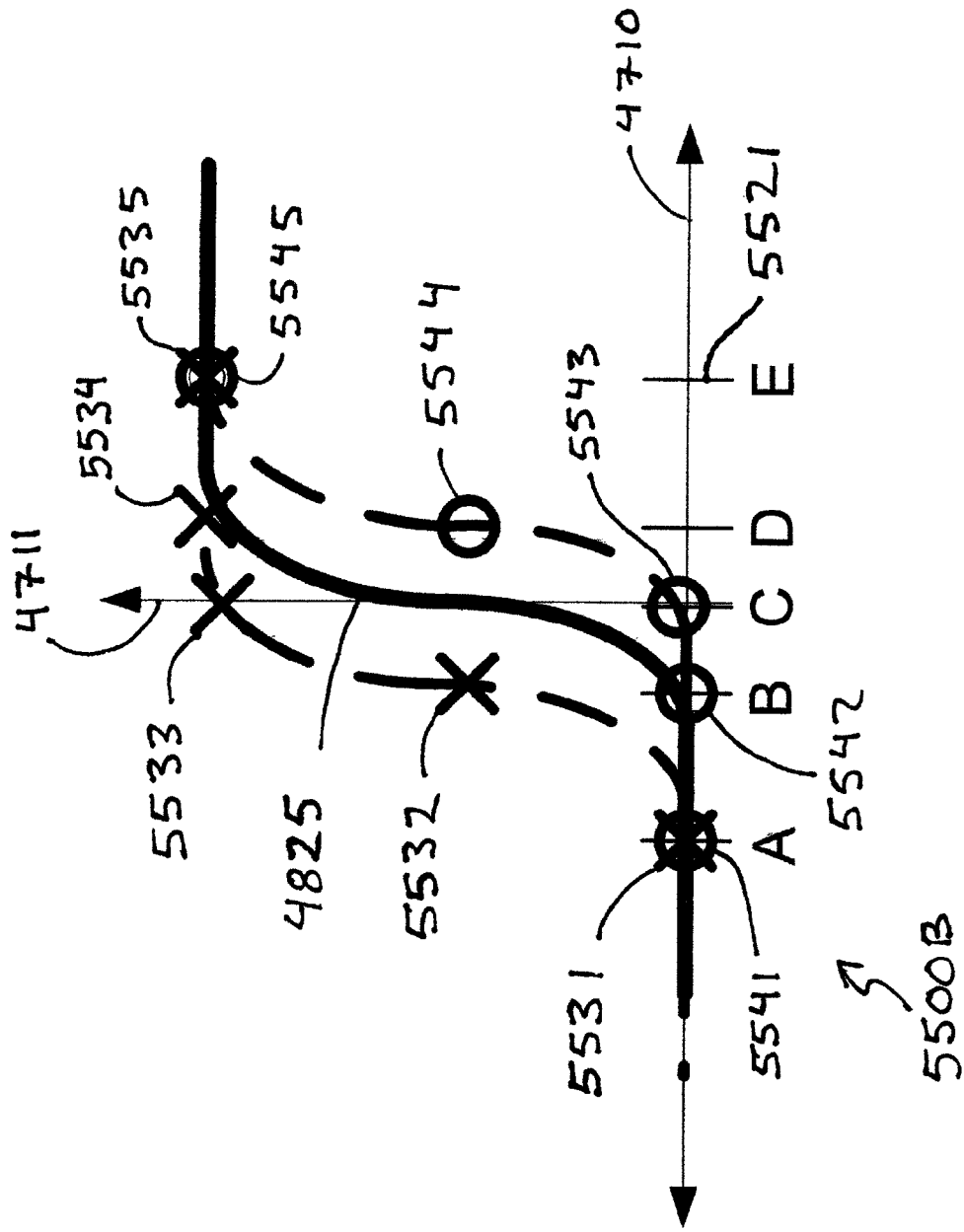
FIG. 99 shows a plot of the raw data linescan of FIG. 83 with selected exemplary image data values for illustrating an embodiment of a process by which post-processed image data linescans from FIG. 83 can be established in accordance with the present disclosure.

Turning now to FIG. 99 in conjunction with FIGS. 94-98 and FIG. 83, a linescan plot is illustrated, generally indicated by reference number 5500B. Vertical axis 4711 corresponds, for example, to an electronic image data value of interest such as luminance, intensity, or color. FIG. 99 further includes linescan segment 4825 of raw electronic image data illustrated previously in FIG. 83. On horizontal axis 4710, vertical hash marks A-E, a specific one of which is indicated by reference number 5521, each indicate a position corresponding to one of FIGS. 94-98, respectively. That is, for each position A-E of the scanning region in FIG. 99, the 81 values of the 9×9 scanning region are evaluated to establish the upper and lower bounds for the center pixel of the scanning region.

For each of positions A-E in FIG. 99, upper and lower bounds (and a predicted range of data values therebetween) can be generated in accordance with the discussions above. In position A an upper bound 5531 is plotted in FIG. 99 and appears as an "X". Similarly, a lower bound 5541 indicated by an open circle is plotted and directly on top of upper bound 5531 (since upper and lower bounds are equal for that point). For position B, an upper bound 5532 and a lower bound 5542 are both plotted. For position C a set of upper and lower bounds 5533 and 5543 is plotted. For position D another set of upper and lower bounds 5534 and 5544 is plotted. And finally, for position E upper and lower bounds 5535 and 5545 are both plotted. It is noted that each upper bound in FIG. 99 is represented by an "X" and each lower bound is represented by an open circle.

Referring to FIGS. 94-99 in conjunction with FIG. 83, the preceding discussion provides an illustrative example wherein a 9×9 scanning area is employed as part of nonlinear post-process 560 in order to generate upper and lower bounding curves 4835 and 4840 respectively. For example, the 9×9 scanning region 5509 in these figures may be employed for sequentially scanning raw electronic image data 4515 for generating upper and lower bounding curves 4835 and 4840 as illustrated in FIGS. 83 and 99. Of course the scanning region may be of any suitable size and shape.

Referring again to FIG. 93 and FIGS. 94-98 in conjunction with FIG. 78, FIG. 93 illustrates a 3×3 scanning region 5210 that overlays 9 pixels of given electronic image data, while FIGS. 89-93 illustrate a 9×9 scanning region 5509 that overlays 81 pixels of given electronic image data. Based on the foregoing descriptions it can be appreciated that different size scanning regions may be used to exhibit different properties, depending on a variety of factors. For example the smaller 3×3 scanning region may be more suitable for processing an image with objects having small features such as feature 4423 of FIG. 78 while the larger 9×9 scanning region may cause blurring of small features such as feature 4423 and may therefore be more suitable for processing large features such as feature 4422 of FIG. 78.

In some cases, as will be described immediately hereinafter in reference to FIGS. 100-102, it is desirable to combine the functionality of small and large scanning regions within a composite scanning region that includes at least two scanning regions of differing size and/or shape.

Figure 100:
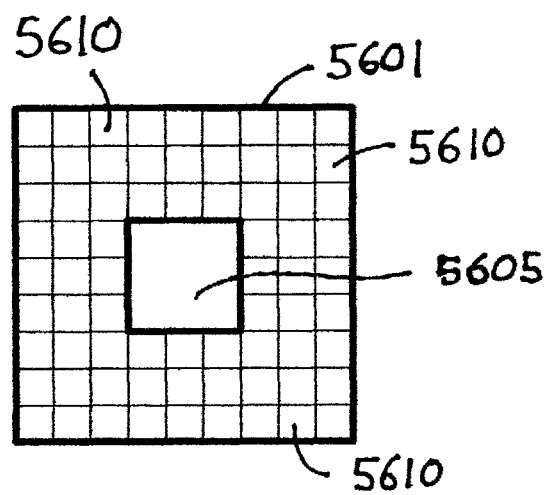
FIG. 100 shows a diagrammatic representation of a scanning region having a different shape than the scanning region of FIG. 90 and including a central area sized for containing a second scanning region such as the scanning region of FIG. 93.

Attention is now drawn to FIG. 100 which illustrates an "outer" scanning region 5601, having a different shape than previously described 9×9 scanning region 5509. Outer scanning region 5601 is configured as a square with a central area 5605. Furthermore, outer region 5601 is configured to overlay and encompass selected pixels 5610 such that outer region 5601 can be utilized by a post-processing operation for establishing, based on data values associated with the encompassed pixels 5610, a given process value (for example upper and lower bounds) for use in post-processing of the electronic image data. Central area 5605 can accommodate a smaller inner scanning region, as will be discussed immediately hereinafter with reference to FIG. 101.

Figure 101:
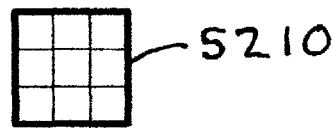
FIG. 101 shows a diagrammatic representation of a scanning region vertically aligned relative to FIG. 100 and sized for fitting in the central area of the scanning region from FIG. 100.

Turning now to FIG. 101, in conjunction with FIG. 100, a smaller "inner" region is illustrated. A 3×3 scanning region 5210 is configured to overlay nine pixels 5410 of electronic image data, and is sized to fit in a complementary manner within empty central area 5605 of scanning region 5601 so that it can be employed simultaneously and in conjunction with outer scanning region 5601, in order to form a composite scanning region, as will be discussed immediately hereinafter in reference to FIG. 102.

Figure 102:
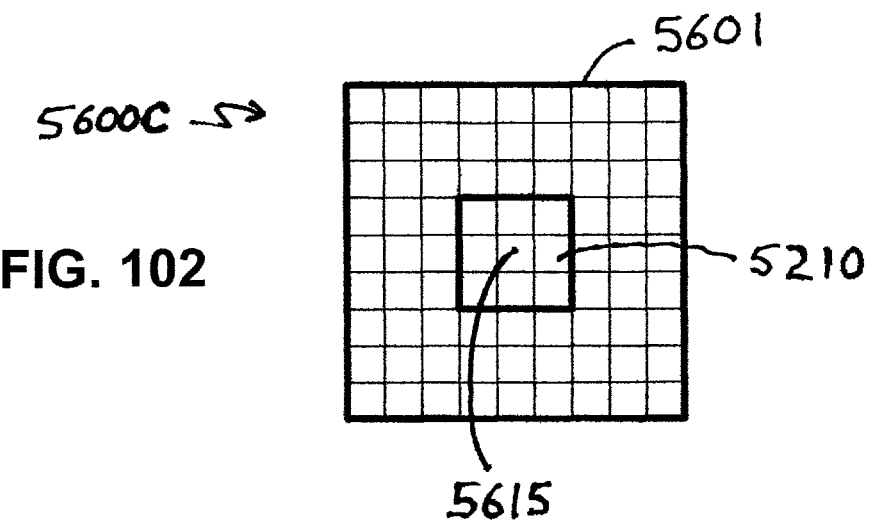
FIG. 102 shows a diagrammatic representation of a composite scanning region that includes the scanning region of FIG. 100 with the scanning region of FIG. 101.

Turning now to FIG. 102, with continuing reference to FIGS. 100 and 101, a composite scanning region includes a combination of inner scanning region 5210 and outer scanning region 5601. Inner and outer scanning regions 5210 and 5601 can be scanned together, as part of a nonlinear post-processing operation, to sequentially scan given electronic image data while producing two differing sets of process parameters each based upon the same or different computational methods. For example, at each point N in the sequential scan, inner scanning region 5210 may produce one set of upper and lower bounds $UB1(N)$ and $LB1(N)$ respectively based on a given type of statistical measure, and pixels encompassed by outer scanning region 5601 can be employed for generating therefrom a second set of upper and lower bounds $UB2(N)$ and $LB2(N)$ based on a different type of statistical measure. In addition, a third set of upper and lower bounds $UB3(N)$ and $LB3(N)$ may be generated based on the 81 pixels of electronic image data encompassed by the combination of inner scan region 5210 and outer scanning region 5601 and using yet another type of statistical measure. A post-processing operation utilizing composite scanning region 5600C may then be configured, for example, to apply different ones of the three boundary sets upon different pixels and for a variety of reasons, depending on the process. For example, the post-processor may be configured to selectively apply upper and lower bounds $UB1(N)$ and $LB1(N)$ to one subset corresponding to a specific spatial region of electronic image data that includes small features, and to apply $UB3(N)$ and $LB3(N)$ to a different subset of electronic image data corresponding to a different spatial region that includes larger features.

While the foregoing descriptions have focused on image processing operations for correcting artifacts occurring at or near transitions in given electronic image data, scanning regions can be utilized in accordance with the overall teachings herein, using a variety of image processing systems and methods.

As an example, still considering FIG. 102, composite scanning region 5600C may be utilized to scanningly produce a first statistical value M1 corresponding to a mean data value derived by averaging data values from all 9 pixels within inner region 5210 and a second statistical value M2 corresponding to a mean value for all 72 pixels in outer scanning region 5601. At any given location 5615 of the composite scanning region, M1 and M2 may be compared in a variety of ways and for different reasons depending on (i) the nature of the image being scanned, and (ii) the specific function of the specific image processing operation that utilizes composite scanning region 5600C. For example, a comparison between M1 and M2 may be utilized as a diagnostic probe for measuring a degree of image texture present in a portion of electronic image data being scanned. In particular, the purpose of a given scan may be to characterize a degree of variation present within a portion of the image to determine if the image is "smooth" and "featureless", or if it is "textured" and/or contains multiple features. On one hand, if M1≈M2, then it is likely that the composite scanning region is scanning a "smooth" image location corresponding to little or no pixel-to-pixel variation relative to the size (for example 9 pixels in width) of the scanning region. On the other hand if M2>>M1 then clearly a degree of texture (or some other electronic image data variation) is present amongst the pixels encompassed by composite scanning region 5600C. If M1=M2 throughout the entire data set, then the data set is very likely to be smooth throughout, at least relative to the size (9 pixels across) of composite scanning region 5600C.

Figure 103:
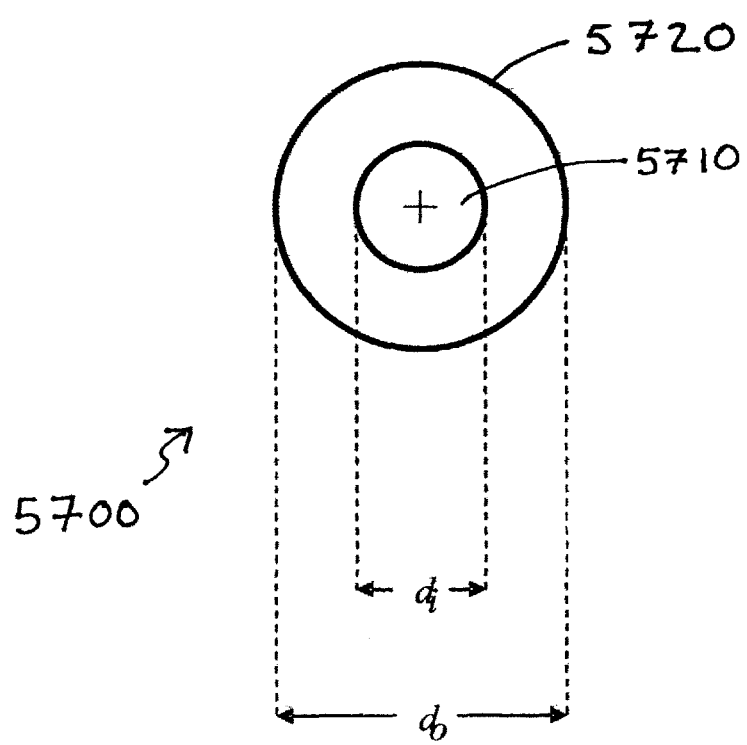
FIG. 103 shows a diagrammatic representation of a composite scanning region having a circular shape.

While the foregoing disclosures have utilized square scanning regions, the use of square shapes is not intended to be limiting, and it can be appreciated that other scanning shapes may be employed. As another example of a scanning region that is not square, attention is now directed to FIG. 103 which illustrates a composite scanning region, generally indicated by reference number 5700, having a circular shape. An inner region 5710 has a diameter d1 and an outer region 5720 has a diameter d2. Circular composite scanning region 5700 can be used in accordance with the discussions above for probing texture in given electronic image data. Circular scanning regions are of particular interest for a variety of reasons. For example, circular scanning regions display rotational symmetry and therefore can be scanned in any direction without imposing directionally dependent variations onto the results of a given scan.

Referring again to FIG. 102, it can be appreciated that there is no limit to the number of scanning regions that may be employed in processing a given electronic image data, and there is no requirement that multiple scanning regions be scanned simultaneously together. For example an image may be first be processed using a series of diagnostic image processing operations utilizing composite scanning region 5600C for characterizing image texture, and then the same image may subsequently be processed by a single scanning region 5210 that is configured in a specific way, based at least in part upon the results of the first diagnostic scan. Although composite scanning region 5600C of FIG. 102 is shown to include two regions that do not overlap, it may be understood that regions 5601 and 5210 may overlap. For example, empty central area 5605 of scanning region 5601 may include only 4 pixels and therefore regions 5601 and 5210 will overlap on 5 pixels.

It can be further appreciated that a plurality of different processing operations, each utilizing different scanning regions to perform different image processing operations, can be applied to given electronic image data. It is noted that the post-processing operations previously disclosed herein are configured for receiving pre-processed data sets and produce therefrom post-processed data sets by selectively modifying subsets of electronic image data values present in the pre-processed image data, and there is no limit to the number of scans and modifications that may be applied.

Furthermore, it is noted that any given post-processing operation having an associated scanning region can be applied selectively over a portion of given electronic image data, and different operations, each utilizing different scanning regions, can be applied to different portions of a given mage data set in a spatially dependant way. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall there between.

What is claimed is:

1. A method for imaging a scene, said method comprising:
encoding electromagnetic energy from the scene in a predetermined way to produce encoded electromagnetic energy;
imaging the encoded electromagnetic energy to form an encoded optical image;
receiving and capturing said encoded optical image to produce raw electronic image data corresponding to said encoded optical image;
decoding said raw electronic image data so that the encoding and the decoding cooperate with one another to produce pre-processed image data representing at least one characteristic that is changed relative to an associated characteristic of said scene, and said pre-processed image data includes, as a byproduct of the cooperation between said encoding and decoding, at least one artifact as compared to said raw electronic image data; and
compensating for said artifact by applying a nonlinear post-processing operation to alter a part of the pre-processed image data that contains the artifact while retaining the characteristic in the balance of the pre-processed image data, wherein said nonlinear post-processing operation includes
defining a scanning region having a shape which overlays a portion of the raw electronic image data to encompass a plurality of image data values within said raw electronic image data,
scanning the scanning region through the raw electronic image data by movement thereof through a series of positions in said raw electronic image data
establishing, for a given one of the image data values encompassed by the scanning region corresponding to each of said positions, a predicted range for the image data values that is based at least in part on said plurality of image data values, wherein establishing said predicted range includes (i) determining an average value associated with said plurality of image data values encompassed by said scanning region, (ii) establishing a standard deviation associated with said plurality of image data values within the scanning region, and (iii) defining said predicted range as including said average value and all data values that differ from the average value by less than a multiple of said standard deviation,
comparing said predicted range for each given data value to a corresponding pre-processed data value, and
based on said comparing, identifying said artifact as at least one outlying pre-processed data value that lies outside of the predicted range,
wherein said compensating includes correcting said artifact by changing said outlying pre-processed data value to conform to the predicted range.

2. The method of claim 1 wherein establishing said predicted range includes: (i) identifying a maximum data value as a highest image data value in said plurality of image data values that is encompassed by said scanning region; (ii) identifying a minimum data value as a lowest image data value in said plurality of image data values; and (iii) defining the predicted range as all image data values between and including the minimum and maximum data values.

3. The method of claim 1 wherein said nonlinear post-processing operation includes
scanning said raw electronic image data to generate therefrom filtered data that defines data value boundaries for said pre-processed image data, and
comparing said pre-processed image data with said filtered data to identify said artifact as a subset of said pre-processed image data that lies outside of the data value boundaries,
wherein said compensating includes changing said subset to produce a corrected subset of image data that lies within the data value boundaries.

4. The method of claim 3 wherein a plurality of the artifacts are present in said pre-processed image data, and wherein comparing said pre-processed image data with said filtered data includes identifying said plurality of the artifacts as within said subset of said pre-processed image data.

5. The method of claim 1 wherein said artifact occurs at a location within said pre-processed image data that is characterized by a given data value, and said compensating includes establishing a predicted range of data values for said location and comparing said predicted range to said given data value to determine that the given data value lies outside of said predicted range, and thereafter correcting said given data value to a new value that lies within said predicted range.

6. The method of claim 5 wherein establishing the predicted range includes applying said nonlinear post-processing operation to said raw electronic image data to determine at least one of (i) an upper bound, and (ii) a lower bound, for said predicted range.

7. The method of claim 5 wherein establishing the predicted range includes (i) applying said nonlinear post-processing operation to said raw electronic image data for determining an upper bound and a lower bound of said predicted range, and (ii) defining said predicted range to include said upper bound and said lower bound and all values therebetween.

8. The method of claim 7 wherein compensating for said artifact includes applying said nonlinear post-processing operation to compare said given data value to said upper bound and said lower bound, and setting said given data value to a new value corresponding to a nearest one of the upper and lower bounds.

9. The method of claim 1 wherein said scene includes a feature that causes a corresponding transition in said raw electronic image data, and the cooperation between said encoding and said decoding causes said artifact in response to the transition.

10. The method of claim 9 wherein said feature corresponds to an optical intensity shift in said encoded optical image as said transition, and said decoding adjusts at least a subset of said raw electronic image data that is associated with said optical intensity shift.

11. The method of claim 9 wherein said feature corresponds to a color shift in said encoded optical image as said transition, and said decoding adjusts at least a subset of said raw electronic image data that is associated with said color shift.

12. The method of claim 9 wherein said feature corresponds to a change of a spatial frequency in said encoded optical image as said transition, and said decoding adjusts at least a subset of said raw electronic image data that is associated with said change of said spatial frequency.

13. The method of claim 1 wherein
said pre-processed image data substantially represents said encoded optical image as an array of spatial regions in adjacent and non-overlapping relationships with one another, and
said artifact corresponds to at least a specific one of the spatial regions, and said compensating includes correcting said specific one of the spatial regions of said pre-processed image data.

14. The method of claim 13 further comprising
monitoring two subsets of nearby ones of the spatial regions surrounding said specific spatial region, including a first subset and a second subset, each subset surrounding and at least including said specific spatial region, and
modifying said compensating based on said monitoring.

15. The method of claim 13 further comprising
monitoring two subsets of nearby ones of the spatial regions surrounding said specific spatial region, including (i) a first subset of spatial regions surrounding said specific spatial region, and (ii) a second subset of spatial regions surrounding the first subset such that the first subset is within and surrounded by the second subset, and
modifying said compensating based on said monitoring.

16. The method of claim 15 further comprising configuring said second subset to include said first subset such that monitoring said second subset includes monitoring the first subset.

17. The method of claim 13 further comprising
monitoring two subsets of nearby ones of the spatial regions surrounding said specific spatial region, said two subsets including a first subset of spatial regions surrounding and including said specific spatial region, and a second subset of spatial regions surrounding the first subset such that the first subset is within and surrounded by the second subset,
determining a rank order statistic for each of the first subset and the second subset, and
establishing a mathematical relationship between said rank order statistics, and
wherein compensating is based on the mathematical relationship between the rank order statistics.

18. A method for imaging a scene, said method comprising:
encoding electromagnetic energy from the scene in a predetermined way to produce encoded electromagnetic energy;
imaging the encoded electromagnetic energy to form an encoded optical image;
receiving and capturing said encoded optical image to produce raw electronic image data corresponding to said encoded optical image;
decoding said raw electronic image data so that the encoding and the decoding cooperate with one another to produce pre-processed image data representing at least one characteristic that is changed relative to an associated characteristic of said scene, and said pre-processed image data includes, as a byproduct of the cooperation between said encoding and decoding, at least one artifact as compared to said raw electronic image data;
compensating for said artifact by applying a nonlinear post-processing operation to alter a part of the pre-processed image data that contains the artifact while retaining the characteristic in the balance of the pre-processed image data, wherein said nonlinear post-processing operation includes
defining a scanning region having a shape which overlays a portion of the raw electronic image data to encompass a plurality of image data values within said raw electronic image data,
scanning the scanning region through the raw electronic image data by movement thereof through a series of positions in said raw electronic image data, and
establishing, for a given one of the image data values encompassed by the scanning region corresponding to each of said positions, a predicted range for the image data values that is based at least in part on said plurality of image data values, wherein establishing said predicted range includes: (i) determining a first statistical measure and a second statistical measure associated with said plurality of image data values within said scanning region; (ii) establishing minimum and maximum data values from mathematical combinations of the first and second statistical measures; and (iii) defining the predicted range as all values between and including the minimum and maximum data values.

19. A method for imaging a scene, said method comprising:
encoding electromagnetic energy from the scene in a predetermined way to produce encoded electromagnetic energy;
imaging the encoded electromagnetic energy to form an encoded optical image;
receiving and capturing said encoded optical image to produce raw electronic image data corresponding to said encoded optical image;
decoding said raw electronic image data so that the encoding and the decoding cooperate with one another to produce pre-processed image data representing at least one characteristic that is changed relative to an associated characteristic of said scene, and said pre-processed image data includes, as a byproduct of the cooperation between said encoding and decoding, at least one artifact as compared to said raw electronic image data; and
compensating for said artifact by applying a nonlinear post-processing operation to alter a part of the pre-processed image data that contains the artifact while retaining the characteristic in the balance of the pre-processed image data,
wherein said scene includes a feature that causes a corresponding transition in said raw electronic image data, and the cooperation between said encoding and said decoding causes said artifact in response to the transition,
wherein said artifact corresponds to an overshoot in said pre-processed image data that is caused by the cooperation between said encoding and said decoding and in response to the transition, and
the nonlinear post-processing operation corrects said overshoot by generating an error signal characterizing said overshoot, and either subtracting said error signal from, or adding said error signal to, said part of the pre-processed image data that contains the artifact.

* * * * *